(12) United States Patent
Wojtusik et al.

(10) Patent No.: US 8,534,028 B2
(45) Date of Patent: Sep. 17, 2013

(54) BUILDING PANELS

(75) Inventors: Daniel J. Wojtusik, Eagle River, WI (US); Glenn P. Schiffmann, St. Germain, WI (US); Gerhard P. Schiffmann, St. Germain, WI (US)

(73) Assignee: Composite Panel Systems, LLC, Eagle River, WI (US)

( * ) Notice: Subject to any disclaimer, the term of this patent is extended or adjusted under 35 U.S.C. 154(b) by 162 days.

(21) Appl. No.: 13/317,120

(22) Filed: Oct. 11, 2011

(65) Prior Publication Data

US 2012/0085056 A1 Apr. 12, 2012

Related U.S. Application Data

(60) Provisional application No. 61/404,793, filed on Oct. 8, 2010.

(51) Int. Cl.
*E04C 2/34* (2006.01)

(52) U.S. Cl.
USPC ........... 52/793.1; 52/293.1; 52/270; 52/309.9

(58) Field of Classification Search
USPC ................ 52/169.5, 267, 269, 270, 265, 264, 52/262, 293.1, 169.1, 309.9, 309.11, 782.1, 52/794.1, 793.1, 309.7, 309.16
See application file for complete search history.

(56) References Cited

U.S. PATENT DOCUMENTS

| | | | |
|---|---|---|---|
| 1,156,753 A | 10/1915 | Carey | |
| 2,737,227 A | 3/1956 | Brummel | |
| 2,934,180 A | 4/1960 | Hammitt et al. | |
| 3,258,889 A | 7/1966 | Butcher | |
| 3,339,326 A | 9/1967 | Derr et al. | |
| 3,544,417 A | 12/1970 | Corzine | |
| 3,573,144 A | 3/1971 | Andersen | |
| 3,601,942 A | 8/1971 | Wilson | |
| 3,719,016 A | 3/1973 | Randolph | |
| 3,888,716 A | 6/1975 | Morse | |
| 3,898,115 A | 8/1975 | Watkins et al. | |
| 4,038,796 A | 8/1977 | Eckel | |
| 4,074,489 A | 2/1978 | Eckel | |
| 4,078,348 A | 3/1978 | Rothman | |
| 4,083,159 A | 4/1978 | Hatch et al. | |
| 4,178,406 A | 12/1979 | Russell | |
| 4,205,408 A | 6/1980 | Glass et al. | |
| 4,223,053 A | 9/1980 | Brogan | |
| 4,263,759 A | 4/1981 | Miller | |
| 4,339,490 A | 7/1982 | Yoshioka et al. | |

(Continued)

FOREIGN PATENT DOCUMENTS

WO 2008/070026 6/2008

OTHER PUBLICATIONS

Author Unknown, Superior Walls Xi Foundation System, www.superiorwalls.com/images/XiWall_Ig.jpg, Printed May 2, 2005, 1 page.

(Continued)

*Primary Examiner* — Joshua J Michener
*Assistant Examiner* — Babajide Demuren
(74) *Attorney, Agent, or Firm* — Thomas D. Wilhelm; Wilhelm Law, S.C.

(57) ABSTRACT

Light weight fiber-reinforced polymeric (FRP) structural building panels and panel assemblies, sized and configured for construction of wall structures. Fiber schedule, layer securement, and orientation in the panels provide enhanced properties of strength of a panel/wall per unit dimension relative to FRP layer thickness and/or mass of the panel/wall per unit dimension.

11 Claims, 30 Drawing Sheets

(56) References Cited

U.S. PATENT DOCUMENTS

| | | |
|---|---|---|
| 4,343,669 A | 8/1982 | Prior |
| 4,557,091 A | 12/1985 | Auer |
| 4,730,428 A | 3/1988 | Head et al. |
| 4,777,774 A | 10/1988 | Smalley, III |
| 4,984,406 A | 1/1991 | Friesen |
| 5,059,377 A | 10/1991 | Ashton et al. |
| 5,069,737 A | 12/1991 | Guiton |
| 5,403,063 A | 4/1995 | Sjostedt et al. |
| 5,462,623 A | 10/1995 | Day |
| 5,509,242 A | 4/1996 | Rechsteiner et al. |
| 5,526,625 A | 6/1996 | Emblin et al. |
| 5,547,737 A | 8/1996 | Evans et al. |
| 5,572,841 A | 11/1996 | Buster |
| 5,589,243 A | 12/1996 | Day |
| 5,664,518 A | 9/1997 | Lewit et al. |
| 5,706,620 A | 1/1998 | De Zen |
| 5,707,576 A | 1/1998 | Asher |
| 5,743,056 A | 4/1998 | Balla-Goddard et al. |
| 5,834,082 A | 11/1998 | Day |
| 5,857,297 A | 1/1999 | Sawyer |
| 5,875,596 A | 3/1999 | Muller |
| 5,979,684 A | 11/1999 | Ohnishi et al. |
| 6,092,340 A | 7/2000 | Simmons |
| 6,205,729 B1 | 3/2001 | Porter |
| 6,212,849 B1 | 4/2001 | Pellock |
| 6,238,766 B1 | 5/2001 | Massett et al. |
| 6,308,491 B1 | 10/2001 | Porter |
| 6,381,793 B2 | 5/2002 | Doyle et al. |
| 6,408,594 B1 | 6/2002 | Porter |
| 6,418,686 B1 | 7/2002 | Record |
| 6,427,403 B1 | 8/2002 | Tambakis |
| 6,467,118 B2 | 10/2002 | Dumlao et al. |
| 6,481,172 B1 | 11/2002 | Porter |
| 6,565,792 B2 | 5/2003 | Hemphill |
| 6,670,291 B1 | 12/2003 | Tompkins et al. |
| 6,799,403 B2 | 10/2004 | Winter |
| 6,854,499 B2 | 2/2005 | Miller |
| 6,871,600 B2 | 3/2005 | Norton et al. |
| 6,942,915 B1 | 9/2005 | Kondo et al. |
| 7,052,563 B2 | 5/2006 | Dong et al. |
| 7,127,865 B2 | 10/2006 | Douglas |
| 7,343,715 B2 | 3/2008 | Ito et al. |
| 7,393,577 B2 | 7/2008 | Day et al. |
| 2001/0031350 A1 | 10/2001 | Day |
| 2002/0014302 A1 | 2/2002 | Fanucci et al. |
| 2002/0069600 A1 | 6/2002 | Bryant |
| 2003/0136079 A1 | 7/2003 | Ruggie et al. |
| 2004/0134162 A1 | 7/2004 | Douglas |
| 2004/0157519 A1 | 8/2004 | Goodell et al. |
| 2005/0138891 A1 | 6/2005 | Wool et al. |
| 2005/0262791 A1 | 12/2005 | Pringle et al. |
| 2006/0123725 A1 | 6/2006 | Godwin |
| 2007/0074469 A1 | 4/2007 | Plagemann et al. |
| 2007/0107370 A1 | 5/2007 | Douglas |
| 2007/0125042 A1 | 6/2007 | Hughes et al. |
| 2007/0209305 A1 | 9/2007 | Douglas |
| 2008/0127600 A1 | 6/2008 | Schiffmann et al. |
| 2008/0307747 A1 | 12/2008 | Douglas |

OTHER PUBLICATIONS

Author Unknown, Superior Walls R-5 System, www.superiorwalls.com/images/R5_Ig.jpg, Printed May 2, 2005, 1 page.

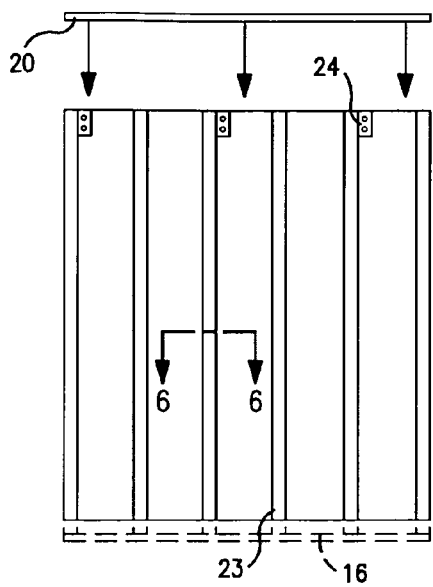
FIG. 2
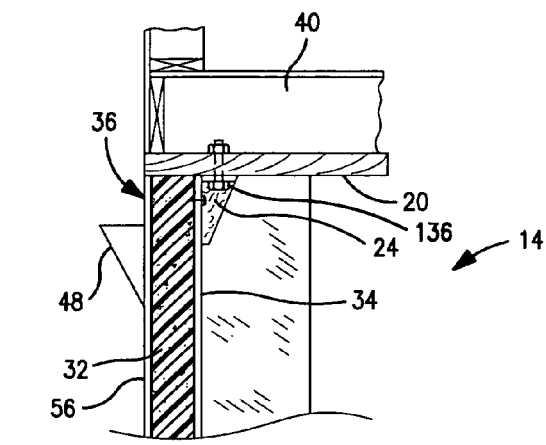
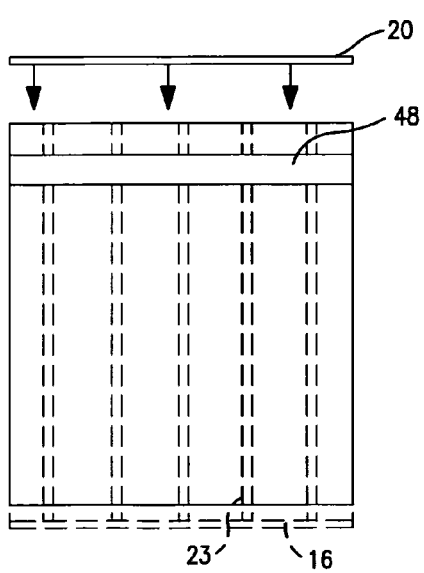
FIG. 4
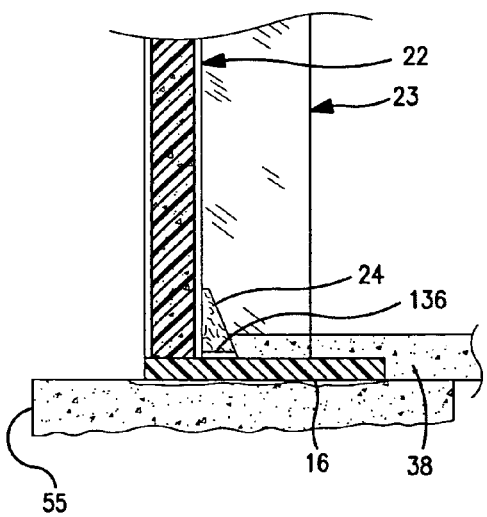
FIG. 3

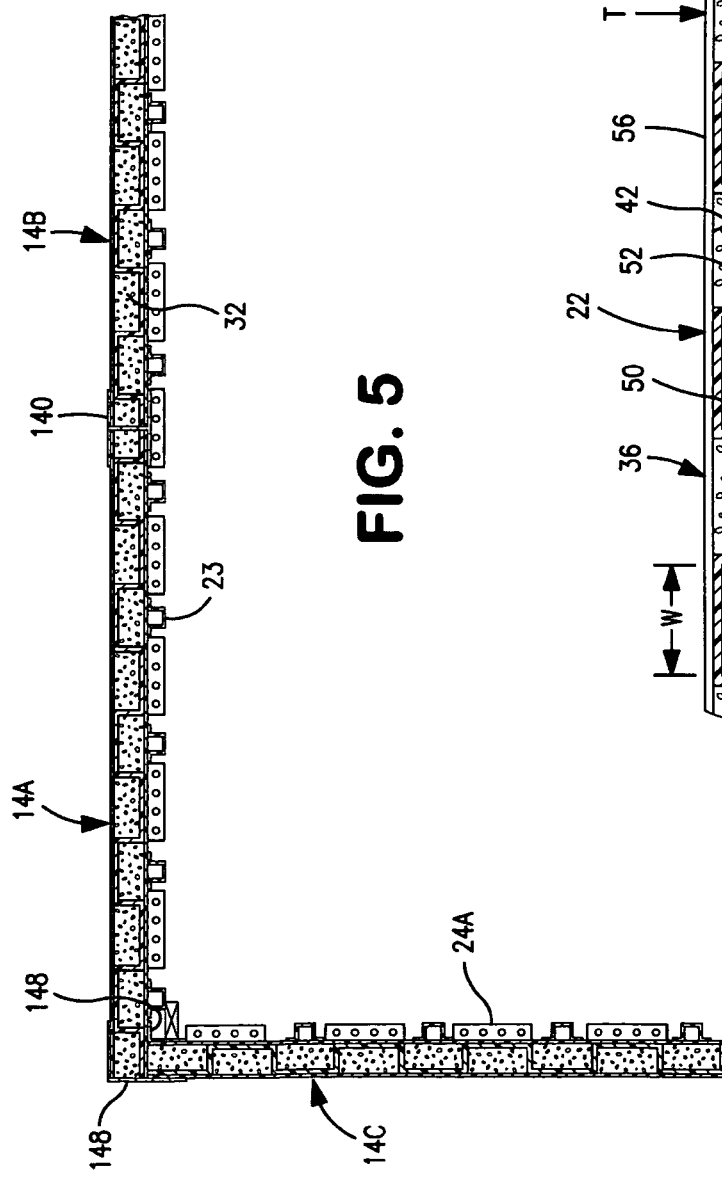
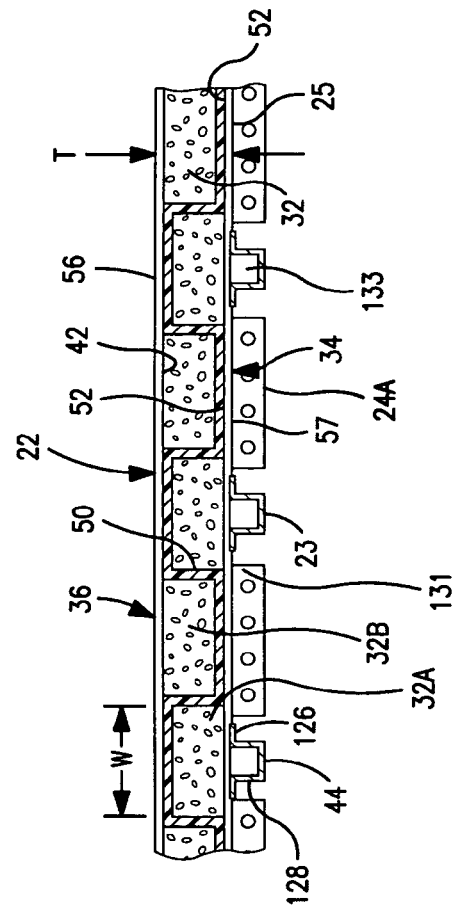
FIG. 5
FIG. 6

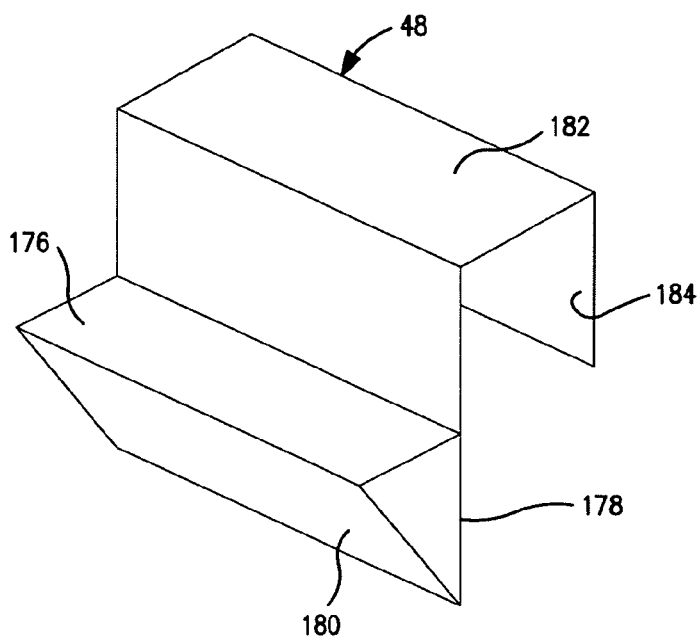
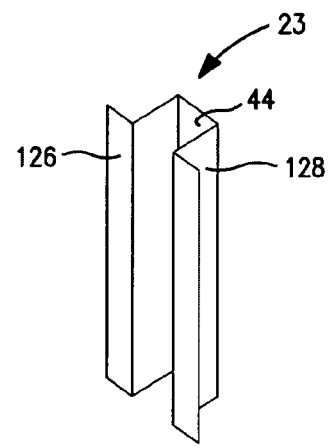
FIG. 8       FIG. 9
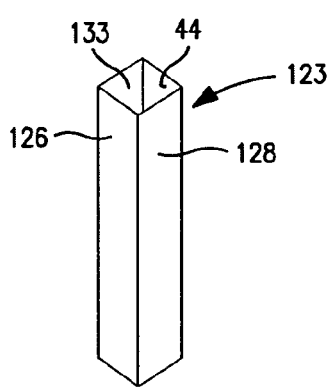
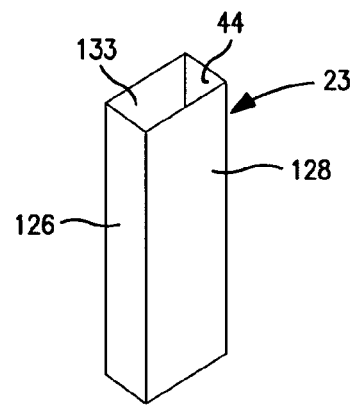
FIG. 10A       FIG. 10B

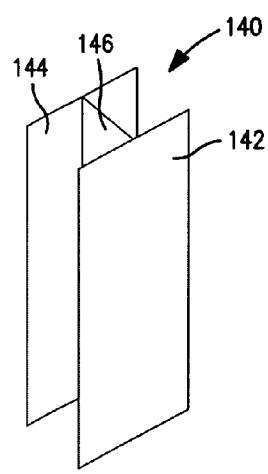
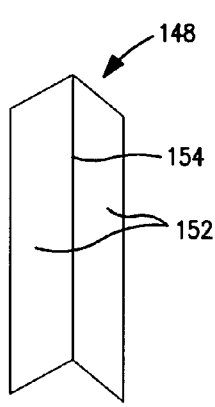
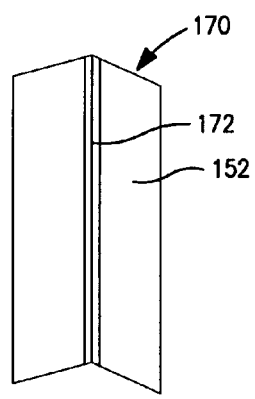
FIG. 11  FIG. 12  FIG. 13
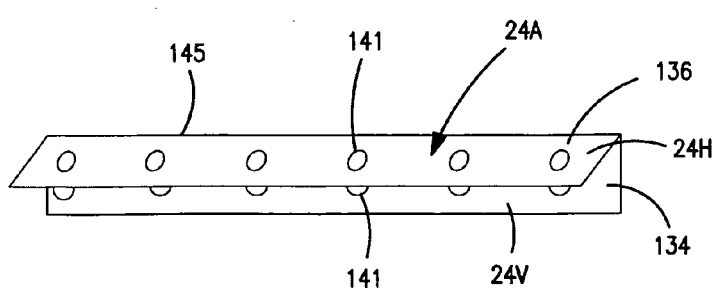
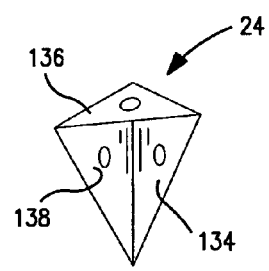
FIG. 14A  FIG. 14

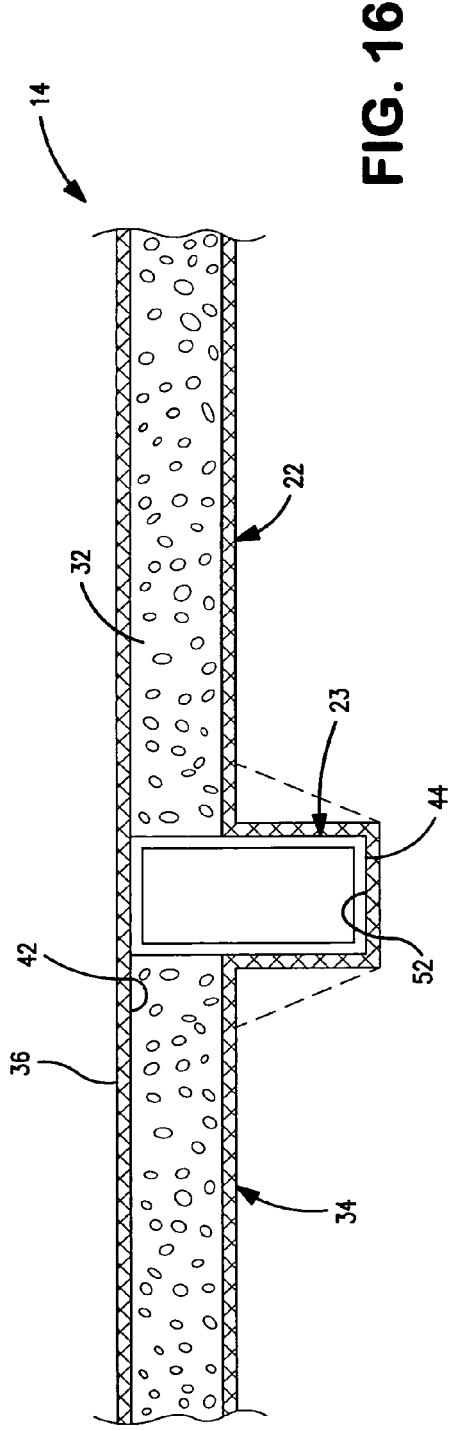
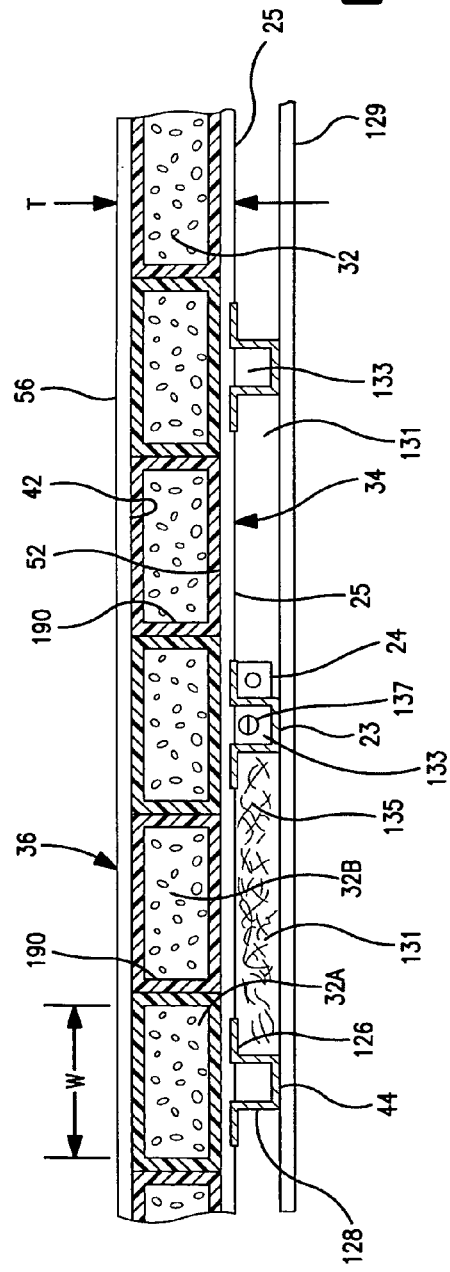

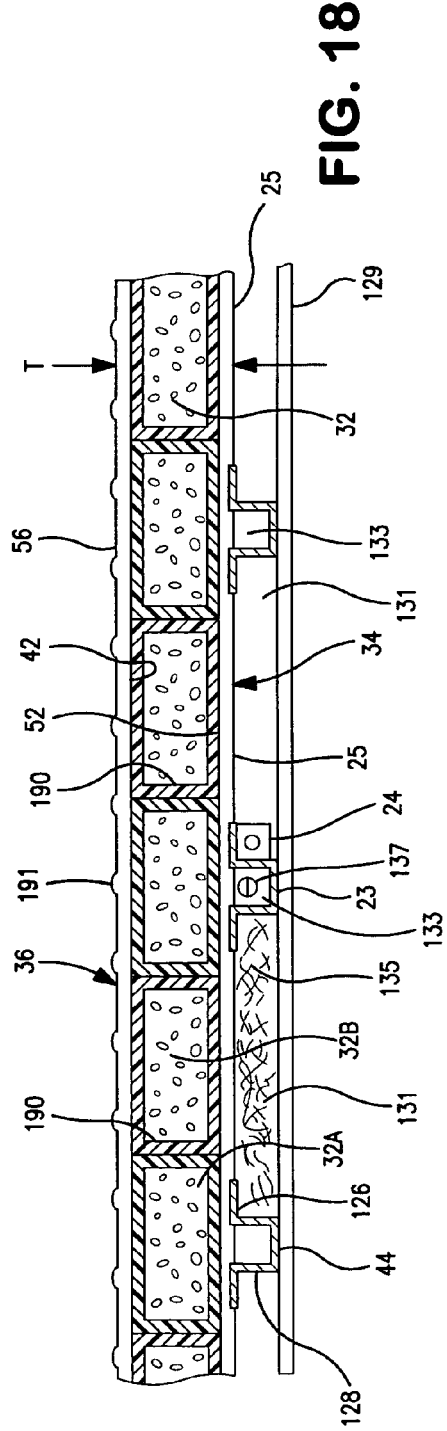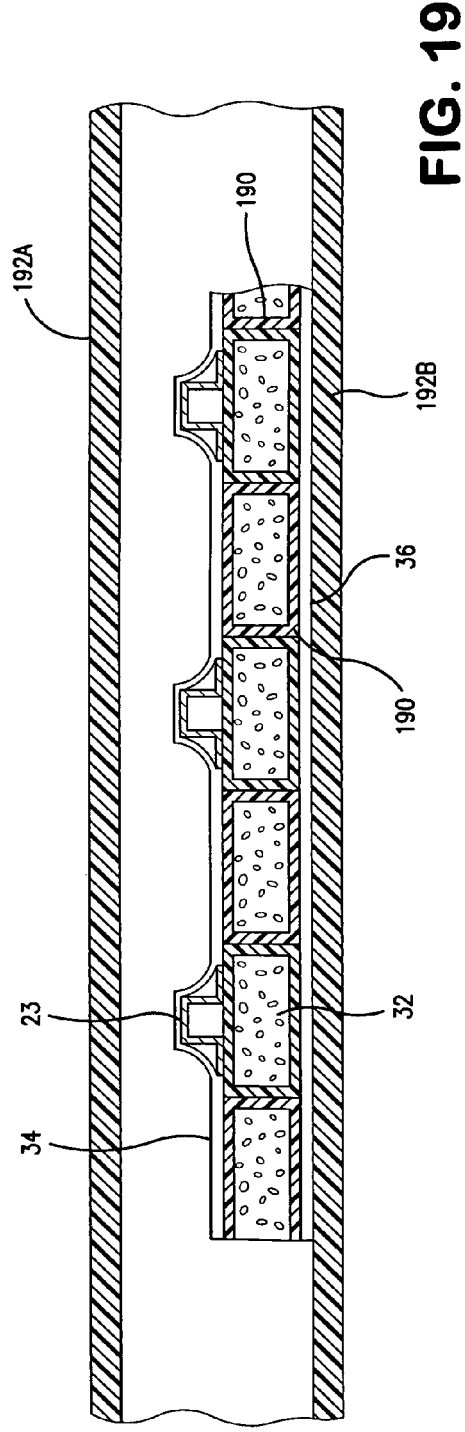

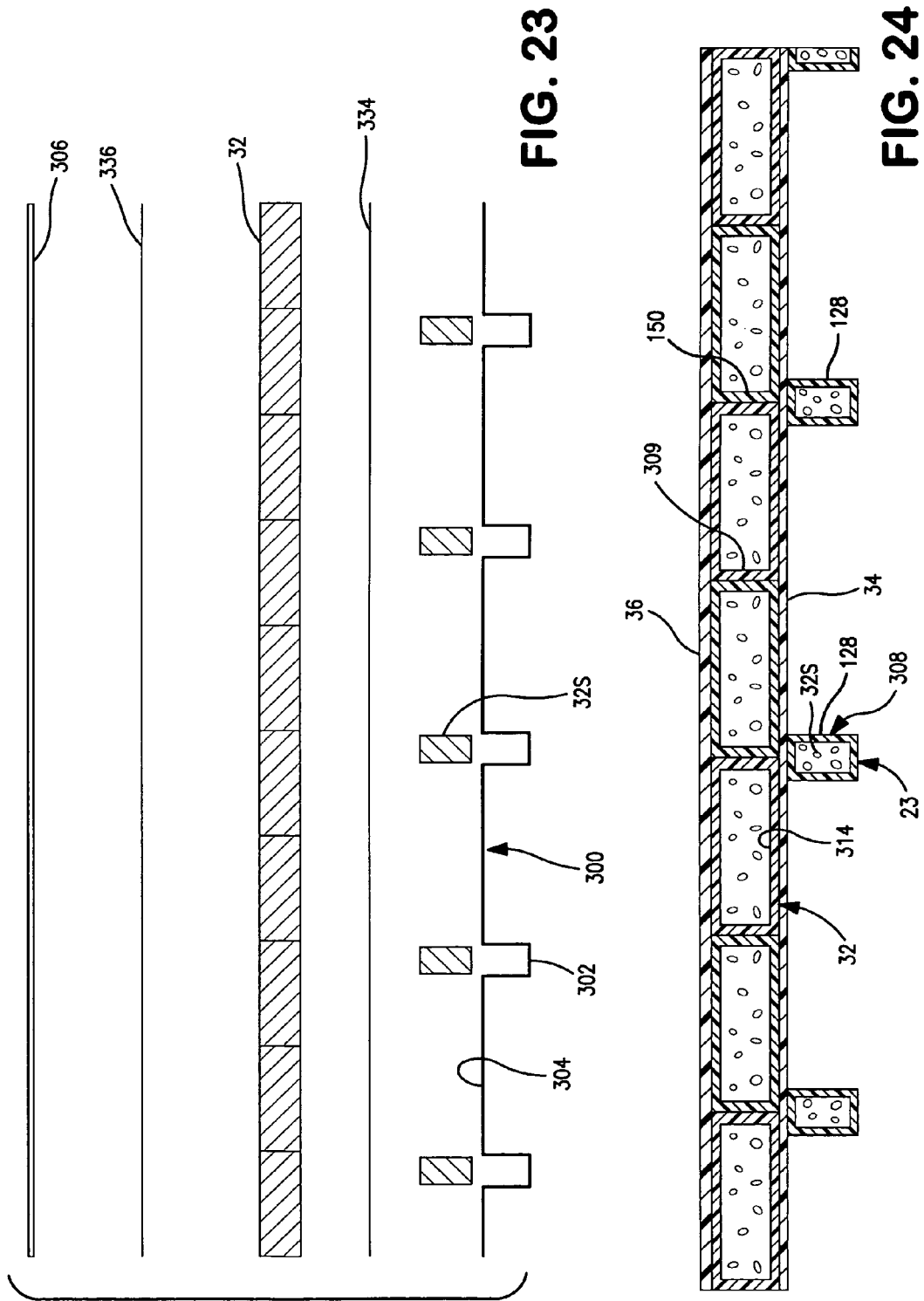

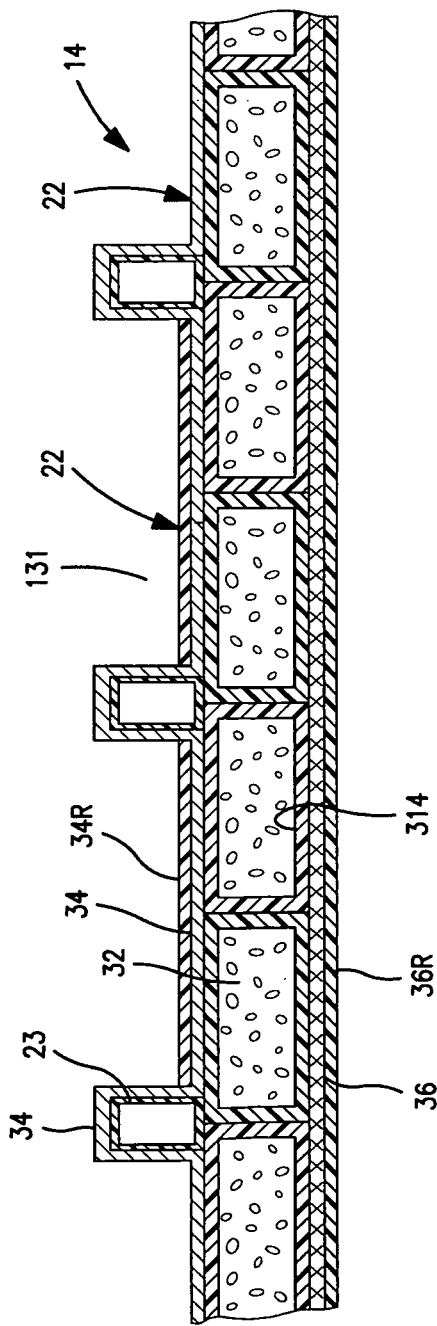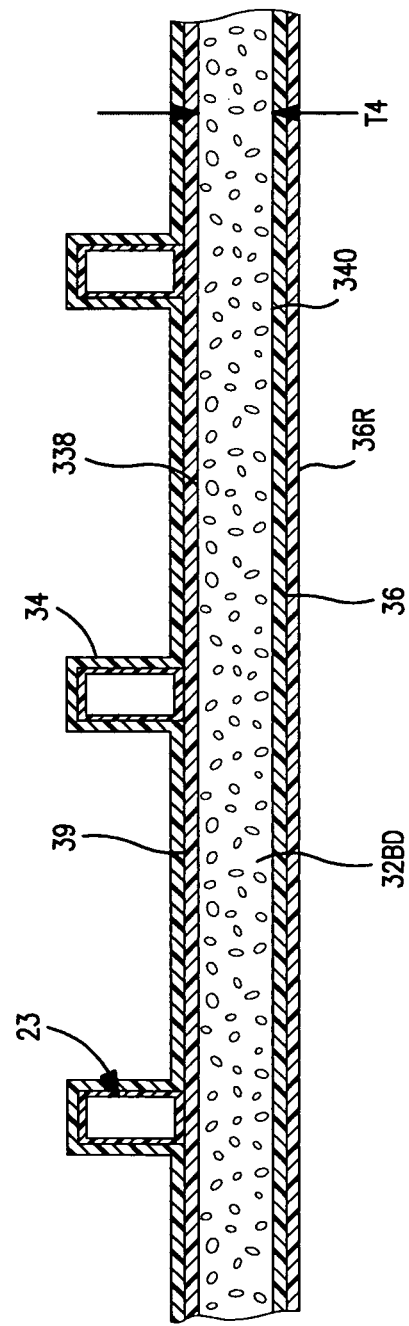

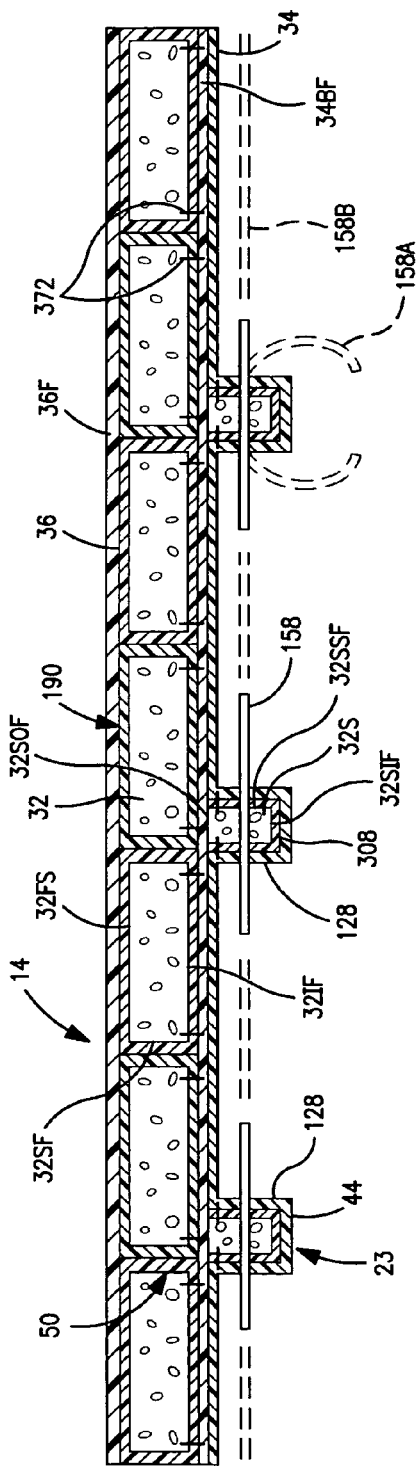
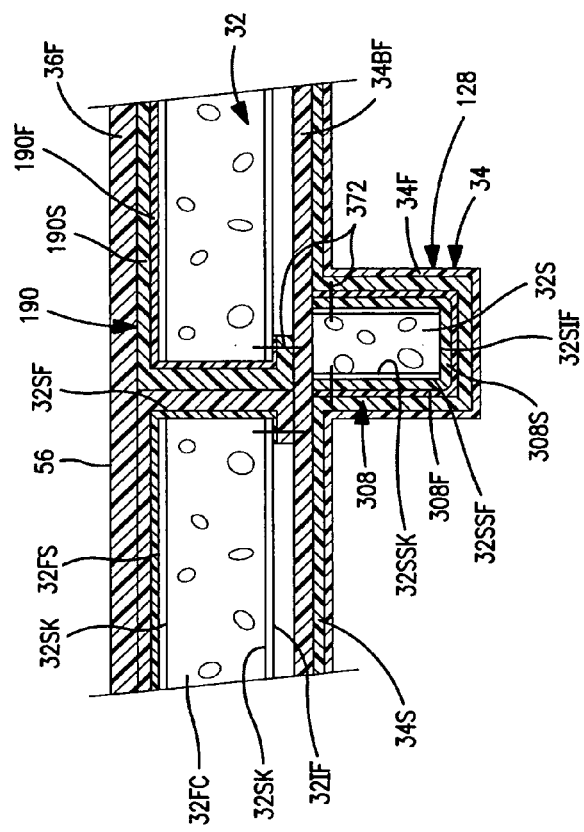
FIG. 28
FIG. 29

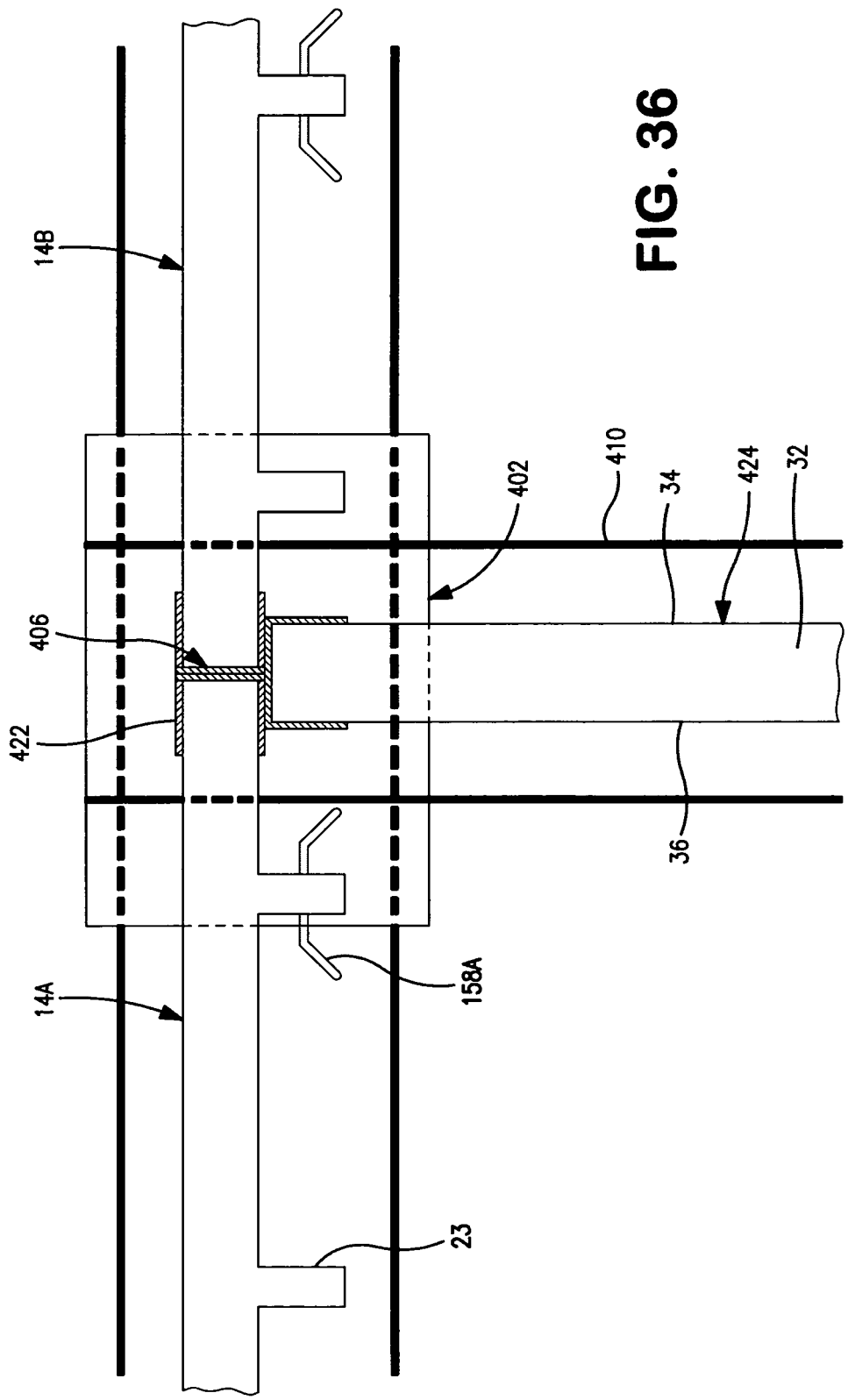

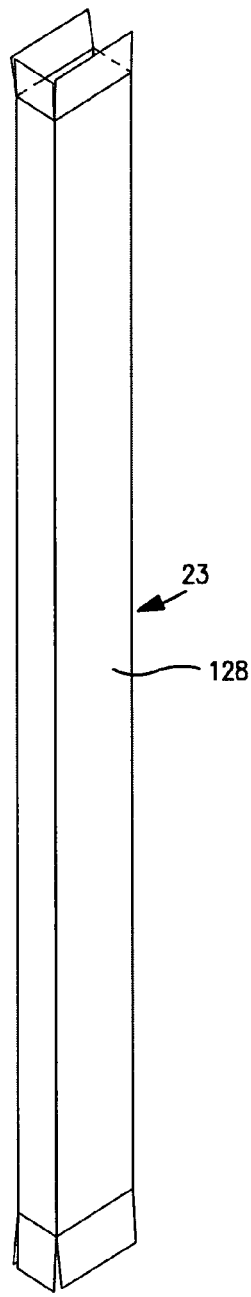 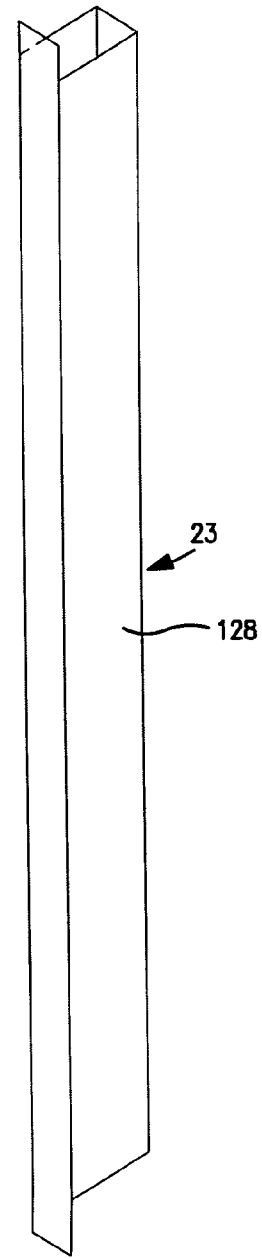
FIG. 37   FIG. 38

BUILDING PANELS

CROSS REFERENCES TO RELATED APPLICATIONS

This Application is a Non-Provisional of U.S. Provisional Patent Application Ser. No. 61/404,793, filed Oct. 8, 2010, the entirety of the preceding application being incorporated herein by reference in its entirety.

BACKGROUND OF THE INVENTION

This invention relates to building systems which largely replace the upright uses of concrete, whether ready-mix concrete or pre-fabricated concrete blocks, or other pre-fabricated concrete products, in construction projects. In general, the invention relates to enclosed buildings as well as other structures, and replaces the concrete in below-grade frost walls and foundation walls, and in above-grade walls. Such concrete structures are replaced, in the invention, with structures based on fiber-reinforced polymer materials (FRP) and the bottoms of such FRP walls may be integrated with a concrete footer/floor.

Certain improvements in building construction, including building panels, walls, buildings and appurtenances, methods of making building panels, and methods of constructing walls, wall systems, and buildings are taught in co-pending applications of common assignment as follows:
Ser. No. 11/901,174, filed Sep. 13, 2007;
Ser. No. 11/901,057, filed Sep. 13, 2007;
Ser. No. 11/900,987, filed Sep. 13, 2007;
Ser. No. 11/900,998, filed Sep. 13, 2007;
Ser. No. 11/901,059, filed Sep. 13, 2007;
Ser. No. 11/901,173, filed Sep. 13, 2007;
Ser. No. 11/901,175, filed Sep. 13, 2007;
Ser. No. 12/317,164, filed Dec. 18, 2008;
Ser. No. 61/571,290 filed Jun. 23, 2011;
Ser. No. 61/573,799 filed Sep. 12, 2011;
all of the above being incorporated herein by reference, in their entireties.

There is a need, in the construction industry, for additional improvements in light weight structural building panels and building systems incorporating such building panels. For example, generally continuous building panels of any desired length up to a maximum length per panel, may be selectable in length, in height, and in thickness, whereby such structural building panels may be used in applications where concrete is conventionally used in residential, commercial, and industrial construction. Such structural building panels should be strong enough to bear the primary compressive loads and lateral loads which are imposed on the underlying walls in a building enclosure or other building structure.

In light of severe wind conditions, which occur periodically in some locales, there is a need for building systems where overlying building structure is securely anchored to an underlying wall structure such as a foundation, whereby attachments between the underlying foundation and the overlying structure assist in preventing separation of the overlying structure from the foundation under severe wind conditions, and where the foundation wall is securely and automatically anchored to the footer by the process of creating the footer.

There is also a need for walls which are generally impermeable to water, including at joints in the wall.

These and other needs are alleviated, or at least attenuated, by the novel construction products, and methods, and building systems of the invention.

SUMMARY OF THE INVENTION

This invention includes light weight fiber-reinforced polymeric (FRP) structural building panels and panel assemblies, sized and configured for construction of non-portable wall structures permanently fixed to the ground, optionally tying overlying structure to an underlying footer through such panels and panel assemblies. In integrated building systems of the invention, the footer can include spaced footer components, with main footer components extending between and about the spaced footer components, and the footer and a floor at the footer level may be integrated, and the foundation wall may be part of a unitary structure fabricated by flowing fluid concrete under segments of the wall such that the lower portion of the wall is embedded in the concrete, while anchors from the wall extend into the space into which the concrete is being flowed. Extension flanges of the foundation wall, or mechanical fasteners tied to the foundation wall, can be used to tie the foundation wall to the underlying concrete, and to tie an overlying wall or floor to the foundation wall. Fiber schedule and orientation in the panels provide enhanced properties of strength of a panel/wall per unit dimension relative to mass of the panel/wall per unit dimension and/or quality of distribution of resin within the panel. Panel profiles as molded, and molds to make such profiles, enhance panel fabrication.

In a first family of embodiments, the invention comprehends a fiber-reinforced polymeric load-bearing building panel, the building panel having a height defined between a top and a bottom of the building panel when the building panel is in an upright orientation, a length, and a thickness, the load-bearing building panel comprising an outer fiber-reinforced polymeric layer, the outer layer defining an outwardly-facing surface of the building panel when the building panel is being used as a load-bearing part of a load-bearing wall of a building; an inner fiber-reinforced polymeric layer, the inner layer generally defining an inwardly-facing surface of the building panel when the building panel is being used as such load-bearing part of such load-bearing wall of such building; a plurality of foam blocks extending generally from the inner layer to the outer layer and from the top of the building panel to the bottom of the building panel, a given foam block having an outer surface disposed toward the outer layer, an inner surface disposed toward the inner layer, and opposing side surfaces; and at least one fibrous layer extending across, and covering, the outer surface, and across and covering, the opposing side surfaces, of the given foam block, and extending, from the side surfaces, onto and part way across the inner surface of the given foam block, and thereby defining a substantial distance between opposing ends of the at least one fibrous layer at the inner surface of the given foam block, the fibrous layer being secured to the inner surface of the given foam block at or adjacent the respective ends of the fibrous layer.

In some embodiments, the at least one fibrous layer comprises a first structural sub-layer, and a flow-control layer between the first structural sub-layer and the outer surface of the given foam block.

In some embodiments, the fibrous layer is secured to the given foam block by fasteners which are driven through both the structural sub-layer and the flow-control sub-layer, and are further driven into the given foam block.

In some embodiments, at least about 70 percent by weight of the fiber in the first structural sub-layer extends continuously along a path in a direction progressing between the top and the bottom of the building panel.

In some embodiments, at least about 60 percent by weight of fiber in the first structural sub-layer traverses a path between the top and the bottom of the building panel, along an angle of no more than 15 degrees from a vertical path through the building panel when the building panel is in an upright orientation.

In a second family of embodiments, the invention comprehends a fiber-reinforced polymeric load-bearing building panel, the building panel comprising an outer fiber-reinforced polymeric layer, defining an outwardly-facing surface of the panel when the panel is being used as a load-bearing part of a load-bearing wall of a building; an inner fiber-reinforced polymeric layer, generally defining an inwardly-facing surface of the panel when the panel is being used as such load-bearing part of such load-bearing wall of such building; one or more blocks of foam material between the inner and outer layers; a plurality of fiber-reinforced studs interfacing with the inner layer and spaced along the length of the building panel and extending away from the outer layer, a given stud comprising a stud substrate having a distal end remote from the foam blocks and a proximal end adjacent the foam blocks, and first and second sides extending between the distal end and the proximal end; and at least one fibrous layer extending across the distal end of the given stud substrate, and extending across the sides of the given stud substrate, and terminating proximate the proximal end of the stud substrate, the at least one fibrous layer being secured to the stud substrate at or adjacent the proximal end of the given stud substrate.

In some embodiments, the at least one fibrous layer is secured to the stud substrate at or adjacent the proximal end of the given stud substrate, by mechanical fasteners which extend through the at least one fibrous layer and into the stud substrate.

In a third family of embodiments the invention comprehends a fiber reinforced polymeric building panel, the panel comprising an outer fiber-reinforced polymeric layer, defining an outwardly-facing surface of the building panel when the building panel is being used as a load-bearing part of a load-bearing wall of a building; an inner fiber-reinforced polymeric layer, generally defining an inwardly-facing surface of the building panel when the building panel is being used as such load-bearing part of such load-bearing wall of such building; one or more blocks of foam material between the inner and outer layers, the one or more blocks of foam material spacing the inner and outer layers from each other, at least one of the inner and outer layers being defined at least in part by a first sub-layer wherein at least about 70 percent by weight of fiber in the first sub-layer extends along paths continuously progressing between the top and the bottom of an uprightly-oriented such building panel, a second sub-layer disposed between the first sub-layer and the one or more blocks of foam material, and a third sub-layer disposed outwardly, in the building panel, of the first sub-layer, wherein the first sub-layer comprises at least five times as much fiber by weight as either of said second or third sub-layers, and wherein fibers of the second and third sub-layers extend along paths progressing other than continuously between the top and the bottom of the building panel such that, prior to fluid resin being cured as part of the process of fabricating the building panel, liquid resin flows preferentially along and through the second and third sub-layers as compared to flow of such liquid resin along and through the first sub-layer.

In some embodiments, the first sub-layers in said inner and outer layers comprise about 45-ounces per square yard to about 55-ounces per square yard unidirectional fiber extending continuously along a path between the top and the bottom of the building panel and wherein at least one of the second and third sub-layers comprises about 1-ounce per square yard to about 10-ounces per square yard of fiber, either oriented transversely to the unidirectional fiber in the first layer or extending in random directions within the confines of the respective sub-layer.

In some embodiments, the building panel further comprises a plurality of fiber-reinforced polymeric studs on an inner side of the building panel in combination with the inner layer, the studs being spaced along the length of the building panel and extending away from the outer layer, a given stud comprising a stud substrate proximate the at least one foam block and having a distal end remote from the at least one foam block and a proximal end adjacent the at least one foam block, and first and second stud substrate sides extending between the distal end and the proximal end of the respective stud, the first and second sub-layers of the inner layer extending about the studs, and a stud wrap layer extending across the distal end of a given stud and extending between the distal end and the proximal end, and terminating proximate the proximal ends of the stud substrate side walls, the stud wrap layer comprising a fourth sub-layer wherein at least about 60 percent by weight, optionally at least about 70 percent by weight, of fiber in the fourth sub-layer extends along paths continuously progressing between the top and the bottom of an uprightly-oriented building panel, and a fifth sub-layer disposed between the fourth sub-layer and the first sub-layer of the inner layer, wherein the fourth sub-layer comprises at least 5 times as much fiber by weight as the fifth sub-layer, and wherein the fifth sub-layer extends along paths progressing other than continuously between the top and the bottom of the building panel such that, prior to fluid resin being cured as part of fabricating the building panel, liquid resin flows preferentially along and through the fifth sub-layer as compared to flow of such liquid resin along and through the fourth sub-layer.

BRIEF DESCRIPTION OF THE DRAWINGS

FIG. 2 is a fragmented interior view of a section of one of the upstanding wall structures shown in FIG. 1.

FIG. 3 is an elevation-view cross-section of the upstanding wall structure taken at 3-3 of FIG. 1.

FIG. 4 is an outside elevation representation of the upstanding wall structure of FIG. 3.

FIG. 5 is a plan-view cross-section of a portion of a foundation wall of the invention.

FIG. 6 is an enlarged plan-view cross-section of a portion of the foundation wall structure of FIG. 5.

FIG. 8 is a pictorial line rendering of a resin-fiber composite support bracket, which may be mounted to the top of a foundation wall of the invention, and used for positioning other building structure relative to the wall.

FIG. 9 is a pictorial line rendering of a channel stud which can be incorporated into a building panel of the invention as illustrated in e.g. FIGS. 5-7.

FIGS. 10A and 10B are pictorial line renderings of second and third embodiments of studs which can be incorporated into building panels of the invention.

FIG. 11 is a pictorial line rendering of a resin-fiber composite "H" connector which is used to connect first and second building panels/wall sections to each other along a straight path.

FIGS. 12 and 13 are pictorial line renderings of resin-fiber composite angle brackets which can be used on inner and/or outer surfaces of a wall section, connecting first and second wall sections to each other at selected angles.

FIGS. 14 and 14A are pictorial views of exemplary right-angle plate anchor brackets useful at the tops and bottoms of building panels of the invention e.g. for securing the panels to underlying structure and securing overlying and/or weight-bearing or weight-transferring structures to the building panel.

FIG. 16 shows a plan view cross-section of a wall section using studs which extend to the outer layer.

FIG. 17 shows a plan view cross-section of an upstanding building panel where foam blocks, between the inner and outer layers, are wrapped in layers of fiber.

FIG. 18 shows a cross-section as in FIG. 17, illustrating a ribbed outer layer.

FIG. 19 illustrates a fragmentary end elevation view of a building panel pre-form in a vacuum bag molding process being used to fabricate a building panel with foam blocks, wrapped in fiber as in FIG. 17, and an inner layer overlying the studs as illustrated in FIG. 15.

FIG. 23 illustrates, in line representation, vacuum infusion apparatus for making a building panel of the invention, which building panel has studs extending from the inner surface thereof.

FIG. 24 shows a cross-section of a building panel incorporating fiber-wrapped foam blocks as studs.

FIG. 26 shows a cross-section of a building panel wherein fiber-wrapped foam blocks are disposed between the inner and outer layers, wherein the second outermost layer overlies the studs, wherein reinforcement layers are added over the otherwise first and second outermost layers.

FIG. 27 shows a cross-section of a building panel of the invention having no intercostals, a first reinforcement layer over the otherwise first outermost layer, a second reinforcement layer between the foam panel and the second outermost layer, and the second outermost layer overlying the studs and the second reinforcement layer.

FIG. 28 shows an enlarged plan-view cross-section of a portion of another embodiment of wall structure of the invention.

FIG. 29 is a further enlarged cross-section view of a portion of the wall structure of FIG. 28, showing additional detail.

FIG. 36 is a top view of a straight wall section, intersected by an abutting wall.

FIGS. 37 and 38 illustrate studs which include top and bottom mounting flanges.

Figure 1:
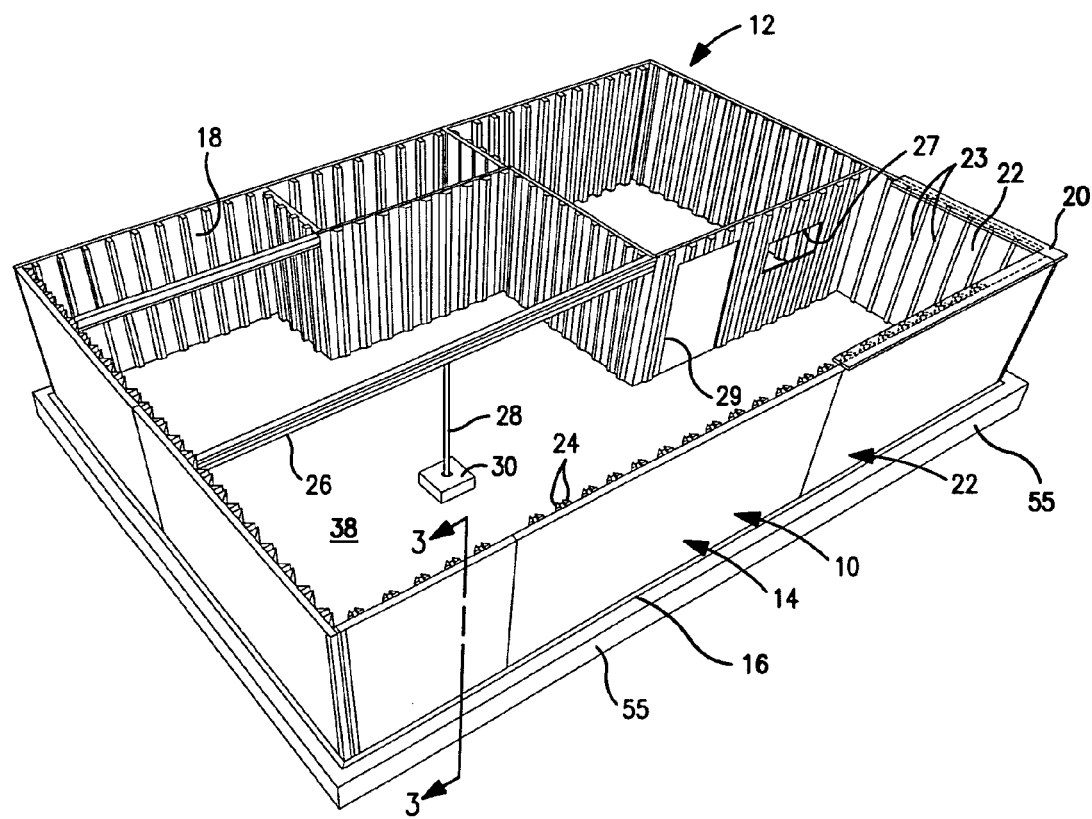
FIG. 1 shows a representative pictorial view, with parts removed, of a building foundation wall fabricated using elements, and building system structures, of the invention.

The invention is not limited in its application to the details of construction, or to the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring to FIG. 1, a plurality of interior and exterior foundation walls 10 collectively defines the foundation 12 of a building. Each foundation wall 10 is defined by one or more foundation building panels 14. In the illustration, a foundation building panel 14 is shown to include a bottom plate 16, and further includes an upstanding wall section 18, and a top plate 20. Each upstanding wall section 18 includes a main-run wall section 22, and uprightly-oriented reinforcing studs 23 affixed to, or integral with, the main-run wall section, the studs being regularly spaced along the length of the wall section, and extending inwardly of the inner surface of the main run wall section. In the embodiment illustrated in FIG. 1, anchoring brackets 24 are mounted to the studs at the tops and bottoms of the wall section, thus to assist in anchoring the bottom plate and the top plate, and/or any other attachment, to the wall.

As illustrated in FIG. 1, conventional e.g. steel I-beams 26 can be mounted to the wall sections, as needed, to support spans of overlying floors. Such steel I-beam can be supported at one or more locations along the span of the I-beam, as needed, by support posts 28 and rigid footer pads 30, which may be embedded in a concrete slab floor 38.

Referring now to FIGS. 3, 5, and 6, the main run wall section 22 of the building panel is generally defined between the inner surface 25 and the outer surface 56 of the building panel, without considering that portion of the thickness of the wall which is defined by stud 23. The main run wall section of the panel thus generally includes a foam core 32, an inner fiberglass layer 34 and an outer fiberglass layer 36. The fiberglass layers 34, 36 are fiberglass-reinforced polymer (FRP), also known as polymer-impregnated fiberglass. Outer layer 36 represents a first outermost layer of the building panel. Inner layer 34 represents a second opposing outermost layer of the building panel. The foam core can be foamed-in-place thermally insulating material between pre-fabricated inner and outer layers, or can be made from pre-fabricated blocks of thermally insulating foam material. The foam blocks are assembled with the remaining elements of the respective building panel as described in further detail hereinafter. Bottom plate 16 and top plate 20 can be secured to the main run wall section with the support of wedge-shaped brackets 24 (FIGS. 2, 3, 14), or elongate angle-shaped brackets 24A (FIGS. 6, 7, 7B, 14A).

Elongate angle bracket 24A resembles a conventional angle iron and may be a length of angle iron. For sake of material consistency, an FRP composition, similar to that of e.g. inner and outer layers 34, 36 may be used in an angle bracket 24A, and has sufficient rigidity to support the overlying structure in a generally angularly-constant relationship as the overlying structure is supported by the underlying building panel. As used in an upright building panel 14, angle bracket 24A has a vertical leg 24V and a horizontal leg 24H, the two legs 24V, 24H meeting at the apex of the angle formed by the two legs. Angle bracket 24A has an elongate length which generally extends up to the length of the panel between adjacent studs 23. Thus, where the distance between adjacent studs is 14.5 inches, length of the angle bracket is typically about 8-13 inches. A plurality of holes, extending through each of the legs 24V, 24H, are spaced along the length of the bracket.

At the top of the panel, bracket 24A is used to secure the overlying building structure to panel 14. Thus, one or more bolts 139 (FIG. 7) extend through the horizontal leg 24H of the bracket, through any cap or bracket which overlies the building panel, and into or through the top plate 20, thus securing the top plate to bracket 24A. Bracket 24A is shown secured to the panel by screws 139S which extend through vertical leg 24V and through inner layer 34 of the building panel. Adhesive can be used instead of screws 139S to secure vertical leg 24V to the wall panel.

Bottom plate 16, where used, can be a fiber-reinforced, e.g. fiberglass-reinforced, polymeric structural member, of such dimensions as to be sufficiently rigid, and having sufficient strength, to support both the foundation wall and the overlying building superstructure, from an underlying fabricated base and to spread the weight of the overlying load over the natural support base, within the weight-bearing limits of the natural support base. Such fabricated base can be e.g. a settled bed 53 (FIG. 7) of stone aggregate, a conventional concrete footer 55 (FIG. 3), or other suitable underlying fabricated supporting base. The specific structural requirements of bottom plate 16, as well as the footer, depend on the loads to be applied.

The bottom plate, where used, can be attached to the upstanding wall section by brackets 24A using e.g. steel bolts or screws which extend through vertical leg 24V of the bracket and into and through inner layer 34, and through the horizontal leg 24H and into and through the bottom plate. Adhesive can be used instead of screws or bolts to secure vertical leg 24V to the wall panel. A wall system which includes a bottom plate can be used without a footer. In such instance, the bottom plate is sufficiently wide, thick, dense, and rigid, to provide effective compression and bending support normally attributed to the footer. Thus, whether bottom plate or footer, the structure between the load and the natural base distributes the overlying load over a sufficiently wide area of the underlying base that load per unit area exerted on the underlying base is no more than the load capacity of the underlying base such that the underlying base can support the building load for an indefinite period of time without substantial vertical or lateral movement of the underlying base. Where a footer is used in combination with the bottom plate, the bottom plate need not have as large an area because the footer takes over the function of load distribution to the underlying base.

The bottom plate typically extends laterally inwardly into the building beyond the primary surface 25 of inner layer 34 at the main run wall section, and may extend by a distance corresponding to at least the thickness of the building panel which includes studs 23, whereby the area of the bearing surface presented to the footer or the underlying support base where no footer is used, including the load presented by studs 23, distributes the overlying load at least over the area of the footprint of the wall as well as over the area represented by the cavities between studs 23.

The top plate is sufficiently wide, thick, and rigid to provide a support surface, interfacing with the underlying upstanding wall section, and distributes the load of the overlying building structure, at least regionally, along the length of the wall. The top plate can conveniently be made from fiber-reinforced polymeric material, or from conventional dimension wood lumber whereby overlying building structures can be conventionally attached to the underlying foundation wall structure at the building site by use of conventional fasteners, conventionally attached to the top plate.

Figure 7:
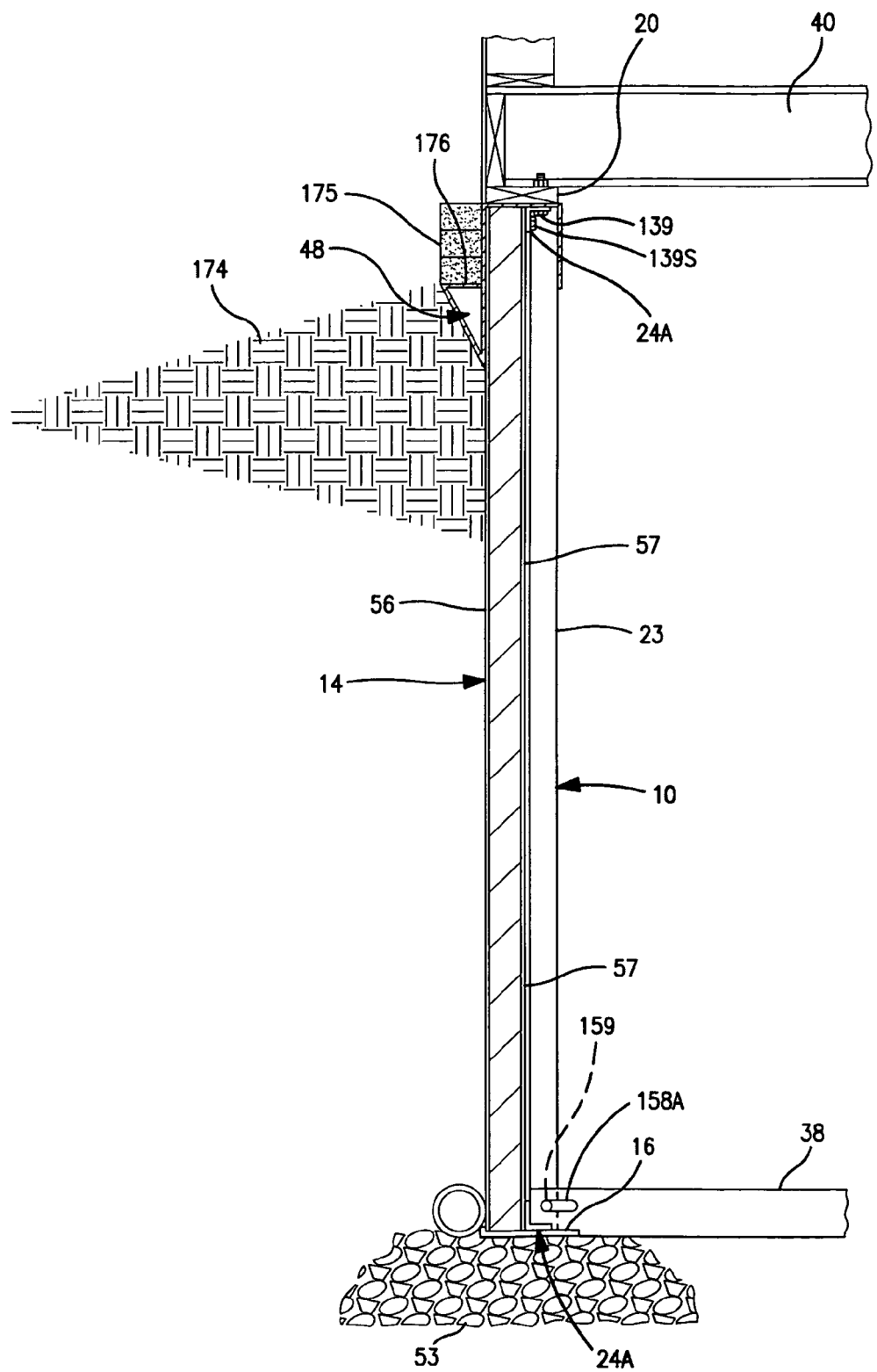
FIG. 7 is an elevation view cross-section of the foundation wall structure illustrated in FIGS. 5 and 6.

Referring to FIGS. 1, 3, and 7, once the foundation wall 10 is in place as illustrated in FIG. 1, on a suitable footer (e.g. 53, 55), a conventional ready-mix concrete slab floor 38 can be poured. The concrete slab floor extends over, and thus overlies, that portion of any bottom plate 16 which may underlie the foundation wall, and extends inwardly from any of the inner surfaces of the building panels, including both the inner surfaces of the main run wall section and the inner surfaces of studs 23. Namely, the concrete slab floor extends to, and abuts against, the inner surfaces of the respective upstanding wall sections 18 at inner layers 34 and at studs 23. Accordingly, once the concrete slab floor is cured, inwardly-directed lateral forces, imposed by the ground outside the building, at the bottom of the wall, are absorbed by the structural e.g. lateral compressive strength of the concrete floor slab 38 in support of foundation wall 10, as the edge of the slab abuts the inner surface of the foundation wall.

Inwardly-directed lateral forces which are imposed on the foundation wall at or adjacent top plate 20 are transferred to main floor 40 of the building (FIGS. 3, 7) e.g. through angle bracket 24, 24A and/or bolts 139 or screws. In the embodiments illustrated in e.g. FIGS. 3 and 7, the force passes from the wall to the top plate, from the top plate to the floor joists or trusses, with some of the force potentially transferring into the sub-flooring and/or finished flooring.

Still referring to the main run wall section 22 (FIGS. 1, 3, and 6), and considering the structural environment of typical 1-story and 2-story residential construction, inner layer 34 and outer layer 36 are e.g. between about 2.5 mm and about 6.3 mm (between about 0.1 inch and about 0.30 inch) thick. Typical thicknesses of the inner and outer layers are about 0.12 inches to about 0.19 inches, optionally about 0.13 inches to about 0.16 inches. Thicknesses of the inner 34 and outer 36 layers per se are generally constant between respective ones of the studs 23.

FIG. 18 shows the outermost layer of panel 14 including upwardly-extending ribs 191 which enhance the lateral bending resistance capacity of the wall, thus the ability to withstand the imposition of laterally-directed loads on the wall. Inner layer 34 can be provided with similar ribs 191 to provide even more lateral loading strength. Ribs 191 typically are additive to the nominal thickness of layer 34 or 36, and add e.g.

about 0.5 mm to about 2 mm to the overall thickness of the respective layer at the rib location. In the alternative, the respective layer 34 or 36 can have recesses on its inner surface, opposite ribs 191 of the outer surface of the respective layer whereby the layer generally maintains its nominal thickness at ribs 191.

In the embodiments illustrated in FIGS. 1-6, studs 23 run the full height of the main run wall section, and extend from inner layer 34 inwardly, and away from outer layer 36, a desired distance so as to provide the desired level of structural strength to building panel 14, as well as to provide a desired depth to channels 131 between end panels 44 of the studs and surface 25 of inner layer 34.

Figure 15:
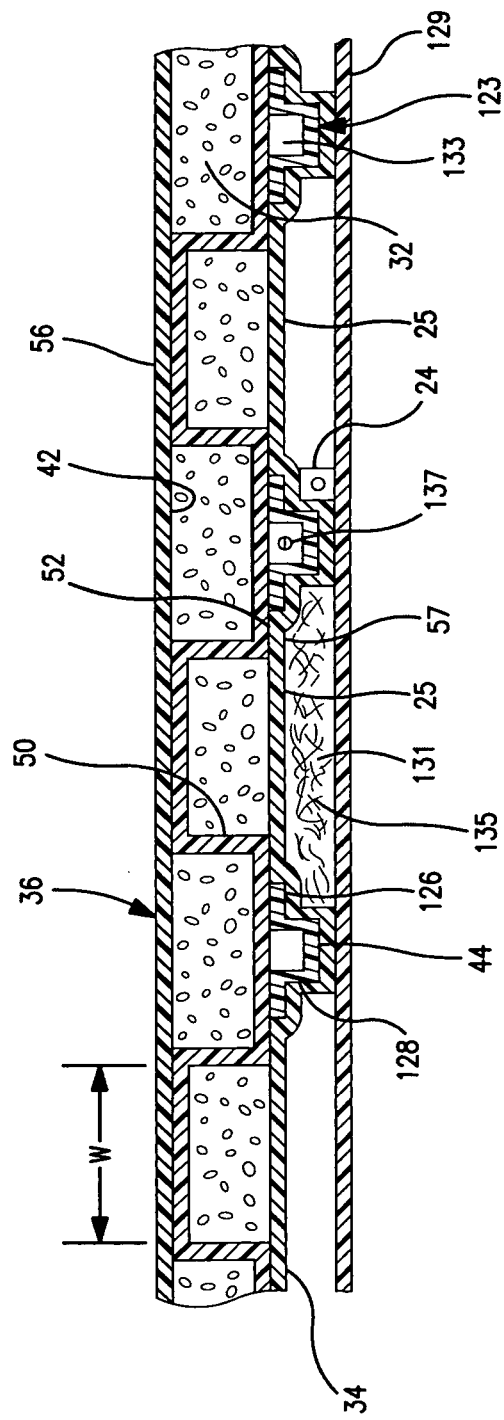
FIG. 15 shows a plan view cross-section of an embodiment of building panels of the invention wherein channel studs are between the inner layer and foam blocks.

In the embodiments illustrated in FIGS. 15-16, inner fiberglass layer 34 is wrapped around end panels 44 of the studs. The wrapping of the fiberglass layer over the studs as illustrated in e.g. FIG. 16 incorporates the stud into the unity of the structure of the main run wall section, whereby additional bending resistance strength of the stud in resisting a lateral force is added to the bending resistance of the inner layer, which significantly enhances the overall bending resistance strength of the wall section. Thus, one function of studs 23 is their service as reinforcing elements in building panel 14.

Studs 23 can be conventional wood e.g. 2×4 or 2×6 studs, or can be made by wrapping e.g. concentric layers of e.g. resin-impregnated fiberglass sheet on itself until the desired cross-sectional shape is obtained, and impregnating the fiberglass layers with a curable resin. As other illustrative embodiments, studs can be fiber-reinforced polymeric structures or conventionally-available elongate steel stud profiles known in the trade as "steel studs". As fiber-reinforced structures, there can be mentioned 3-sided rectangular-shape structures as in FIGS. 6 and 17, or 4-sided closed rectangular structures as in FIG. 26. The studs can be hollow as in FIGS. 6 and 17, or can be filled with thermally-insulating foam as in FIG. 28. In the alternative, the stud can be made by wrapping one or more fiber layers around a foam mandrel/core. Steel studs can be shaped, for example and without limitation, as C-shape, H-shape, I-shape, closed rectangle, or other known or novel profiles.

The stud can be mounted to the panel at inner layer 34 as illustrated in FIGS. 6 and 17, or to an intermediate layer adjacent inner layer 34 as illustrated in FIG. 27, or can be mounted to outer layer 36 and extend through the panel to, and past, inner layer 34 as in FIG. 16. All such studs provide an elongate structural profile extending along the height of the panel, and which elongate structural profile provides desired structural and spacial properties.

Referring to FIGS. 1-4, in general, the inner and outer layers of the wall section are illustrated as fiberglass-reinforced resin layers, full height and full length of the wall section. The inner and outer layers 34, 36 are e.g. about 2.5 mm to about 6.3 mm thick, optionally about 2.5 mm to about 4.8 mm thick. The foam between layers 34, 36 is represented, in such embodiments, by unitary blocks of foam which extend the full height of the panel and fill the entirety of the space between the inner and outer layers 34, 36, except where the studs 23 or reinforcement members 50 fill space between the inner and outer layers; with foam filling all other space between layers 34 and 36.

Any top plate or bottom plate can be made from conventional e.g. wood materials, with suitable waterproofing as appropriate for the intended use. Such wood can be treated to inhibit growth of wood-consuming organisms. In order to avoid issues of potential deterioration of the wood as a result of the wood contacting moisture, typically the bottom plate, when used, is a fiberglass-reinforced resinous composite, for example a pultruded plate, of sufficient thickness, width, and rigidity to provide the level of weight bearing capacity, and weight-distribution rigidity, anticipated as being appropriate, for supporting the overlying structure to be supported. However, in some embodiments, the bottom of the wall structure is placed directly on the footer, whereby no bottom plate is used.

As used herein, all fiberglass/resin composite structures, such as inner layer 34, outer layer 36, bottom plate 16, top plate 20, studs 23, and the like, can be fabricated using known techniques of dry or pre-impregnated fiberglass blanket manipulation and construction, including resin impregnation of such materials, chop spray processes, vacuum infusion processes, pultrusion, or other processes known for making fiber-reinforced composites, in order to make the desired 3-dimensional shapes. Such techniques can be used, for example, to make building panel 14, bottom plate 16, top plate 20, studs 23, brackets 24, 24A, 140, 148, 170, and the like.

Structural building panels of the invention can be manufactured in any standard dimensional sizes, as well as in custom size combinations desired for a particular building project. Thus, for example and without limitation, such panels can have heights of about 3 feet to about 5 feet, typically about 4 feet, which accommodates use of the panels in frost walls and crawl spaces; or height of about 8 feet to about 10 feet, typically about 9 feet, which accommodates use of the panels in standard-height basement walls and standard-height above-grade walls.

Wall section thickness "T" (FIG. 6), and thus the panel thickness, in the main-run wall section is defined without respect to the dimensions of studs 23, and generally stops at the surface 25 of what is later defined herein as space 131 between the studs 23. Thickness "T" can be as little as about 2 inches between the inner and outer surfaces of the wall, to as much as about 8 inches or more, as measured between the outer surface 25 of layer 34 and the outer surface 56 of layer 36. Wall thickness "T" is more typically about 3 inches to about 6 inches, more typically about 3 inches to about 5 inches.

Studs 23 can extend inwardly from such nominal dimensions. Such stud depth is typically at least 3 inches. Such typical stud depth assists in providing desired bending resistance and vertical crush resistance, as well as in providing desired thermal insulation properties, and is instrumental in urging the wall to flex outwardly, against the lateral soil load when loaded with a downwardly-directed overlying load. Additional bending resistance can be obtained through the use of studs which have even greater depths, or greater width, inward from the inner layer. Further, additional thermal insulation properties can be obtained by adding conventional insulation material 135 between studs 23 at the inner surface of the panel as illustrated in FIGS. 15 and 17.

Typically, thickness "T" greater than 8 inches is not needed in order to satisfy structural demands or thermal insulation demands of a typical low-population-density residential building. However, in some instances, where additional thermal or structural demands are to be imposed on the building panels, then thickness greater than 8 inches is contemplated.

Length of a panel 14 is limited only by transportation capabilities. For example, such panel can be as long as the length of the truck bed which will transport the panel to the construction site. Thus, length is generally limited to about 40 feet, but can be shorter as suggested by a particular construction project requirement, or longer where suitable transport is available. Relatively longer panels can be cut for length. Typical lengths of the panel, as contemplated to be manufactured in mass production, are about 6 feet and about 40 feet, and where transportation is not a limitation, about 50 feet, about 60 feet, about 70 feet, about 80 feet, and all length increments between about 6 feet and about 80 feet. However, since an advantage of the panels is limited weight such that the panels can be installed below grade and at grade level with use of only a light-duty crane, length is in some embodiments limited to lengths which can readily be handled by such light duty crane.

In the case of highly segmented walls, relatively shorter wall segments can be desired whereby the lengths of the panels may be relatively shorter. Thus, panels as short as about 4 feet, about 6 feet, about 8 feet, about 10 feet, about 15 feet, about 20 feet, and about 25 feet are contemplated, still with minimum of 3-5 feet in height, and optionally about 8-10 feet in height, in order to perform either as a frost wall or as a full-height first story, e.g. foundation, wall.

The structural building panels of the invention provide a number of advantages. For example, the panels can be manufactured in a continuous length, and cut to any desired length for shipping, which may be a generic length, for example 10 feet, or 20 feet, or 40 feet, or whatever length or lengths is or are desired. The length needed for a particular portion of a building wall can be cut from a generic-length building panel, at the construction site, to meet specific needs, or can be cut to specific length at the panel manufacturing site, or at situs of a fabricator or other distributor. Thus if a shorter length is needed for a particular portion of the wall, the needed length can be cut from e.g. a 40-foot long section. If a longer length piece is needed, either a longer length panel can be fabricated as a unitary product at the panel-manufacturing facility, or two or more pieces can be joined together using suitable straight-run connectors, or corner connectors, as suitable for the particular assembly to be made. The respective building panels can be cut to length, using e.g. a circular saw, a ring saw, or a reciprocating saw, employing e.g. a masonry blade, and assembled to each other at the construction site.

Because the wall assembly is made primarily from fiber, resin, and foam, the pounds per cubic foot density, and thus the unit weight per foot of length of the wall assembly is relatively small compared to a concrete wall of corresponding dimensions. For example, a building panel 20 feet in length, 9 feet in height, and having a main run wall section which is nominally 3 inches thick, weighs about 900 pounds, including studs 23, and anchor brackets 24, 24A. Accordingly, a typical foundation for an average single-family residence in the US, using the invention, is about 160 feet in length and weighs a total of about 7200 pounds/3265 kg whereas a concrete foundation for the same house weighs about 150,000 pounds/68,000 kg.

Rough openings for windows 27 and/or doors 29, illustrated in FIG. 1, can be cut on site using the above-noted masonry blade. Accessories, and other connections between elements of the wall and between the wall and other building elements, can be mounted to the wall by drilling and bolting conventional building construction elements to the building panel, or by use of self-tapping fasteners driven into the building panel, or by using known construction adhesives and resins formulated for use with fiber-reinforced polymeric materials. Screws or bolt-nut combinations can be used for typical attachments and connections whereby the screws and/or bolts facilitate or enable transfer of the full overlying portion of the building load from an overlying building member to an underlying building member. Where screws are suitable for use as connectors/fasteners, known construction adhesives and resins can be used as alternative.

FIGS. 5-7 represent one embodiment of wall structures, and walls, of the invention, which have a reinforcing structure extending across the thickness of the building panel. FIG. 5 represents a top view of a portion of a foundation wall section, including a 90 degree corner in the foundation wall. FIG. 6 is an enlarged cross-section, in plan view, of a straight-run portion of the foundation wall shown in FIG. 5. FIG. 7 is a cross-section, in elevation view, of a portion of the foundation wall shown in FIGS. 5 and 6.

FIGS. 5-6 show that a substantial portion of the volume of the foundation wall is occupied by a series of blocks 32 of low-density thermally insulating foam. As in the embodiments of FIGS. 1-4, inner 34 and outer 36 layers of fiberglass-reinforced resin form the generic inner and outer layers of the building panels 14.

As best seen in FIG. 6, a first reinforcing function is provided by a continuous, reinforcing, intercostal weaving layer 50. Weaving layer 50 weaves back and forth from one of the inner 34 and outer 36 layers to the other of the inner and outer layers. The back and forth weaving is disposed between each of the foam blocks 32, namely at spaced crossing locations, spaced along the length of the building panel where the intercostal layer 50 is perpendicular to the inner and outer layers. Such crossings are typically spaced from each other, along the length of the building panel, by about 4 inches to about 24 inches, typically by about 6 inches to about 12 inches. More typically, the foam blocks are about 8 inches wide such that the crossings are spaced about 8 inches from each other. As with the inner and outer layers, for conventional residential single-family construction, the weaving layer, at the crossing locations, has a nominal thickness of about 0.10 inch (2.5 mm) thick to about 0.25 inch (6.3 mm) thick.

Thus, referring to FIG. 6, weaving layer 50 extends from left to right along the inner surface 42 of outer fiberglass layer 36, between layer 36 and a foam block 32A to the side of the width "W" of foam block 32A. Still referring to FIG. 6, at the right side of foam block 32A, weaving layer 50 turns a 90 degree angle and extends to the inner surface 52 of inner fiberglass layer 34. At the inner surface 52 of inner fiberglass layer 34, the weaving layer makes another 90 degree turn, and extends to the right along inner surface 52 of the inner fiberglass layer along the full width of foam block 32B, then turns and again goes back to the inner surface of outer fiberglass layer 36. Weaving layer 50 thus follows a back and forth path between inner 42, 52 surfaces of inner and outer layers 34, 36, along the entire length of the respective building panel 14 whereby layer 50 is in contact with one of layers 34, 36 over substantially the entirety of the length of the panel. Layer 50 is in generally complete surface-to-surface contact with the respective layers 34 and 36, and with the respective foam blocks 32, along the entirety, or substantially the entirety of its path and along substantially all portions of the respective facing surfaces where layer 50 faces layers 34 and 36, and foam blocks 32.

The respective layers 34, 36, 50, and foam blocks 32, are all integrally bonded to each other to make a unitary composite structural product. Thus, the weaving layer is attached to respective elements of both the inner and outer layers, whereby the thicknesses of the inner and outer layers, as combined with the weaving layer, vary between relatively substantially thicker portions and relatively substantially thinner portions, each of which occupies about half of the length of each of the inner and outer layers. Typically, the relatively thicker portions of the combined layers 34, 50 and 36, 50 are at least 50 percent thicker than the relatively thinner portions of the layers 34 and 36. The resultant composite product functions much like an I-beam where layers 34 and 36, and combined elements of layer 50, serve as flange elements of an I-beam-like structure, and the crossing portions of weaving layer 50, function as web elements of such I-beam-like structures.

In general, all the space between inner surface 57 of the main run portion of the building panel and outer surface 56 of the panel is occupied by layers 34, 36, and 50, and the foam blocks, whereby little, if any, of the space between layers 34 and 36 is not occupied by any of the above-recited panel materials. By so generally filling the space between layers 34, 36, and reinforcing the panel using the crossing intercostal webs 50, all of the panel members are fixed in their positions relative to each other, and the panel is generally dimensionally stable under designed loading conditions, whereby especially laterally-directed loads imposed on the panel, from outside the building, whether subterranean ground loads or above-grade e.g. wind loads, are efficiently transferred from outer layer 36 and distributed among the other members of the panel, and respective portions of layers 34, 36, and 50, and studs 23, share in the support of any one e.g. vertically-directed or horizontally-directed load. The resulting panel is stiff, rigid, and sufficiently strong to support all loads anticipated for e.g. a low-population-density residential dwelling, including severe weather loads to which the building is expected to be typically subjected under normal use environments, including normal seasonal environmental extremes in the geographical location where the panel is expected to be used.

FIGS. 5, 6, 7, 9, and 15 illustrate elongate fiber-reinforced polymeric channel studs 23. A respective such channel stud 23 is a unitary structure which has first and second flanges 126 interfacing with the outer surface of inner layer 34. Flanges 126 are bonded to inner layer 34 either through the resin which forms part of layer 34, or through a separate adhesive or resin layer, or by mechanical fasteners such as screws. First and second upstanding legs 128 extend from flanges 126 to an end panel 44. End panel 44 forms that surface of the stud which extends to the greatest extent into the interior of the building, and away from the outermost surface 25, of the panel, which faces into the building. In the panel assembly, a hollow space 133 is defined inside a respective stud 23. Hollow space 133 is enclosed by the combination of end panel 44, legs 128, and inner layer 34.

Flanges 126, legs 128, and end panel 44 generally form a unitary structure. The structure of channel stud 23 can be relatively thin, for example end panel 44, legs 128, and flanges 126 can be about 2.5 mm to about 6.3 mm thick. The overall thickness of the stud, between outer surfaces of legs 128, is about 0.25 inch to about 15 inches, typically about 1 inch to about 3 inches, optionally about 1.5 inches. Typically, end panel 44 is displaced from the flanges and the inner layer by about 1 inch to about 5.5 inches, optionally about 2 inches to about 3.5 inches. Even in the recited such thin cross-section, in light of the distance between the end panel and the flanges, and given a maximum fiberglass loading in the stud, stud 23 makes a substantial contribution to the ability of the panel to resist lateral, e.g. bending, forces imposed by ground forces, or wind forces, from outside the building.

FIG. 10A shows a second embodiment of studs 23. In the embodiments of FIG. 10A, the two outwardly-disposed flanges 126 are replaced with a single bridging flange 126 which connects the legs 128 to each other, whereby a stud 23 of FIG. 10A represents an elongated enclosed square-cross-section body, encompassing hollow space 133, and open at opposing ends of the stud. The studs 23 of FIG. 10A can be used generally any place the studs of FIG. 9 can be used. For example, such studs can be joined to the panel assembly at the outer surface of inner layer 34. For example, the studs of FIG. 10A can be joined to the foam blocks, and the inner layer 34 can be applied over the studs. In the alternative, studs 10A can be adhesively mounted, such as with a curable liquid resin or a conventional construction adhesive, to the outer surface of inner layer 34.

Figure 22:
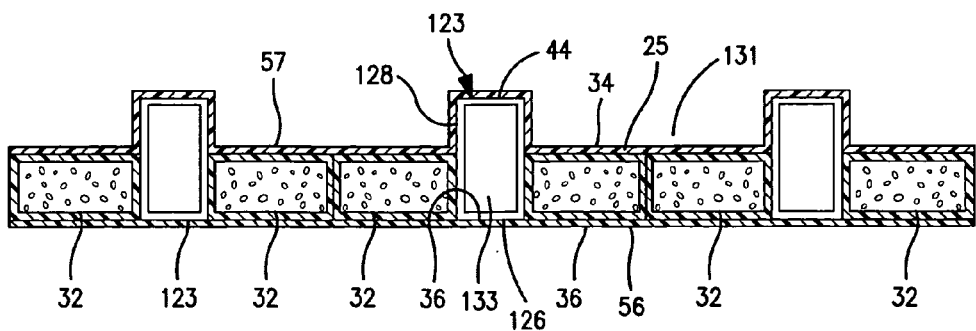
FIG. 22 shows a cross-section of a building panel incorporating rectangular studs as in FIG. 10B.

FIG. 10B shows a third embodiment of studs 23. As in the embodiments of FIGS. 9 and 10A, studs 23 of FIG. 10B can be made by impregnating a fiberglass matt with resin, and curing the resin. In the embodiments of FIG. 10B, the two outwardly-disposed flanges 126 are replaced with a single bridging flange 126 as in the embodiments of FIG. 10A, and the depths of legs 128 are extended, compared to the legs shown in FIGS. 9 and 10A. Namely, legs 128 in the embodiments of FIG. 10B are long enough that the stud can be mounted in the panel assembly at or adjacent outer layer 36. FIGS. 16 and 22 illustrate hollow fiber-reinforced polymeric studs 23 of FIG. 10B assembled into building panels of the invention.

Panels of the invention can be joined to each other using any of a variety of joinder structures known in the art such as "H" brackets, "L" brackets, and more complex-shape brackets. Such joining of the wall panels to each other can be supplemented by driving screws through such brackets and into and through inner and outer layers 34, 36 of the respective panels.

FIG. 5 illustrates joining together of two building panels 14A and 14C using first and second corner brackets 148 of FIG. 12. Each corner bracket has first and second flanges 152 which meet at a 90 degree angle at a respective corner 154.

FIG. 13 illustrates a variable-angle bracket 170 which has two rigid flanges 152, and a flexible hinge area 172, joining the two panels 152, and which can be flexed to any included angle of from about 15 degrees to about 175 degrees. Bracket 170 is used to join together building panels at joints where the panels 14 are neither perpendicular to each other nor aligned with each other. After rigid flanges 152 have been bonded to surfaces of the building panels 14 which are being joined, and the building panels have been set at the desired included angle with respect to each other, the flexible hinge area can be made rigid by applying, to the hinge area 172, one or more coatings of the hardening curable 2-part resin such as is used to make building panels 14 and bracket flanges 152 of bracket 148. The same bonding, and making rigid, can also be done using well known and conventional, curing, hardening construction adhesives.

FIGS. 5-7, 14, and 14A illustrate anchor brackets 24 and 24A. A bracket 24 or 24A is mounted to the interior surface of inner layer 34 at the top of the building panel. Referring to FIG. 14, top flange 136 of bracket 24 extends transversely from, and is joined to, the top of base flange 134. Side flange 138 extends transversely from, and is joined to, both base flange 134 and top flange 136, thus supporting top flange 136 from base flange 134, and supporting base flange 134 from top flange 136.

In a wall assembly, base flange 134 or side flange 138 is positioned against e.g. inner layer 34 of a building panel 14 and is mounted to inner layer 34 using e.g. self-tapping screws, and optionally is similarly mounted to stud 23 at the respective corresponding side flange or base flange. Top flange 136 interfaces with and supports top plate 20, and may be mounted to the top plate by bolts or screws (FIG. 3), whereby bracket 24 serves to transfer loads between top plate 20 and the main run portion of the building panel at inner layer 34, thereby making the top plate an integral load-bearing element of the foundation wall.

Bracket 24 is similarly used to attach the panel to either a bottom plate, or to the footer. One of side flange 138 or base flange 134 can be used to attach bracket 24 to stud 23, while the other of side flange 138 or base flange 134 is used to attach the bracket to inner layer 34. Accordingly, bracket 24 can transfer building loads to and from both inner layer 34 and a leg 128 of a stud 23.

Referring to FIG. 8, in bracket 48, a horizontal upper panel 182 is designed and adapted to extend across the top of the main run portion of the building panel. A keeper panel 184 extends vertically down from the distal edge of the upper panel. A base panel 178 extends in a downward direction from the proximal edge of the upper panel to a lower edge of the base panel. A bracing panel 180 extends upwardly from the lower edge of the base panel and away from the base panel. A support panel 176 extends outwardly from a mid-portion of the base panel, and the distal edge of the bracing panel meets and supports the distal edge of the support panel.

FIGS. 6 and 7 illustrate, in edge view, the addition of support bracket 48 against the outer surface 56 of the wall, along with the interface of angle bracket 24A with bracket 48 and top plate 20 in a channel 131. In the embodiment illustrated in FIG. 7, the top plate is a conventional wood board, and is secured to bracket 24A by a bolt 139 which also passes through top panel 136 of bracket 48, top plate, 20, and through the bottom stringer of a truss which supports the overlying floor 40. FIG. 7 also illustrates a second anchor bracket 24A used in supporting the interface between the building panel and bottom plate 16. The attachments between bracket 24A, bottom plate 16, and inner layer 34 can also be done by screws and optionally bolts.

Figure 7A:
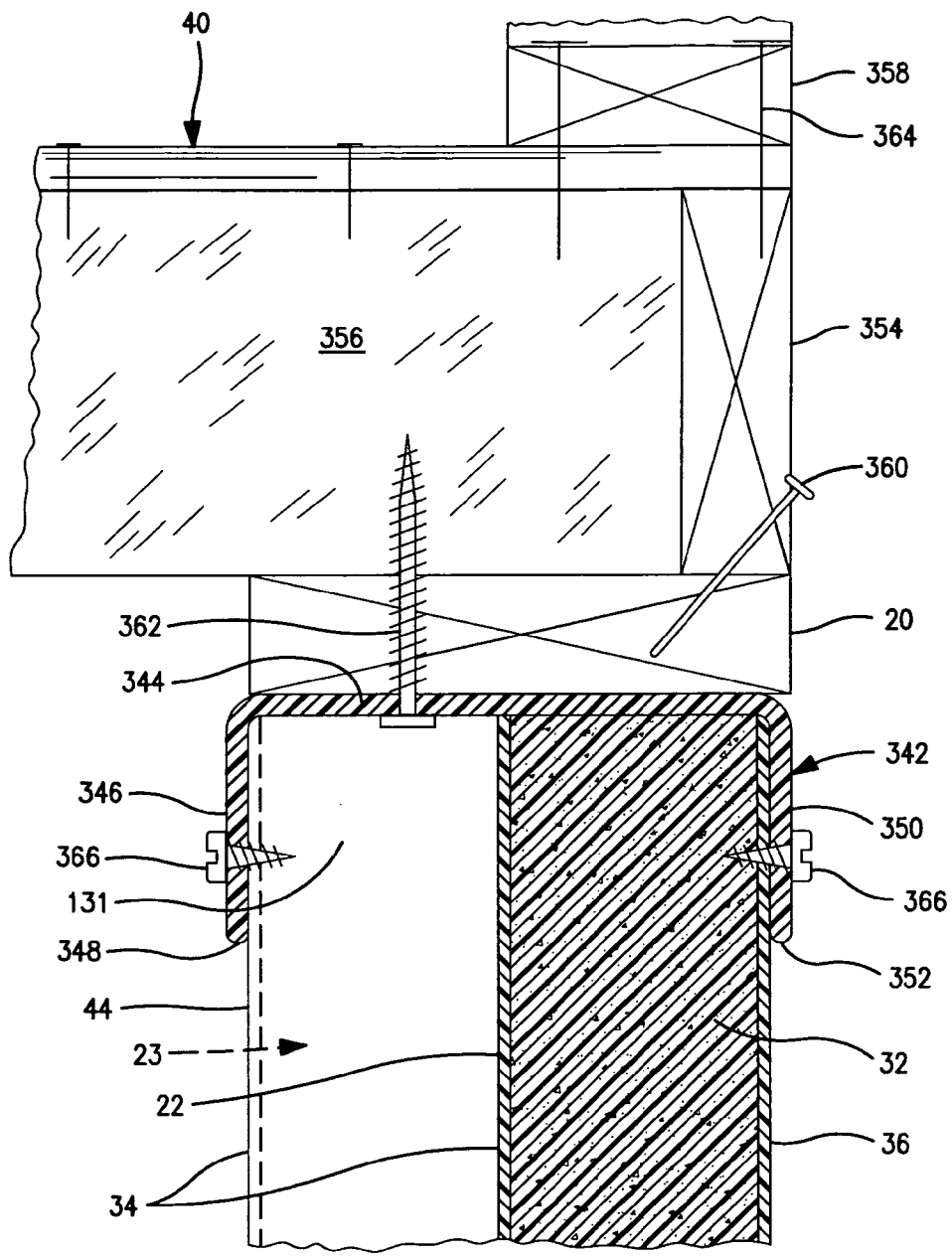
FIG. 7A shows an enlarged elevation view of a top portion of a wall section illustrating a resin-fiber composite top cap, and a top plate, collectively being used in anchoring the overlying building structure to the underlying wall structure at the top of the underlying wall.

FIG. 7A is another enlarged view embodiment of a top portion of another foundation wall structure. In the embodiment illustrated in FIG. 7A, the main run portion 22 of the building panel contains foam blocks as indicated at 32. A given foam block is wrapped with fiberglass on the block surface which faces outer layer 36; and on the sides of the blocks which face each other, with the blocks arranged side-by-side between the inner and outer layers, whereby the fiberglass on the facing sides of the foam blocks, as combined with the resin, can form the equivalent of reinforcing intercostal webs 50.

Still referring to FIG. 7A, a structural cap 342 covers the top of panel 14, including overlying the main run wall section and overlying the studs, and extends downwardly over both the outer face of the panel and over end panels 44 of the studs. Thus, cap 342 has a horizontal top plate 344 which overlies and contacts the top of the panel, including the tops of the studs. Horizontal plate 344 generally extends the full length of the panel, and extends from the outer surface 56 of outer layer 36 to the exposed surfaces of end panels of studs 23. An inner flange 346 extends downwardly from the inner edge of horizontal plate 344 to a first distal end 348. An outer flange 350 extends downwardly from the outer edge of horizontal plate 344 to a second distal end 352.

Cap 342 is made of a rigid durable material such as a fiberglass reinforced polymeric structure. An exemplary such cap is a pultruded structure using the same material as disclosed for inner and outer layers 34, 36, but thicker, namely about 0.18 inch to about 0.50 inch thick. Other materials having similar physical properties are also contemplated as being acceptable for use in/as cap 342. More robust specifications are contemplated for more demanding implementations of the invention.

Cap 342 is affixed to building panel 14. A wide variety of methods can be used for such affixation. For example, the cap can be adhered to the building panel at the respective interfacing surfaces of layer 36 and end panels 44 using conventionally available construction adhesive or curable resin. In the alternative, screws 366 or other mechanical fasteners can be applied spaced along the length of the building panel, e.g. through inner flange 346 and into end panels 44 of the studs, and through outer flange 350 and into the main run wall section at layer 36, thus to anchor cap 342 to the underlying building panel.

Holes can be e.g. drilled in cap 342, and end panels 44, to facilitate driving the screws or other fasteners through the cap and into the respective other members of the corresponding elements of the construct.

In the embodiment illustrated in FIG. 7A, top plate 20 overlies cap 342. Top plate 20 spreads the load of the overlying floor 40 and other structure over the full width of horizontal plate 344 of cap 342.

Still referring to FIG. 7A, rim joist 354 overlies and bears on top plate 20, and extends along the length of top plate 20, cap 342, and thus along the length of the respective wall. Rim joist 354 is affixed to top plate 20 by a plurality of nails or screws 360 which are spaced along the length of the plate and rim joist. A plurality of floor joists or floor trusses 356 are spaced along the length of top plate 20, and thus along the length of rim joist 354, and extend transversely from rim joist 354 into and/or across the building, thus to provide support for the overlying floor 40.

Conventional wall plate 358 overlies floor 40 and is screwed or nailed into the floor joists and the rim joist by a plurality of screws or nails. Wall plate 358 and its overlying structure, shown only in nominal part, represent the overlying walls which, along with all other building structure, enclose the respective floor/story of the building and bear the associated loads which ultimately bear on the foundation wall through floor 40, joists or trusses 356, rim joist 354, top plate 20, seal 357 (FIG. 7B), and ultimately cap 342.

Where the building panels do not include studs, top plate 20 and/or bottom plate 16 or footer 55 can extend inwardly of inner surface 25 a distance sufficient to overlie, or underlie respectively, the top flange 136 of brackets 24, 24A mounted to inner layer 34, such that brackets 24, 24A can still be used to tie the panels to the bottom plate or footer, and/or to tie the overlying structure to the panels.

A plurality of anchor screws 362 extend upwardly in the utility run cavities/spaces 131 between the studs 23, through cap 342, through top plate 20, and into joists or trusses 356. The threads on the screws bite into the material of joists or trusses 356, and thus provide direct anchor links, spaced along the length of the wall of the building, between the foundation wall 12 and the overlying floor whereby risk of movement of the overlying building structure off the foundation, e.g. in the face of extreme environmental stresses, is substantially diminished. Screws 362 can be applied/inserted after erection of the foundation wall because of the availability of cavities 131 between the studs, so long as the joists/trusses 356 which receive screws 362 overlie cavities 131 whereby such joists/trusses are laterally displaced, along the length of the wall, from studs 23.

Where a space is available within the overlying structure, such as above the bottom stringer of a floor truss, and as suggested in FIG. 7, vertically upwardly extending bolts 139 can be used in place of the vertically upwardly extending anchor screws 362, extending through bracket 24A, bracket 48 where used, top plate 20, and the respective truss stringer, and nuts and optional washers can be used on the bolts, thereby to secure the truss, through the truss stringer, or other overlying structure to the underlying wall. Other vertically upwardly directed mechanical fasteners such as nails can be used in place of the recited and illustrated screws and bolts, so long as the respective fasteners provide the desired level of securement between the overlying structure and the underlying wall 10.

Figure 7B:
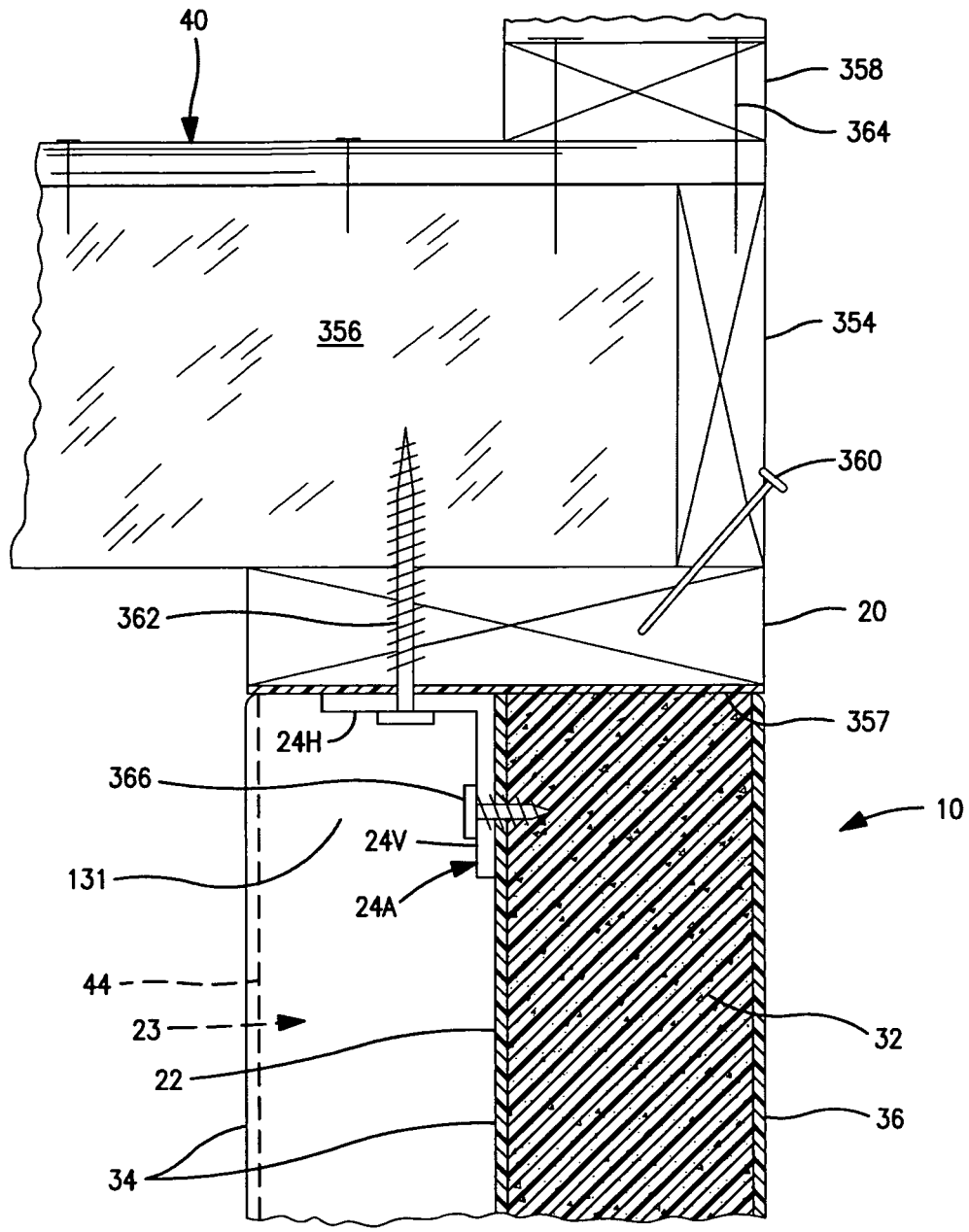
FIG. 7B shows an enlarged elevation view cross-section as in FIG. 7, illustrating an anchor bracket, and a top plate, collectively being used in anchoring the overlying building structure to the underlying wall structure.

FIG. 7B illustrates an embodiment where cap 342 is omitted. A sill weather seal 357 is disposed between the top of panel 14 and the bottom of top plate 20. An exemplary suitable such seal 357 is a polyethylene foam sold by Dow Chemical company, Midland, Mich. under the name WEATHER MATE®.

Angle bracket 24A extends generally most or all of the width of the respective cavity 131 between adjacent studs 23, and is mounted in the corner where the upper portion of the panel meets top plate 20. Bracket 24A is secured to the upper portion of the panel by screws 366 which extend into, optionally through, inner layer 34. Screws 362 extend through angle bracket 24A upwardly through weather seal 357 and top plate 20 and into joists or trusses 356, thus securing top plate 20 and trusses 356 to bracket 24A, whereby plate 20 and trusses 356 are secured to panel 14 by operation of screws 362, screws 366, and bracket 24A. Brackets 24A can be used in every cavity as desired, in alternating cavities, or at otherwise-selected cavity spacings, depending on the stresses expected to be imposed on joists/trusses 356. Angle brackets 24A can be similarly placed and secured by screws at the corner between the bottom of the panel at inner layer 34 and the underlying footer or bottom plate, as illustrated in FIG. 7.

Returning again to FIG. 7, bottom plate 16, where used and as illustrated, can be a rather thin, e.g. about 0.18 inch to about 0.50 inch thick, stiff and rigid resinous pultruded plate which has sufficient stiffness and rigidity to spread the vertical load for which the panel is designed, out over substantially the full downwardly-facing surface area of the bottom plate, thus transferring the vertical load to the underlying e.g. aggregate stone fabricated base.

Figure 7C:
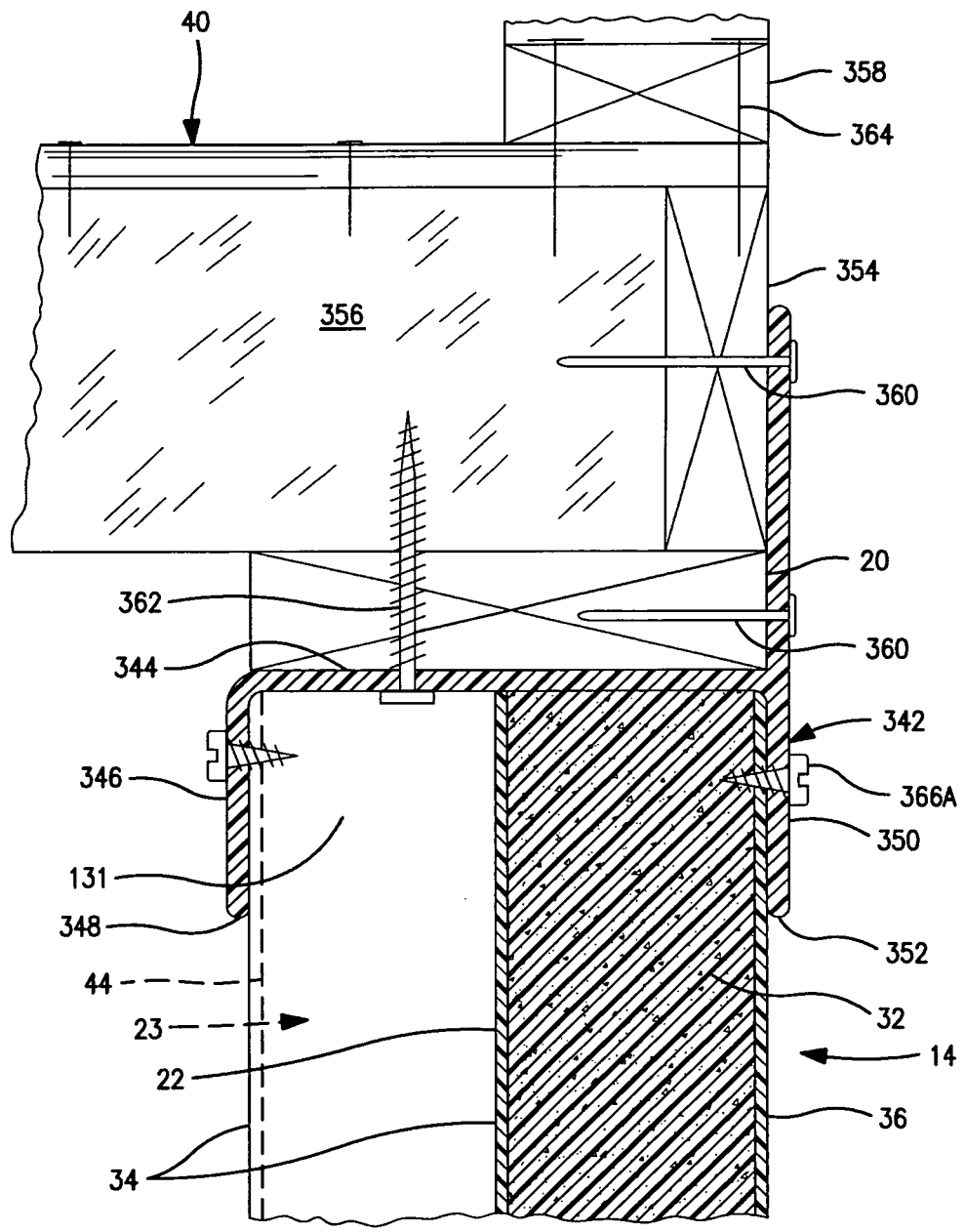
FIG. 7C shows an enlarged elevation view as in FIG. 7A, illustrating an alternative embodiment of the top cap.

FIG. 7C shows that, as an alternative construct of a cap 342, outer flange 350 can extend upwardly as well as downwardly from plate 344, thus collectively lying adjacent the top of the underlying building panel 14, adjacent top plate 20, and adjacent rim joist 354 whereby fasteners 360 and 366A can extend through outer flange 350 and into top plate 20 as well as into rim joist 354 and joists/trusses 356 as well as into outer layer 36, and end panels 44 of the stud.

In an embodiment, not shown, outer flange 350 can extend yet further upwardly, high enough to lie against, optionally cover the outer surface of, overlying plate 358 and/or the lower portion of the e.g. stud framing which extends up from plate 358, such that fasteners can be driven through outer flange 350 and into plate 358 and/or into such overlying stud framing. Thus, cap 342 can, as desired, tie together any or all of the underlying wall, top plate 20, rim joist 354, joists/trusses 356, overlying plate 358 and the framing overlying plate 358.

Referring again to FIG. 7, concrete slab floor 38 is shown overlying that portion of bottom plate 16 which extends inwardly into the building from the inner surface 57 of the main-run portion of panel 14, and inwardly from studs 23. Slab floor 38 abuts the inner surfaces of panel 14 and studs 23, thus stabilizing the bottom end of the panel against inwardly-directed forces which reach the lower end of the panel. Angle bracket 24A is seated in the corner defined by inner surface 25 of the wall and bottom plate 16. Screws or other fasteners (not shown) extend through the upwardly-extending flange of bracket 24A, securing the bracket to wall 10 at inner layer 34. Additional screws or bolts, not shown, can extend through the horizontally-extending flange, securing the bracket to an underlying concrete footer.

Concrete anchors 158A extend through apertures 159 in studs 23 and into concrete slab 38, thus further securing wall 10 to slab 38 whereby wall 10 is secured against movement away from slab 38, as well as being secured against movement of the wall toward the slab. Anchors 158A are spaced along the length of the wall at intervals of no more than 6 feet, typically at about 4-foot intervals.

While described using differing nomenclature, namely wall surface and inner surface, inner surface 57 and wall surface 25 both represent the same face of building panel 14 when considered away from studs 23. Contrary to surface 25, inner surface 57 also includes the exposed stud surfaces, such as legs 128 and end panels 44 of the studs.

Inwardly-directed forces which reach the upper end of the panel are opposed by the attachments between overlying floor 40 and the upper portion of the wall. Inwardly-directed forces which are imposed on wall 10 between the top of the wall and the bottom of the wall are transferred, through the wall, to the top and bottom of the wall, thence to the concrete floor and the overlying floor or floor system, by the stiffness and rigidity of the panel as collectively defined by the interactions of the structure defined by e.g. layers 34, 36, 50, foam blocks 32, and studs 23.

In residential construction, a typical maximum downward-directed vertical load experienced by an underlying e.g. foundation wall is about 3000 pounds per linear foot to about 5000 pounds per linear foot. In buildings contemplated by the invention, building panels 14 are primary structural members which carry the bulk of the structural load which is ultimately imposed on the underlying natural base by the building. The downwardly-directed load is typically applied to the full width of the top of the wall, and can be applied anywhere along the length of the wall.

The bending horizontally-directed resistance capacity of the building panel at the locus of maximum horizontal underground bending moment loading accommodates bending of no greater than L/120 when supported in accord with ASTM E72 and a clay load. Both the vertical crush resistance and the horizontal load bending moment resistance can be designed for greater or lesser magnitudes by specifying, for example and without limitation, density of the included foam; thickness of layers 34, 36, 50; use and parameters of additional reinforcement layers and/or intercostals, panel thickness, spacing, and/or depth "T1" of studs 23 or thickness "T" of the panel in combination with depth "T1" of the structure. For example, greater thicknesses of inner layer 34, outer layer 36, and/or intercostals 50, e.g. up to 0.5 inch, or 0.75 inch, or more are contemplated where the overlying downwardly-directed loads, or the anticipated lateral loads, justify such thicker cross-sections.

Above-ground side loads, such as wind loads, are less than typical horizontally-directed soil loads. Accordingly, the absolute bending resistance capabilities of building panels intended for above-ground applications may be less than the capabilities contemplated for below-grade loads. However, the L/120 capacity performance criteria are the same, while contemplating lesser-intensity ultimate loads.

The Fiber

The reinforcing fiber materials used in products of the invention can be selected from a wide variety of conventionally available fiber products. Glass fiber has been illustrated in the general description of the invention, and is believed to be the currently most cost effective material. Other fibers which are contemplated as being acceptable include, without limitation, carbon fibers, Kevlar fibers, and metal fibers such as copper and aluminum, including nano-size embodiments of such fibers. Other fibers can be selected to the extent their reinforcing and other properties satisfy the structural demands of the building panel in applications for which the panels are to be used, and so long as the fibers are not prematurely degraded in the use environment contemplated for the respective building panels.

The lengths, widths, and cross-sectional shapes of the fibers are selectable according to the demands of the structures in which the building panels or other structures are to be used, and the processes which are used in fabricating such building panels. The overall fiber specification includes multiple fibrous elements and is also known as the fiber "schedule". A given FRP layer e.g. 34, 36, 50 can include multiple individually-identifiable fibrous layers which, permissively, may be attached to each other e.g. by stitching, by fiber entanglement, or by other means.

The inventors herein have discovered that the positioning of the fibers relative to each other, and the orientations of the fibers, in what will be referred to herein as a "fiber substrate" or "base sheet", as part of the "fiber schedule" has a substantial affect on especially the vertical crush strength of an upright wall when an overlying load is applied. An exemplary base sheet is a stitched, fiberglass cloth, having a first layer wherein about 80-85% of the glass is oriented in a first direction and the remainder of the glass is oriented in a second direction perpendicular to the first direction, with the predominant fiber direction in the wall being directed generally vertically between the top of the wall and the bottom of the wall. Any given wall will have its specified fiber schedule, addressing the fiber which is used in each FRP layer, in each portion of the length of the wall, e.g. around foam blocks 32 as well as the fiber which is used in the inner and outer layers.

In addition, where the panel is fabricated using resin infusion molding, relatively less dense fiber layers can be used in the architecture of the fiber schedule as flow control layers to facilitate resin flow during the panel molding process. Such flow control layers are illustrated further in the discussion, following, of FIGS. 28 and 29.

The Polymer

The polymer which is used to impregnate and/or carry the fiber can be selected from a wide variety of conventionally available multiple-part reaction-curing resin compositions. Typical resin is a 2-part liquid where two liquid parts are mixed together before the resin is applied to the fiber substrate. Third and additional components can be used in the reaction mixture as desired in order to achieve a desired set of properties in the cured resin. The resin mixture should be sufficiently liquidous to be readily dispersed throughout the fiber schedule thereby to fill in all voids in the fiber schedule. Examples of useful reaction curing resins include, without limitation, epoxy resins, vinyl ester resins, polyester resins, acrylic resins, polyurethane resins, phenolic resins, and recently-available eco-resins.

An example of such resin is Modar 814A® modified acrylic as the first part and peroxide-based Trigonox 44K® as the second part. The Modar 814A® is available from Ashland Inc., Dublin, Ohio. The Trigonox 44K® is available from AkzoNobel, Chicago, Ill.

For any set of reaction materials which are used to make the reacted product referred to here, a conventional additive package can be included such as, for example and without limitation, catalysts, anti-oxidants, UV inhibitors, fire retardants, fillers, and fluidity-control agents, to enhance the process of applying the resin and/or curing the resin, and/or to enhance the properties of the finished product, e.g. weather resistance, fire resistance, hardness, expansion/contraction and the like. For example, where fire suppression is a consideration, a fire suppressing material, such as a metal hydrate, may be added to the resin, and mixed in thoroughly, while the resin is in its un-reacted liquid condition. A typical such fire suppressing material is alumina tri-hydrate. The amount of fire suppressing material to be used can be determined by testing sample structures using known accepted test procedures.

The Polymer/Fiber Composite

The polymer/fiber composite is addressed herein as a 2-part composite where the first part is the fiber, e.g. fiberglass, and the second part represents all non-fiber components of the composite. Thus, the second part, generally referred to herein as the resin, includes not only the chemically reactable resin components which react in forming the set/hardened resin, but also all other materials which are included in the resin mixture in the fluid stage of the resin before the resin is combined with the fiber. Thus, this second component includes, without limitation, the various additives which are added to the materials which chemically react to "set" the resin, as well as fillers and any other materials which do not chemically participate to any great extent in the "setting" reaction(s) wherein the resin transitions from a liquid phase to a generally solid phase.

In general, dry fiber substrate, woven cloth, or fiber matt, is used as the fiber base for structural portions of layers such as layers 34, 36, 50; as well as for all other structural FRP elements of the invention such as studs 23, and brackets 24, 24A, 48, 148, and 170. Since the objective is to fill in substantially all voids in the fiber substrate with resin, enough resin is added to the fiber substrate to fill all such voids, whereby there should be no air inclusions, or so few air inclusions as to have no substantial effect on the physical or chemical stability, or the physical properties, of a building panel or other structure built with such resin-impregnated fiber-based layer. Overall, the glass/resin ratio is as high as can be achieved, without leaving any significant, deleterious voids in the resultant layer once the resin is cured.

Given the requirement to minimize voids, the resultant structural layer product, e.g. layer 34, 36, or 50, or legs 128 or panels 44, is about 30 percent by weight to about 65 percent by weight fiberglass, and correspondingly about 70 percent by weight to about 35 percent by weight of the second resin component. Optionally, the resultant layer is about 40 percent by weight to about 60 percent by weight fiber and about 60 percent by weight to about 40 percent by weight of the second resin component. A typical resultant layer is about 45 percent by weight to about 55 percent by weight fiberglass and about 55 percent by weight to about 45 percent by weight of the second resin component, optionally about 50 percent by weight fiberglass and about 50 percent by weight resin composition.

The top and bottom plates, as well as layers 34, 36, and 50 can be made of such polymer/fiber composite. The bottom plate can be any material which can bear the load imposed on the overlying building panel. A typical bottom plate, where used, is an e.g. about 0.18 inch thick to about 0.50 inch thick fiber-reinforced pultrusion, which is sufficiently stiff and rigid to spread the overlying load to the underlying footer generally uniformly along the length of the panel Top plate 20 can be made of, without limitation, fiberglass-reinforced, or other fiber-reinforced, resinous materials, or other materials such as wood in the shape conventionally used for a top plate. It is contemplated that a conventional wood-based top plate serves the purpose adequately, and provides for attachment of overlying wood elements such as wood framing, using conventional fasteners and conventional fastening methods.

The Foam

The purpose of the foam, such as in a foam board or foam blocks 32 in the main run wall section, and foam cores 32S in studs 23 (FIG. 28), is generally two-fold. First, the foam provides a certain level of dimensional identity to that respective portion of the construct while the various foam and fiber elements are being assembled to each other in the process of making a panel.

Second, the foam in foam board 32 or foam blocks 32 provides substantial thermal insulation properties in the resulting building panel construct. In achieving a desirable level of thermal insulation, foam having a density of about 1.5 pounds per cubic foot (pcf) to about 8 pcf, optionally about 2 pcf to about 5 pcf, is selected. Foams less dense than the recited range of densities may not possess sufficient rigidity to stabilize the dimensions of the construct while the panel is being assembled and cured. More dense foams than the recited range typically have more structural strength, but provide less than the desired level of thermal insulation, and are more costly. In general, the foams used in the invention are closed-cell foams although open-cell foams and partially open-cell foams are contemplated as being operable in some implementations.

Foam boards and blocks 32 and foam cores 32S can be made from a wide variety of compositions including, without limitation, extruded polystyrene foam, expanded bead polystyrene foam, rigid urethane foam, or polyisocyanurate foam. The foam is moisture resistant, preferably moisture proof, and is physically compatible with, and is generally chemically inert with respect to, the compositions and structures of layers 34, 36, and 50 as well as with the compositions and structures of the legs and end panels of the studs.

An exemplary foam board or foam block 32 has, without limitation, inner and outer skins 32SK (FIG. 29), and an expanded foam core 32FC between the skins. The skins can be un-foamed extruded films made with e.g. limestone-filled, fiberglass-reinforced polyester polymer. Skins 32SK are about 0.01 inch (0.25 mm) thick. Skins 32SK may optionally contain alumina tri-hydrate (ATH) or other fire retardant material as an alternative to the limestone filler. Foam core 32FC can be a polyisocyanurate foam having a density of about 2 pounds per cubic foot. Similarly, a foam core 32S in a stud may have the same or similar skins 32SK either along legs 128 of the studs, or along end panel 44 and along the opposing end of the stud.

Skins 32SK can be any thin material which provides a modest level of protection from mechanical shock or intrusion for the foam core. For example and without limitation, another material which can be used for skins is polyethylene film. Another material is fiberglass veil attached to a layer of paper or other substrate which can give some dimensional stability to the skin. Still another example is a thin layer of foam attached to a dimensionally relatively stable layer of paper or plastic film.

Regarding fixing the respective structural layers in their designated positions, the foam fills all, or substantially all, of the spaces between the respective surfaces of layers 34, 36, and 50, can optionally form the cores of studs 23 and is in surface-to-surface contact with the respective fibrous layers as such layers are wrapped about the respective foam blocks. As the liquid resin is caused to flow around the foam, and as the foam subsequently cures, the resin bonds to the cellular foam or the foam skin layer such that, in the finished building panel, after the resin is cured, the respective FRP structural layers are adhered/bonded to the foam.

Turning to FIG. 15, outer layer 36 weaving layer 50, and foam blocks 32 are the same materials, the same structures, and in the same relative positioning as in the embodiment illustrated in FIG. 6. The primary difference between the embodiment of FIG. 6 and the embodiment of FIG. 15 is that, in FIG. 15, studs 23 are positioned between weaving layer 50, at locations remote from outer layer 36, and inner layer 34. In such structures, studs 23 are held in the assembly by the entrapment of the studs between weaving layer 50 and inner layer 34. Any bonding between studs 23 and the weaving layer can operate to further hold, and fix, the positions of studs 23 in the assembly. Location of studs 23 is illustrated in FIG. 15 as being on weaving layer 50 such that the weaving layer is between a foam block and the inner layer.

Another embodiment of building panels of the invention is illustrated in FIG. 17. In the embodiment of FIG. 17, each foam block 32 is wrapped with one or more layers 190 of resin-impregnated fiberglass which closely and intimately wraps the longitudinally-extending outer surfaces of the foam block, optionally the entirety of the lengths of the longitudinally-extending outer surfaces of the foam block, optionally enclosing all sides of the foam block.

The resin may be added to the wrapped fiberglass layers on one or more sides of the foam blocks before the foam blocks are introduced into the process of assembling building panels of the invention. Such pre-added resin in the wrapped fiberglass layers may be cured prior to assembly of the foam blocks into a panel. In the alternative, the resin may be cured along with the curing of the resin in the inner and outer layers and/or in the studs.

As another alternative, the entirety of the resin used to consolidate the wrapping layers and to bond the wrapping layers to the foam can be added to, and dispersed in, the fiberglass layers which wrap around the foam blocks after the foam blocks have been assembled with the remaining e.g. fiber elements of the panel structure.

The fiberglass can be a pre-woven or stitched matt of fiberglass which is wrapped about a desired number of the sides of the foam block, or the fiber structure can be wrapped entirely about the foam block so as to form e.g. a butt joint or an overlapping joint where the ends of a wrap layer meet.

The fiber wrapping layer can represent an open pattern where some of the foam surface is visible through the fiber wrapping after the wrapping has been completed. In the alternative, the wrapping layer can represent a closed pattern where the fiber visually obscures substantially all of the underlying surface of the foam block.

Given the presence of the wrapping layers in the embodiment of FIG. 17, the wrapping layers 190 represent the intercostal reinforcing web which extends between inner and outer layers 34, 36, whereby, weaving layer 50 is not per se used as an additional element of the panel structure.

An exemplary process for making building panels of FIG. 17 is e.g. a vacuum bag molding process, illustrated in FIG. 19. In FIG. 19, upper and lower layers of the vacuum bag are illustrated as 192A and 192B respectively, and where the bag is still open for assembling of elements of the structure being fabricated. As suggested by the illustration in FIG. 19, one or more layers of dry fiberglass pre-form, which will become outer layer 36, are laid out on the lower layer 192B of the vacuum bag. Foam blocks 32, pre-wrapped in dry fibrous layers 190, are laid side-by-side on the outer layer pre-form. Pre-formed hollow-channel studs 23 are added on top of the wrapped foam blocks. One or more layers of dry fiberglass pre-form, which will become the inner layer 34, are laid over the top of the resulting subassembly, along with any desired resin distribution layer. The vacuum bag is then closed, vacuum is drawn and resin is admitted into the bag, whereby the resin enters the bag and penetrates voids in the fiberglass layers, including layers 190. Inner layer 34 collapses onto the profiles of studs 23, and the resin is cured in the bag according to conventional vacuum molding practice of filling resin into the bag and curing such resin in the bag. In the vacuum molding process, layers 34 and 36, wrapped blocks 32, and studs 23, are all joined together as a unitary composite structure in a matrix wherein the resin represents a generally continuous phase and the fiber represents either a discontinuous phase or a second continuous phase. Typically, both the resin phase and the fiber phase are generally-continuous phases.

Figure 20:
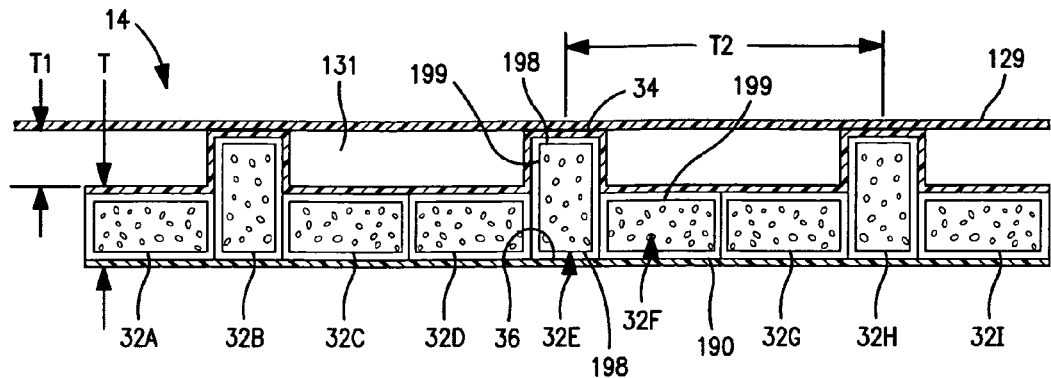
FIG. 20 shows a plan view cross-section of another embodiment of an upstanding building panel of the invention wherein fiber layers, wrapped about foam blocks, provide the reinforcement structure of the reinforcing members as well as stud reinforcement.

FIG. 20 illustrates yet another embodiment of building panels of the invention. In the embodiment illustrated in FIG. 20, the general structure of panel 14 is defined by foam blocks 32. Blocks 32 are pre-wrapped in fiberglass layers 190, the same as the pre-wrapping discussed above with respect to FIG. 19. Contrary to the FIG. 19 structure, in the structure illustrated in FIG. 20, no separate studs 23 are mounted at inner layer 34 to reinforce the building panel. Rather, every third foam block is oriented 90 degrees to the remaining blocks such that the narrower edges 198 of the respective, so-oriented, wrapped foam blocks are parallel to inner 34 and outer 36 layers. Thus, in FIG. 20, foam blocks 32B, 32E, and 32H form a second set of foam blocks which are so oriented. The remaining foam blocks, e.g. 32A, 32C, 32D, 32F, 32G, and 32I represent a first set of foam blocks which defines the thickness "T" of the main run portion of the panel.

Blocks 32B, 32E, and 32H thus perform as structurally-reinforcing members, previously illustrated as studs 23 and/or intercostals 50, and are herein referred to as studs.

In the first set of foam blocks, the relatively wider sides 199 of the foam blocks face toward the inner and outer layers. In the second set of foam blocks, the relatively wider sides 199 of the foam blocks face along the length of the building panel.

Given the structural orientation of foam blocks 32 in FIG. 20, desirable width and thickness dimensions for the wrapped foam blocks, including the foam block studs, including the wrapping layers 190, are 6.5 inches width and 3.0 inches thickness. Such dimensions provide a commonly-used depth "T1" of the channel 131 between the studs, of about 3.5 inches, assuming that the thickness of inner layer 34 is relatively negligible. The illustrated structure, and again assuming negligible thickness of inner layer 34, also provides a commonly-used center-to-center distance "T2" between the foam block studs of 16 inches.

Given the above dimensions, the depth "T1" of channel 131 between a pair of adjacent studs is the same as conventional depth, namely 3.5 inches, the same as the depths of the channels between conventional wood studs, and a width of 13 inches. Further, the 16 inch center-to-center spacing of the foam block studs provides for conventional attachment of conventional building materials such as 48-inch wide sheeting 129 on the inside of the building panel.

Figure 21:
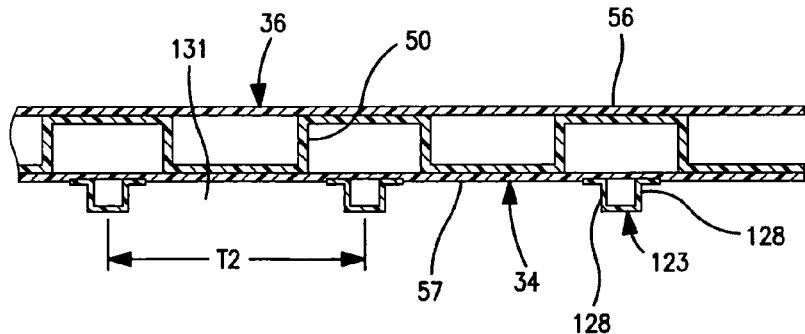
FIG. 21 shows a plan view cross-section of another embodiment of upstanding building panels.

In the embodiment illustrated in FIG. 21, the width of stud 23, defined between legs 128, is 1.5 inches. Given a center-to-center "T2" distance between studs 23 of 16 inches, the width of channel 131 between adjacent ones of the studs is 14.5 inches, which corresponds to the conventional width of commercially available, but compressible, panels of fiberglass batt insulation.

FIG. 22 illustrates a building panel made using a series of laid-flat individually-wrapped foam blocks 32 in combination with spaced hollow pultruded studs 23. An outer layer 36 extends along the bottom of the structure illustrated. An inner layer 34 extends along the top of the structure illustrated, and overlies both foam blocks 32 and studs 23. A given stud 23 extends from a closed end wall 126 at outer layer 36, along legs 128, past the main inner surface 25 of the panel at inner surfaces of blocks 32, and passes further inwardly of blocks 32 and away from outer layer 36, to end panel 44.

An inner layer 34 of fiberglass-reinforced polymer overlies both the laid-flat blocks 32 and studs 23.

FIG. 23 illustrates a vacuum infusion molding process which can be used to make building panels of the invention. FIG. 24 illustrates a building panel made by such vacuum molding process.

Referring to FIGS. 23 and 24, a specific example of an infusion process of making a building panel of the invention is described in some detail where dry fiberglass, containing no resin is loaded into the mold, the mold is closed and sealed; air is evacuated from the closed and sealed mold, and resin is infused into the mold as the air is being evacuated from the mold. In FIG. 23, the numeral 300 represents a lower rigid female mold element which includes a plurality of elongate female recesses 302 spaced e.g. 16 inches apart center-on-center. Numeral 306 represents a rigid upper mold element.

At the beginning of the process, the upper and lower mold elements, including recesses 302, are optionally coated with mold release material. In the alternative, a mold release agent can be incorporated into the resin. Next, foam stud blocks 32S, pre-wrapped with layers 308 of fiberglass, are placed into recesses 302.

Foam stud blocks 32S and recesses 302 are so sized and configured that the foam blocks fit snugly in the recesses, and the top surfaces of the foam stud blocks are generally co-planar with the upper surface 304 of the lower mold element.

Next, a layer 334 of fiberglass fabric, which will become inner layer 34 of the so-fabricated building panel, is unrolled from a roll of such material mounted adjacent e.g. the right end of the mold table and is pulled over the lower mold element, e.g. from the right side to the left side, all as illustrated in FIG. 23. The layer of fabric is laid over the entirety of the length and width of the lower mold element, including over the top surfaces of stud blocks 32S.

Next, foam blocks 32, pre-wrapped with layers 314 of fiberglass (FIG. 24), are laid flat on top of the fabric, edge-to-edge as illustrated in FIG. 23.

Next, another layer 336 of the fiberglass fabric, which will become the outer layer 36 of the so-fabricated building panel, is unrolled from the roll of such material mounted adjacent e.g. the right end of the mold and is pulled over the laid-flat foam blocks 32, from the e.g. right side of mold 300 to the left side of the mold. Layer 336 of dry fabric is laid over the entirety of the assemblage of foam blocks 32, 32S, whereby layer 336 becomes the top surface of the construct.

The upper and lower mold elements are brought together, with a seal therebetween, so as to form a closed and sealed mold, with the respective elements of the building panel in the mold cavity.

The mold cavity is then evacuated at a first location on the mold, drawing a vacuum which removes substantially all of the air out of the mold cavity. As the air is withdrawn from the mold cavity, curable liquid resin is fed into the cavity at a resin feed port located at e.g. an opposing side or end of the mold. The resin flows to all areas of the mold where air has been removed, thus to fill the voids left by the evacuating air and to form the continuous resin matrix about and through all of layers 334, 336, and the wrapping layers 308 and 314 of fiberglass which encompass foam blocks 32 and 32S.

Thus, resin flows into intimate bonding contact with the top surfaces of foam blocks 32S. Resin also flows into intimate bonding contact with the top surfaces of foam blocks 32. As a result, the resin in the mold flows to all areas which have been evacuated by the removed air, thus creating a continuous matrix of resin throughout the structure in all of the fiberglass layers which are in the mold. In instances where the foam in foam blocks 32 and 32S is a closed cell foam, the resin does not penetrate generally beyond the outer surfaces of the foam blocks. Where the foam is an open-cell foam, or partially open-cell foam, the resin can penetrate more deeply into the foam blocks as permitted by the permeability of the foam.

Once the mold has been closed and evacuated, and the necessary quantity of resin has been infused into the mold, the mold is maintained in its closed and sealed condition until the resin in the mold has cured. In the process of curing the resin, the mold may be heated, or not, depending on the thermal requirements associated with the curing of the specific resin being used. Where heat is required, heat is applied. Where heat is not required, the resin is typically cured at ambient temperature of e.g. 60-80 degrees F.

The cured fiber-reinforced polymeric building panel product is removed from the mold. FIG. 26 illustrates a building panel made according to the process described with respect to FIG. 25.

Figure 25:
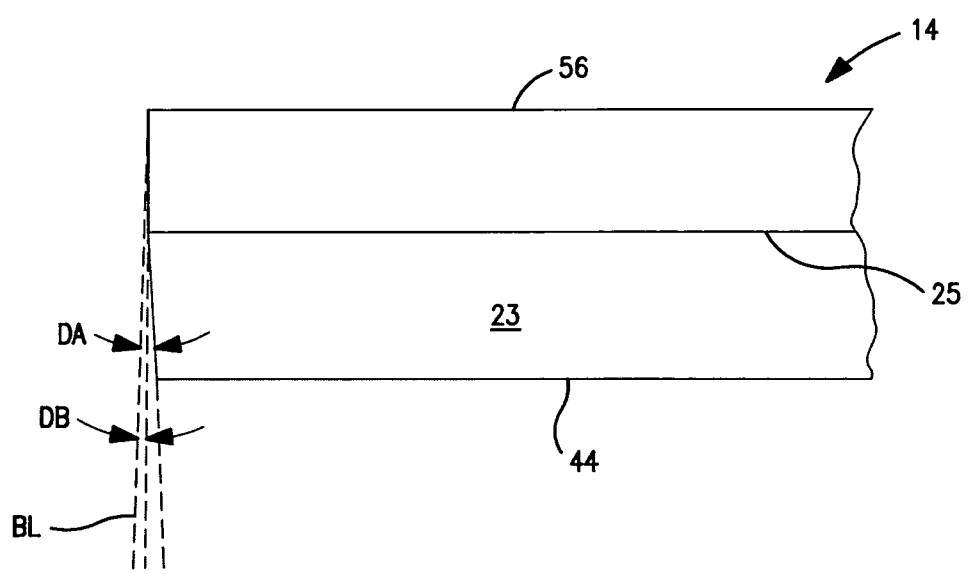
FIG. 25 shows an end view of a top portion of the panel of FIG. 24.

FIG. 25 shows a top portion of the panel of FIG. 26, illustrating first and second draft angles at the top of the panel. A first draft angle between the inner surface 25 and end panels 44 of the studs has an included angle "DA", and is typically about 1 degree to about 25 degrees, using a line perpendicular to outer surface 56 of the panel as the base line "BL" for the angle. A second draft angle between outer surface 56 of the panel and inner surface 25 has an included angle "DB", less than the angle DA, of at least 0.25 degree to about 15 degrees. Typical angle for "DB" is about 0.25 degree to about 0.5 degree. Typical angle for "DA" is about 2 degrees to about 3 degrees. Angles below the recited ranges can result in difficulty in removal of the panel from the mold. Angles greater than the recited angles can result in use of additional panel materials in the mold. Use of first and second different draft angles results in use of less resin during the molding process.

The draft angles shown in FIG. 25 are molded into panel 14 by corresponding draft angles at the top end of the mold. Given the draft angles used at the top end of the mold, the bottom end of the mold can be configured perpendicular to the inner/outer surfaces of the panel whereby the bottom of the panel, as molded, is perpendicular to the outer/inner surface of the panel.

While draft angles are shown at the top of the panel, with corresponding draft in the mold, such drafts can as well be used at the bottom of the panel and mold whereby the top of the panel can be molded perpendicular to the inner/outer surfaces of the panel.

While different draft angles have been illustrated for both the studs and the main run portion of the panel, in some embodiments, a single draft angle can be used for the full thickness of the panel between outer layer 36 and end panels 44 of the studs. In some embodiments, the draft angle can be limited to the studs whereby no draft angle need be used between the inner and outer layers.

For ease of release from the mold, stud legs 128, as well as the foam core, can define draft angles extending from end panels 44 to locations proximate inner surface 25 such that the studs are wider proximate inner surface 25 than at end panels 44. Such draft angles on the stud legs and foam core are about ¼ degree to about 20 degrees, optionally about 1 degree to about 2 degrees.

Once the panel has been removed from the mold, any material representing any draft angles is trimmed off the top and/or bottom of the panel with e.g. a ring saw or other known device capable of cutting FRP materials, both to shorten the panel to specified length, and to provide surfaces at the top and bottom of the panel which are perpendicular, within cutting precision capabilities, to the outer surface of the panel, such that, when the panel is installed in fabricating a vertical wall, the top and bottom of the panel present horizontal surfaces for interfacing with a footer or bottom plate, as well as for interfacing with overlying structure.

The process of FIG. 23 can be used to make building panels which are cost effective in use of materials, and which are readily combined with conventional building materials using conventionally-recognized and standardized building elements spacings. In the embodiment illustrated in FIGS. 23-24, foam blocks 32, including the wrapping layers and resin, are 9 feet long, 8 inches wide, and 3 inches thick between layers 34 and 36. Stud foam cores 32S extend 3.5 inches from layer 34, and are 1.5 inches wide, and 9 feet long. Layers 34 and 36 are 9 feet wide and as long as the length of the panel. Layers 308, 314, 34, and 36 are all made of the same 22-ounce fiberglass fabric and are thus all the same thickness when filled with resin. The resulting thickness of each such layer is about 0.06 inch (1.5 mm). In the given structure, outer layer 36 plus the adjacent portion of wrapping layer 314 is thus 0.12 inch (3.0 mm) thick. Similarly, inner layer 34 plus the adjacent portion of wrapping layer 314 is 0.12 inch (3.0 mm) thick. Also, the collective thickness of the reinforcing portions 309 of the two wrapping layers which are disposed between each pair of foam blocks 32 is 0.12 inch (3.0 mm), thus collectively defining intercostals 50. When the building panel is being used in a building, the outer surface of the building panel is stressed by side loading e.g. back-fill soil, and/or by water pressure, or is periodically side-loaded by wind loading if the panel is used above ground. The inner layer is stressed in tension resulting from the side loading. The reinforcing intercostal web portions 50 are stressed both by side loading and compression loading. Thus, all of the highly stressed areas of the building panel are developed at a common thickness of the fiber reinforced polymeric material, resulting in an efficient use of materials and structure.

In the building panel illustrated in FIG. 26, foam blocks 32, wrapped in fiberglass layers, are laid side-by-side, the same as are foam blocks 32 in FIG. 24. Stud cores 23 are illustrated as being pultruded rectangular hollow tubes which lie against the wrapped foam blocks. Stud cores 23S can, as desired, be elongate foam blocks. Further, studs 23 and/or stud cores 23S need not be pultruded, and thus can be made by any of the processes known for making fiber-reinforced cured FRP structures. Further, in any of the embodiments, stud cores 23S can be other non-flammable structural material such as the earlier-mentioned steel stud profiles.

Returning to FIG. 26, FRP inner layer 34 overlies studs 23 thus trapping the studs between the inner layer and the foam blocks. FRP outer layer 36 lies against foam blocks 32 on the opposite sides of the blocks from the inner layer. An additional reinforcing layer 36R is disposed outwardly of outer layer 36 such that layer 36 is between layer 36R and wrapped foam blocks 32.

The specifications for layer 36R, including fiber content, polymer content, polymer selection, layer thickness, and method of making the layer are typically the same as for layers 34 and 36.

In some embodiments, layer 36R is added to a section of a building panel or a wall, optionally less than the entirety of the building panel or wall. Layer 36R may be added to layer 36 by e.g. adhesively mounting a fiberglass layer to layer 36 and then brushing or otherwise adding resin to the fiberglass layer, thus to fill the matrix represented by the fiberglass layer, with resin, or simply by placing the fiberglass layer on layer 36 and adding curing liquid resin to the fiberglass layer, whereby the added resin provides the bonding between layers 36 and 36R. The fiber-resin combination is then cured, thereby creating structurally-effective reinforcing layer 36R.

Layer 36R can be used selectively e.g. in locations on a wall where peak loads are expected to be applied to the wall and wherein remainder portions of the wall have adequate strength to tolerate the loads expected to be applied at such remainder portions and so do not include layer 36R. Such selective, and limited, use of reinforcing layer 36R adds to cost-efficiency of the wall by allowing a substantial portion of the length of the wall to be specified for less capacity than is needed at the peak load locations, and using layers 36R to strengthen the wall at such peak load locations.

A reinforcing layer such as a layer 36R can be used in association with the outer layer of the wall to strengthen the wall at the outer layer, or can be used in association with the inner layer to strengthen the wall at the inner layer, or can be used at both the outer layer and the inner layer. The reinforcing layer, whether inner layer or outer layer, can be continuous along the length of the wall, or can be discontinuous, used e.g. only where peak loads are to be applied to the wall.

A second reinforcing layer 34R is illustrated in FIG. 25, in combination with reinforcing layer 36R. Layer 34R is shown disposed inwardly of inner layer 34. Layer 34R is shown covering layer 34 only in two of cavities 131. Thus, layer 34R illustrates the principle that layer 34R can be employed to provide localized increased strength in the panel, namely around a peak load region of the wall. Similarly, reinforcing layer 36R, shown covering the entirety of outer layer 36 in FIG. 26, can also be used on only part of the length of the building panel, or only part of the length of the wall. Contrary to the illustration in FIG. 26, namely in an embodiment not shown, inner layer 34R can, in the alternative, extend over and about studs 23 whereby layer 34R is continuous from one channel 131, about a stud, and into an adjoining channel.

Layer 34R can be continuous to so extend over any number of the studs and into any number of the channels 131. Layers 34R and 36R are both optional. Layers 34R and 36R may each or both be used over only part of the length of the wall, or may be used over the entire length of the wall. Wherever a layer 34R or 36R is used, the respective layer is typically applied over substantially the entire height of the respective building panel.

The panel illustrated in FIG. 26, including layer elements 34R as specified, can be made by a vacuum infusion molding process such as that illustrated in FIG. 23. First, any reinforcing layer fiberglass 34R is laid in the bottom of the mold, including into recesses 302 as specified. Next, the fiber precursor to layer 34 is laid over the layer 34R fiberglass in the bottom of the open mold, and is worked into recesses 302. Studs 23 are then placed into recesses 302, pushing layer 34 fully into recesses 302 in the process, with the result that the layer 34 is laid generally flat between adjacent recesses 302, and the tops of the studs are generally co-planar with the top of layer 34.

Next, foam blocks 32, pre-wrapped with fiberglass layers 314, are laid flat on top of studs 23 and layer 34, edge to edge in the mold.

Next, layer 36 fiberglass is placed on top of the wrapped foam blocks, and layer 36R fiberglass, if specified, is placed on top of the layer 36 fiberglass.

The mold is then closed and evacuated, and resin is infused into the mold and cured. Layers 34R may be incorporated into the panel during the molding process, or can be added as desired, e.g. for localized reinforcement, after the panel is removed from the mold.

As elements of the panel, and when talking about the fiber content of respective layers, the fiber is sometimes referred to herein as fiberglass "layers" and is described in terms of the FRP layers into which such fiberglass layers will be incorporated in the resin-infused finished product. Those skilled in the art understand that the fiber layers are exactly that, fibrous layers, and that designating such fibrous layers in terms of the layers of the finished panel is done for sake of simplicity of the description. Those skilled in the art will recognize that the resin has not been added to the panel precursor unless so stated, whereby the layer designation applies to the fiber alone, and that such fiber ultimately becomes part of the recited FRP layer.

FIG. 27 shows a building panel having no intercostal reinforcements, namely no intercostal webs 50, no other reinforcement extending between the inner and outer layers. FIG. 27 does show an intermediate layer 39 between studs 23 and a foam board 32BD. Foam board 32BD is generally continuous along the full height and width of the building panel, and across the full thickness of the building panel between intermediate layer 39 and outer layer 36. Specifications for foam board 32BD, including polymer content, density, rigidity, and the like, are the same as for foam blocks 32 illustrated with respect to other embodiments of the invention. Specifications for intermediate layer 39, including fiber content and orientation, polymer quantity, polymer composition, layer thickness, and method of making the layer may be the same as for any of layers 34 and 36, or may be specified differently. Such layer 39 is conveniently affixed to the foam board with any of the conventionally-known effective construction adhesives, or layer 39 may be incorporated into the panel in the process of making the panel whereby the resin affixes layer 39 to the foam board.

FIG. 27 also shows a reinforcing layer 36R disposed outwardly of outer layer 36 such that outer layer 36 is between reinforcing layer 36R and the foam board 32BD. The specifications for layer 36R in the embodiments of FIG. 27, as with the embodiments of FIG. 26, including fiber content and orientation, polymer quantity, polymer composition, layer thickness, and method of making the layer, may be the same as for any of layers 34 and 36, or may be different. Such layer is conveniently affixed to outer layer 36 with any of the conventionally-known effective construction adhesives, or layer 36R may be incorporated into the panel in the process of making the panel whereby the resin affixes layer 36R to the foam board. Layers 36R and 39 are both optional.

The panel illustrated in FIG. 27 can be made by the vacuum infusion process of FIG. 23. First, fiber layer 34 is laid in the bottom of the open mold and is worked into recesses 302. Studs 23 are placed into recesses 302, pushing layer 34 fully into recesses 302 in the process, with the result that layer 34 is laid generally flat adjacent recesses 302 and the tops of the studs are generally coplanar with the top of layer 34 outside the recesses.

Next, a foam board 32BD, which extends the length and width of the mold, is laid on layer 34.

Next, layers 36 and 36R are sequentially laid on the foam board. The mold is then closed, sealed, and evacuated; and resin is infused into the mold and cured.

In any of the infusion molded product, flow channels are created as needed, optionally including through the foam board, in order to facilitate flow of the resin into substantially all of the space inside the mold.

FIGS. 28 and 29 show yet another embodiment of building panels of the invention. The embodiment of FIGS. 28-29 uses foam blocks 32 in a side-by-side relationship in the main run portion of the panel, an outer layer 36, an inner layer 34, and studs 23.

Each foam block 32 has an outwardly-facing surface 32FS, an inwardly-facing surface 32IF, and opposing side-facing surfaces 32SF which connect the inwardly and outwardly-facing surfaces. In the embodiment of FIGS. 28-29, a layer 190 of fiberglass is wrapped about each foam block, covering outwardly-facing surface 32FS and the two side-facing surfaces 32SF. The edges of the fiberglass wrapping layer are drawn about the corners of the foam block where the side-facing surfaces meet inwardly-facing surface 32IF, and terminate proximate those corners, and staples 372 are driven through the fiberglass layer near the respective edges of the fiberglass layer, and into the foam blocks on inwardly-facing surface 32IF, thus securing the fiberglass wrapping layer to the foam block. With a foam block so wrapped, and before such foam block is assembled into a panel 14, the inwardly-facing surface 32IF of the foam block is thus not overlaid by fiberglass layer 190, and remains exposed. In the alternative, layer 190 can extend across the entirety of inwardly-facing surface 32IF, though at additional cost.

In the embodiments of FIGS. 28 and 29, those portions of layers 190 which overlie the outwardly-facing surfaces 32FS of the foam blocks collectively define the structural portion of the fibrous reinforcement for outer layer 36, and thus are marked with layer 36 designations. An additional flow-control layer 36F of fiberglass overlies the wrapped foam blocks.

The inwardly-facing surfaces of the foam blocks are covered by an inner flow-control layer 34BF of fiberglass.

Still referring to FIGS. 28-29 a stud 23 has a core defined by a stud foam block 32S. Stud foam block 32S has an inwardly-facing surface 32SIF facing away from inner flow control layer 34BF, two side-facing surfaces 32SSF, and an outwardly-facing surface 32SOF facing toward flow control layer 34BF.

A layer 308 of fiberglass is wrapped about each stud, covering inwardly-facing surface 32SIF and the two side-facing surfaces 32SSF. The edges of the fiberglass wrapping layer 308 are terminated at the corners of the stud foam block which are defined where a side-facing surface 32SSF of stud block 32S meets the outwardly-facing surface 32SOF of foam block 32S. Staples 372 are driven through fiberglass layer 308 and into foam block 32S adjacent the corresponding corners, thus securing the fiberglass wrapping layer to the respective foam block 32S before the wrapped stud precursors are assembled into a panel.

Inner layer 34 of the panel covers/overlies flow control layer 34BF and wraps about each of the studs, namely about the outwardly-facing surface 32SOF and the two side-facing surfaces 32SSF of the studs.

FIG. 29 is an enlarged view of a portion of the panel shown in FIG. 28 and thus shows especially the fiberglass schedule in more detail. Starting at outer surface 56 of the panel, layer 36F is a flow control layer which facilitates flow of resin during a vacuum infusion process of making the panel. An exemplary fiberglass material for layer 36F is described as one ounce per square foot continuous filament matt (CFM) fiberglass.

Referring again to FIG. 29, layer 190 is seen to be composed of two sub-layers. A flow-control sub-layer 190F is disposed against the outwardly-facing surface 32FS, and the side-facing surfaces 32SF, of a foam block core 32FC. A structurally more robust sub-layer 190S, which provides the bulk of the strength of layer 36, is disposed between flow control layer 190F and outer flow control layer 36F.

An exemplary material for layer 190 embodies a total of 55-ounces per square yard of fiberglass. Layer 190 has a first sub-layer defined by 51-ounces per square yard of fiberglass rovings, with the rovings oriented along the top-to-bottom height of the panel and designated as 190S, and a second sub-layer has 4-ounces per square yard of fiberglass, as sub-layer 190F, oriented perpendicular to the rovings in sub-layer 190S; with sub-layers 190F and 190S stitched together to form a single structural fiber-reinforcing element which is used as the fiber reinforcement layer 190.

The upwardly-oriented fibers in a vertical panel are oriented zero degrees to about 15 degrees from vertical in order to take advantage of the inventors' discovery that such upright orientation of a substantial portion of the fibers provides a significant increment to vertical crush strength of the panel. Typical orientation is within 10 degrees, optionally within 5 degrees, optionally within 3 degrees, of vertical.

The fraction of fibers which are so upwardly oriented is at least about 60% by weight of the fiber in the panel, optionally at least about 70%, optionally about 80-85% by weight.

Still referring to FIG. 29, layer 308, which wraps stud foam blocks 32S, is seen to be composed of two sub-layers. A structurally more robust sub-layer 308S, which provides the bulk of the strength of layer 308, is disposed against the inwardly-facing surface, and the side-facing surfaces, of stud foam blocks 32S. A flow control sub-layer 308F is disposed outwardly of sub-layer 308S such that sub-layer 308S is positioned between stud foam block 32S and flow control sub-layer 308F.

An exemplary material for layer 308 is the same 2-layer fiberglass material used in layer 190, with the 51-ounce per square yard rovings sub-layer 308S disposed toward the stud foam block 32S and oriented in alignment with the lengths of the studs, and with the 4-ounce per square yard flow control sub-layer 308F disposed relatively away from the stud foam block 32S and oriented perpendicular to sub-layer 308S.

Again referring to FIG. 29, layer 34 is seen to be composed of 2 sub-layers. A structurally more robust sub-layer 34S is disposed against layer 34BF between studs 23, and against flow control layer 308F about studs 23. A flow control sub-layer 34F is disposed outwardly of structural sub-layer 34S such that sub-layer 34S is between flow control layers 34F and 308F.

In an exemplary panel as illustrated in FIGS. 28-29, foam blocks 32 are nominally 3 inches thick and 8 inches wide while the respective layers are about 0.13 inch thick. For purposes of facilitating visualization of the ends of layer 190 on the inwardly-facing surfaces 32IF of foam blocks 32 in FIGS. 28-29, a space is shown at the inwardly-facing surface of each foam block 32 between the facing ends of layer 190. Those skilled in the art will recognize that, in light of the distortion of the relative dimensions of the foam blocks versus the thickness of the FRP layers, the spaces shown at the surfaces of the foam blocks are actually of nominal, if any, thicknesses whereby, during the process of drawing vacuum in the mold, and infusing resin, the vacuum causes the fiberglass of layers 34BF and 34 to collapse toward the surfaces 32IF of the foam blocks. Under the same influence of the vacuum, the ends of layer 190 which wrap the corners at that surface become compressed, and resin fills any remaining voids proximate such ends, whereby the illustrated spaces are in fact fully occupied by fiber and resin, and do not exist as spaces in the molded, cured panel.

FIG. 28 illustrates three embodiments of use of an anchor 158, 158A, 158B, first introduced at FIG. 7, at the base of a stud. Such anchors are used to tie together a concrete slab floor and the building panel, at the base of the building panel. Accordingly, such anchor is located below the height of the top of the concrete slab such that the anchor is embedded in the concrete slab e.g. at about the mid-point of the depth of the concrete slab. In each instance, the anchor extends through an aperture in the stud, and extends outward from the stud into space which is occupied by the concrete slab.

In the first instance, the anchor is indicated, in FIG. 28O, in solid outline at 158, extending through a stud 23, including through legs 128. Anchor 158, as illustrated, is generally parallel to inner surface 25 of the panel and generally parallel to the bottom of the panel. Anchor 158 extends from both sides of the stud, and continues in a straight line part way across channel 131. In the illustrated embodiment, anchor 158 extends e.g. 2-6 inches away from each leg 128 of the stud.

In the second instance, the anchor is indicated, in FIG. 28, in dashed outline at 158A. What was a straight-line anchor 158 has been fabricated, at 158A, into an open loop, with the open side of the loop extending away from the panel.

In the third instance, the anchor is indicated, in FIG. 28, in dashed outline at 158B, continuing in a straight line across the channels 131 and through each of the studs. In this embodiment, the anchor is continuous, or generally continuous, or effectively continuous, and extends the full length of the panel, including through adjacent ones of the studs.

The actual configuration of the anchor is not critical so long as the anchor can be suitably mounted in the panel, and extends into the 3-dimensional space which is occupied by the concrete slab floor. Where individual anchors are used, the anchors are spaced close enough to each other to securely connect the slab to the wall. Typical spacing for anchors which anchor a conventional concrete wall to a conventional concrete footer or to another type of underlying concrete wall is 6 feet on center between anchors, and so 6 feet on center is believed to be an acceptable spacing for any configuration of anchors 158 or 158A. The spacing can be adjusted, closer, or farther apart, according to the structural needs of the building.

Anchors 158, whatever the configuration from the top view, can readily be fabricated from e.g. ⅜ inch (0.95 cm) to ½ inch (1.3 cm) diameter steel reinforcing rod stock. Such stock can be cut, bent, and otherwise fabricated into a wide variety of outlines, configurations for insertion into and through studs 23.

In the alternative, anchors 158, 158A, 158B can be FRP products thus to avoid the negative features of using steel in an environment which can become wetted with water. For example, anchors 158, 158B can be fabricated from pultruded rod stock. Similarly, anchors 158A can be molded FRP articles.

In any infusion molding process, it is critical that resin infuse all of the fibrous elements of the panel precursor which is in the mold. The purpose of flow control layers 36F, 190F, 34BF, 308F, and 34F is to facilitate flow of liquid resin throughout the panel construct during the process of fabricating the panel using a vacuum infusion molding process, thus to accomplish full and uniform distribution of resin throughout the mold. While exemplary flow structures have been described as 1 oz/sq ft (34 g/sq meter) CFM and 4 oz/sq ft (135.5 g/sq meter) (randomly oriented), both uni-directionally oriented, a wide variety of fibrous structures are available, which have characteristics compatible with facilitating resin flow in the precursor assembly. And, the invention contemplates use of flow-control layers in a variety of other locations, depending on the detail of the structure and location of other elements of the panel profile.

In addition to the flow control layers, which are illustrated herein, foam blocks 32 and/or 32S, or other panel elements, can be provided with elongate flow channels/grooves in order to further facilitate flow of resin throughout the panel construct in a resin infusion process. Yet further, the fiber webs can be provided with spaced apertures to facilitate flow of resin through the webs at such specified locations.

In the embodiments illustrated in FIGS. 28-29, using the fiber layers and layer specifications given herein, and using a vacuum infusion process for making panel 14, after curing of the infused resin, inner and outer layers 34 and 36, each including its corresponding flow layers and sub-layers, if any, are each about 0.13 inch (3.3 mm) thick. The combined thickness of the polymer-infused fiberglass layers, cured, at the facing side-surfaces of each set of adjacent facing blocks is about 0.13 inch (3.3 mm) thick, thus creating an intercostal 50 having corresponding thickness. The combined thickness of layers 34 and 308 at the outer surfaces of studs 23 is about 0.13 inch (3.3 mm). At each stud 23, one of the legs is typically aligned with a corresponding one of the intercostals 50. Foam blocks 32 are about 3 inches thick and about 2 lbs/ft³ density. Studs 23 extend about 3.5 inches from surface 25.

In such a panel, which is 9 feet (2.7 meters) high, lateral deflection at rated vertical and horizontal loads can be limited to no more than about 0.9 inch anywhere on the panel.

Referring to FIGS. 28-29, the main run portion of a typical building panel, for use in underground residential applications such as foundation walls for single-family homes, has a nominal thickness "T" of about 3 inches. Studs 23 are about 1.6 inches wide and project inwardly about 3.6 inches from outermost surface 25 of inner layer 34 at the main run portion of the panel at surface 25. Inner layer 34, outer layer 36, and intercostals 50 are each fiberglass reinforced polymeric layers about 0.13 inch thick. Studs 23 have walls about 0.13 inch thick. The foam in foam blocks 32 and in studs 23 is polyisocyanurate foam having density of about 2.0 pcf. Such building panel has a mass of about 55 pounds per linear foot, a vertical crush resistance capacity at least of about 15000 pounds per linear foot, and a horizontal bending resistance, when loaded at its designed load, of at least L/120, optionally at least L/180, optionally at least L/240, where "L" is the straight line dimension of the panel, top to bottom, when the panel is installed in an upright orientation.

Depending on the safety factors desirably built into the building panels, and given a known typical load capacity of 15000 pounds per linear foot in the above-illustrated example, the vertical crush resistance can be engineered to be as little as about 4000 pounds per linear foot, optionally at least about 6000 pounds per linear foot, typically at least about 8000 pounds per linear foot. At least 10,000 pounds per linear foot can be specified, as can at least 12,000 pounds per linear foot, namely any capacity up to the maximum known capacity with 0.13 inch thick layers, of about 15000 pounds per linear foot.

The panels illustrated herein, which incorporate foam cores in their studs, can be made by the vacuum infusion method provided that suitable provisions are made for resin flow, such as the flow control layers described with respect to FIGS. 28 and 29, and/or flow channels in the foam blocks or other elements of the panel.

Figure 30:
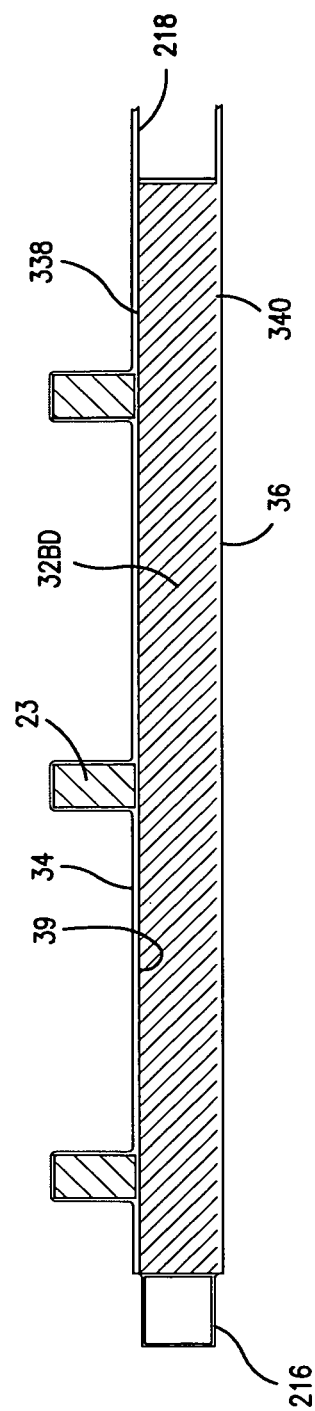
FIG. 30 shows a plan view of a foam-filled panel having studs but no reinforcing intercostals.

FIG. 30 illustrates an embodiment where layer 39 is retained but layer 36R has been omitted. In FIG. 30, the respective layers are represented by single lines. The structure of FIG. 30 includes foam board 32BD, outer layer 36 on an outer surface of board 32BD, intermediate layer 39 on an inner surface of board 32BD, inner layer 34 overlying intermediate layer 39, and studs 23 between intermediate layer 39 and inner layer 34. Layer 39 can be omitted such that studs 23 lie directly against foam board 32BD. FIG. 30 further illustrates male 216 and female 218 ends on the panel. Male end 216 is shown as hollow, but can, as desired, be filled with thermally insulating foam discussed elsewhere herein.

FIG. 30 illustrates a panel 14 devoid of intercostals 50. For strength-enhancing features, panel 14 of FIG. 30 employs studs 23 and intermediate reinforcement layer 39, in addition to inner and outer layers 34, 36. Further, inner layer 34 extends over studs 23 whereby studs 23 are trapped between inner layer 34 and reinforcement layer 39. FIG. 30 shows spacing the studs 16 inches apart, with corresponding spacing of the male and female panel ends so as to accommodate common construction protocol across joints between panels, which protocol spaces studs e.g. 16 inches apart along the length of the wall for purposes of interfacing such studs with commonly-sized and commonly-available construction materials.

A variety of spacing elements have been shown interposed between the inner and outer layers, spacing the inner and outer layers from each other, and fixing the dimensional spacing of the inner and outer layers with respect to each other. The illustrated spacing elements include foam board 32BD, multiple foam blocks 32, intercostal webs 50, 150 wrapped FRP layers in combination with foam blocks, and foam blocks in combination with intercostal webs 50. The spacing elements can take on a variety of other shapes, structures, profiles, and materials, so long as the spacing elements effectively fix the spacial relationships of the inner and outer layers with respect to each other.

The various foam elements disclosed herein between the inner and outer layers are of sufficient density, rigidity, and polymer selection to fix the positions of the inner and outer layers in their respective positions relative to each other in panel precursors prior to curing the resin, and to maintain such positioning while resin is being added and cured. Once the resin is cured, the cured resin becomes the primary determinant of maintaining the positions of elements in the panel, as well as the primary determinant of the shape of the panel. Thus, while not required of the foam in all instances, the foam can contribute significantly to the dimensional stability of the panel precursor while the panel is being assembled and cured while the resin takes on that role once the resin has become cured. Typically, the foam also provides substantial thermal insulation properties between the inner and outer layers.

In a simple form, a building panel of the invention includes only inner layer 34, outer layer 36, and studs 23, with foam, such as a foam board, or foam blocks, generally filling the space between inner layer 34 and outer layer 36.

In an embodiment not shown, studs 23 can extend into the space between inner layer 34 and outer layer 36, thus into the main-run portion of the building panel, but not extend across the full thickness "T4" (FIG. 27) of the space defined between the inner and outer surfaces of the foam in the main run portion of the building panel. Thus, the foam board can be provided with grooves to receive the studs. It is also contemplated that the surface of the foam board can be pre-stressed or otherwise modified to receive the studs, or depressed or crushed by the studs as the studs are assembled into the building panel assembly; whereupon a residual internal resilient force in the building panel assembly may continue to actively push the studs away from foam board 32BD and inwardly toward the interior of the e.g. building.

Studs 23 can be located over any structurally-reinforcing intercostal bridging member which bridges between the inner and outer layers, as illustrated in FIGS. 24, 26, and 28-29. Where a stud overlies an intercostal bridging member, one or both legs 128 of the stud acts together with the bridging member whereby no net bending moment is created at inner layer 34 adjacent the stud. The gross bending moments created in FIG. 24 at layer 34 by stud legs 128 are located on both sides of the bridging member, and thus tend to cancel each other out because of the opposing bending moments created by the respective forces whereby a stud which straddles a bridging member is treated herein as creating no net bending moment.

Where, as in FIGS. 28-29, a stud leg 128 directly overlies, and is in substantial alignment with, a bridging member, the stud leg acts in line with the bridging member whereby the combination of the stud leg and the bridging member, in combination, act like the web of an I-beam such that the bending resistance of the bridging member is additive to the bending resistance of the stud leg in opposing a force imposed perpendicular to the inner layer or perpendicular to the outer layer.

Thus, in these embodiments, the stud leg and the intercostal support each other in the sense that an intercostal receives loads from e.g. outside layer 36, and transfers substantial portions of the load through the panel toward the interior of the building. Inner layer 34 will tend to deflect. But stud leg 128, which is aligned with the direction of the force vectors is not so readily deflected as the inner layer, and so receives and resists the load, sharing the load-resisting function and thereby eliminating or substantially reducing any tendency for the wall/panel to bow inwardly.

Whatever the materials used as the reinforcing fiber, the foam, and the resin, including e.g. resin fillers, all of such elements, including UV inhibitors and fire retardant additives, are chemically and physically compatible with all other elements with which they will be in contact, such that no deleterious chemical or physical reaction takes place in wall systems of the invention.

Figure 31:
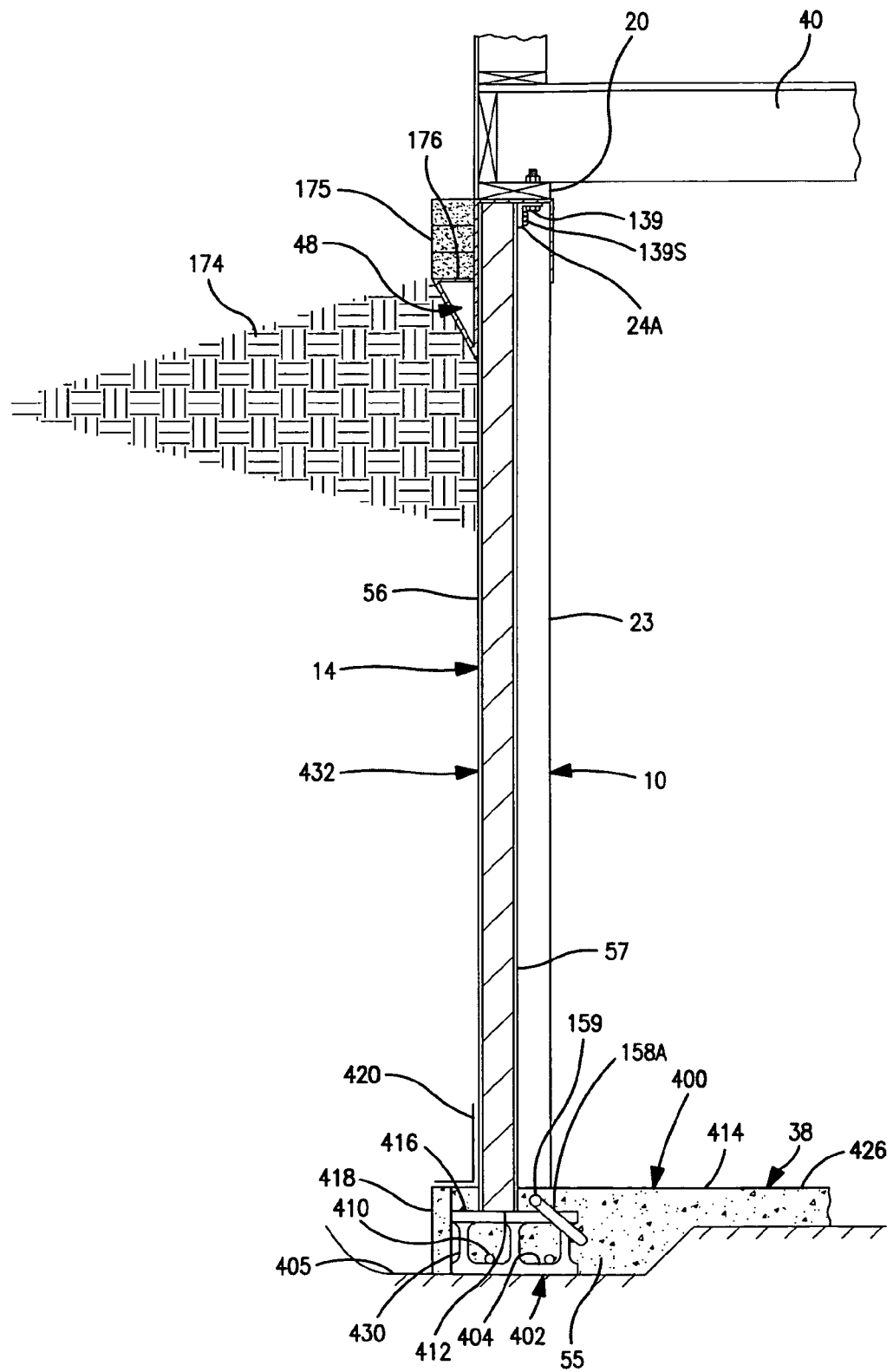
FIG. 31 is an elevation view cross-section of a foundation wall structure of the invention showing a hollow concrete block as a mini footer.

FIGS. 31-36 illustrate a building system foundation wherein a concrete footer under a foundation wall merges with a concrete floor inside the building such that the concrete footer and the concrete floor are integral with each other and can therefore be formed simultaneously, as a single unitary base 400 of the building, after the wall 10 has been erected. FIG. 31 is an elevation view and is derived from the elevation view of e.g. FIG. 7, with the stone footer of FIG. 7 being replaced with the concept of a concrete footer 55 as in FIG. 3.

FIG. 31 shows a wall 10 functioning as a below-grade foundation wall. In the embodiment illustrated in FIG. 31, a mini footer 402 illustrated as an 8-inch by 8-inch by 16-inch pre-fabricated concrete block, having apertures 404 is supported by the natural support base 405, e.g. the naturally-occurring soil/rock which underlies the building. Such dimensions are recited for the pre-fabricated concrete block in the context that the recited dimensions are the dimensions of commercially available such blocks. If desired, blocks of other dimensions can be used where available.

In some embodiments, the natural base may be undisturbed. In other instances the natural base may be machine-compacted before setting concrete blocks 402.

As seen in FIG. 31, a plurality of such pre-fabricated concrete blocks are spaced along the length of the wall as spaced mini footers. In a straight-run portion of a wall, such blocks are spaced up to 6 feet (1.8 meters) apart, and are leveled individually, and with respect to each other, to the same tolerances as are allowed for a conventional, separately-poured concrete footer. In the embodiment illustrated in FIG. 31, the blocks are registered with ones of the studs 23 such that each block underlies one of the studs. With studs 23 spaced on 16-inch (40.6 cm) centers, and keeping within the 6 feet (1.8 meters) maximum distance apart, a block is placed to support the wall under every fourth stud or less.

Figure 32:
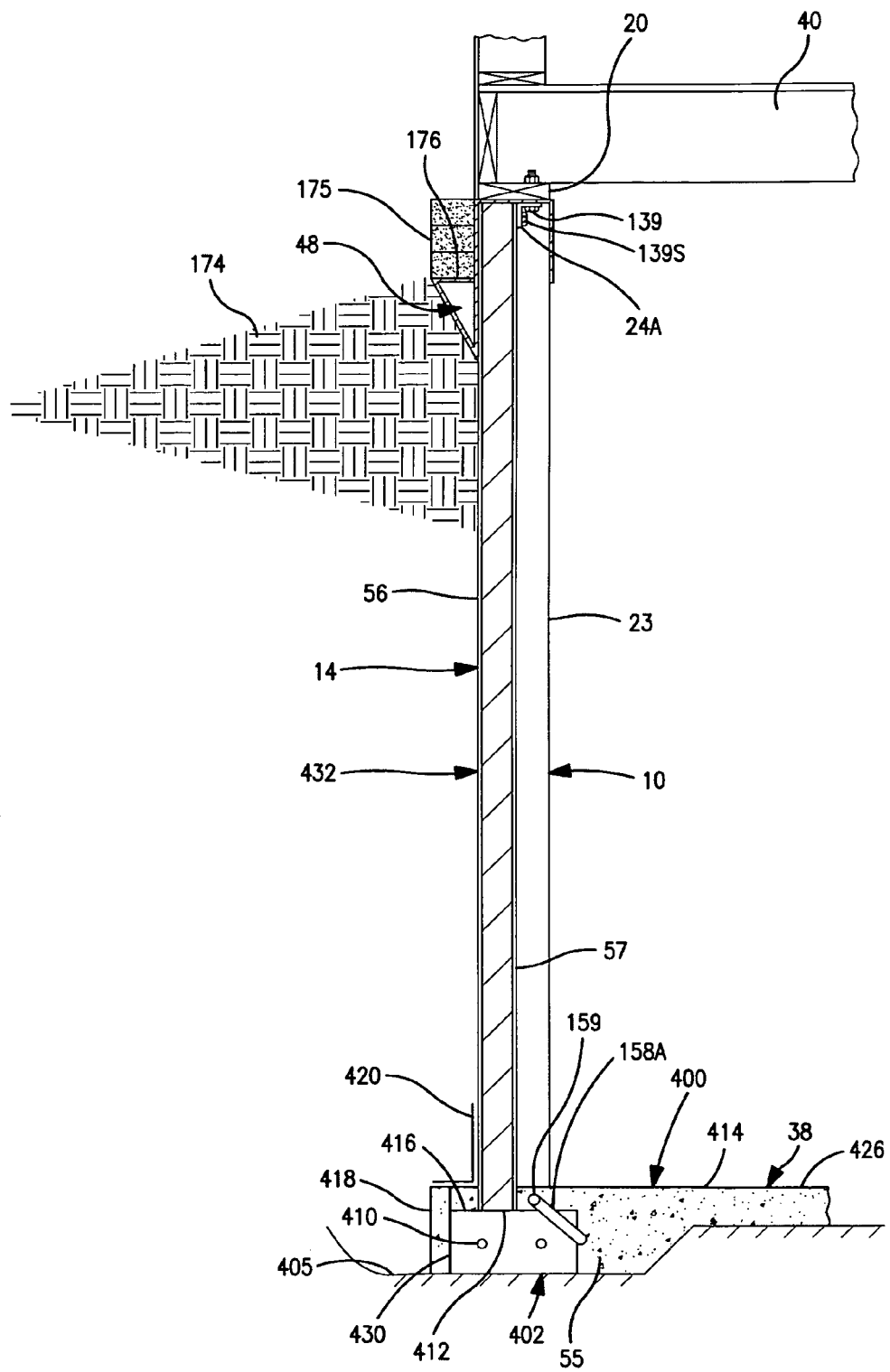
FIG. 32 is an elevation view as in FIG. 31, showing a solid poured concrete mini footer, with steel reinforcing rods extending through the mini footer.

FIG. 32 illustrates a building system foundation as in FIG. 31 wherein the prefabricated concrete block, as the mini footer, has been replaced by a poured-in-place solid concrete block, and where reinforcement rods 410 have been incorporated into the solid-block mini footer prior to the hardening of the poured-in-place concrete.

Figure 34:
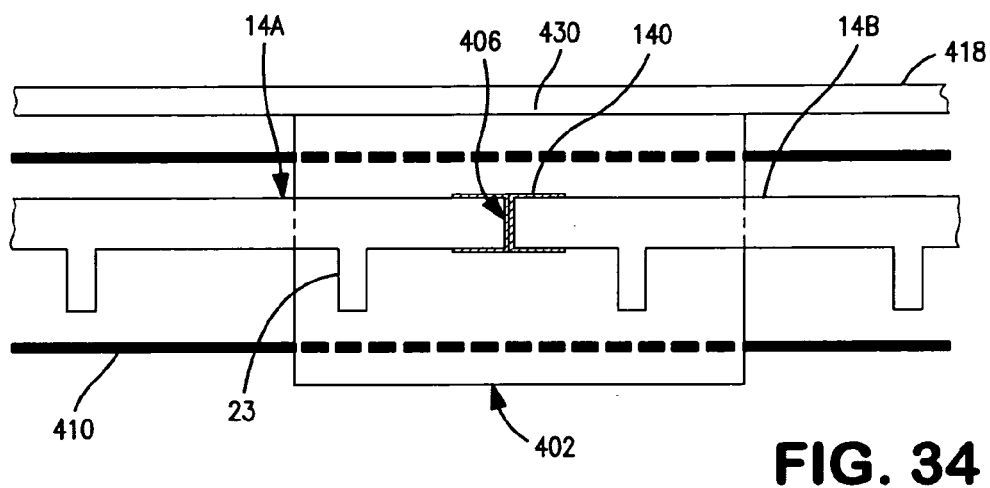
FIG. 34 is a top view of a straight portion of a wall structure, illustrating use of a mini footer at a joint in the wall.
Figure 35:
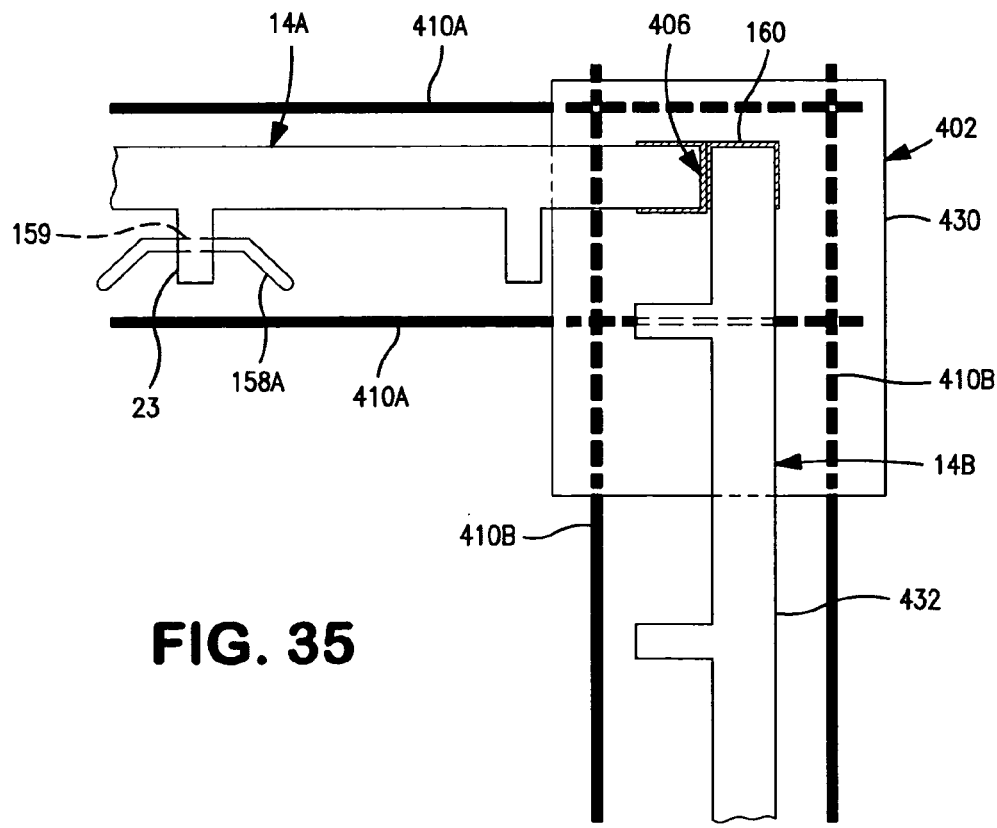
FIG. 35 is a top view of a corner portion of a wall structure, illustrating use of a mini footer in a corner wall structure.
Figure 39:
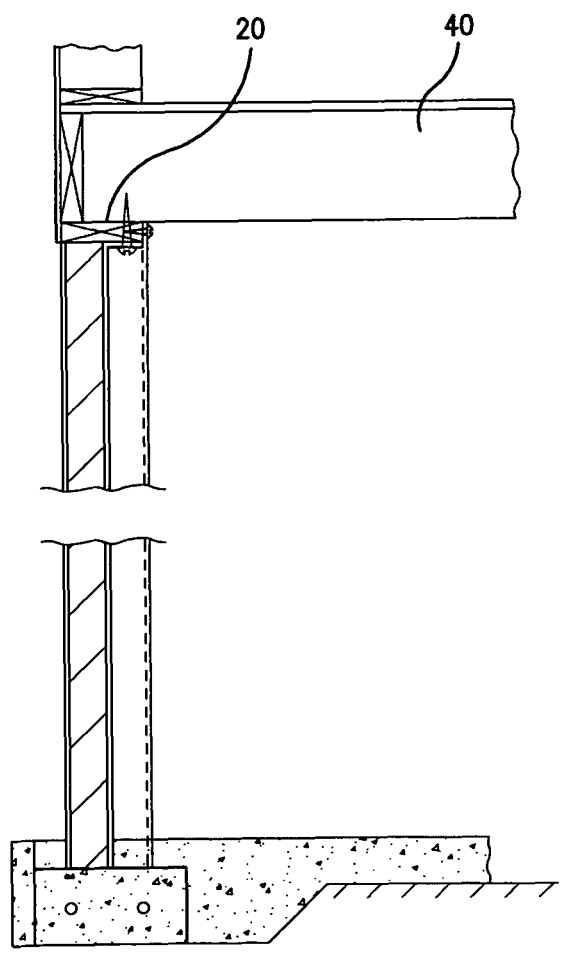
FIG. 39 shows a fragmented elevation view cross-section of a wall structure showing securement of the flanged studs to underlying and overlying structure.

FIGS. 34, 35, and 36 illustrate that, irrespective of other spacings of the mini footers, a mini footer 402 is positioned under each joint 406 between panels 14 in the wall, including in straight-run sections of the wall as in FIG. 34, at each corner where the wall changes direction as illustrated in FIG. 35, and at each shear wall 408 support structure as illustrated in FIG. 36. Thus, a joint is defined by the combination of two or more panels which interface through a joint connector such as, without limitation, connectors 140 or connector 160.

Still referring to FIGS. 31-36, steel reinforcing rods 410 extend through the mini footers, whether through a solid concrete mini footer, or through apertures 404 in pre-fabricated concrete blocks. Reinforcing rods 410 are tied together in the customary manner with rod ties, including where the wall changes direction such as at wall corners, and at shear wall intersections.

Figure 33:
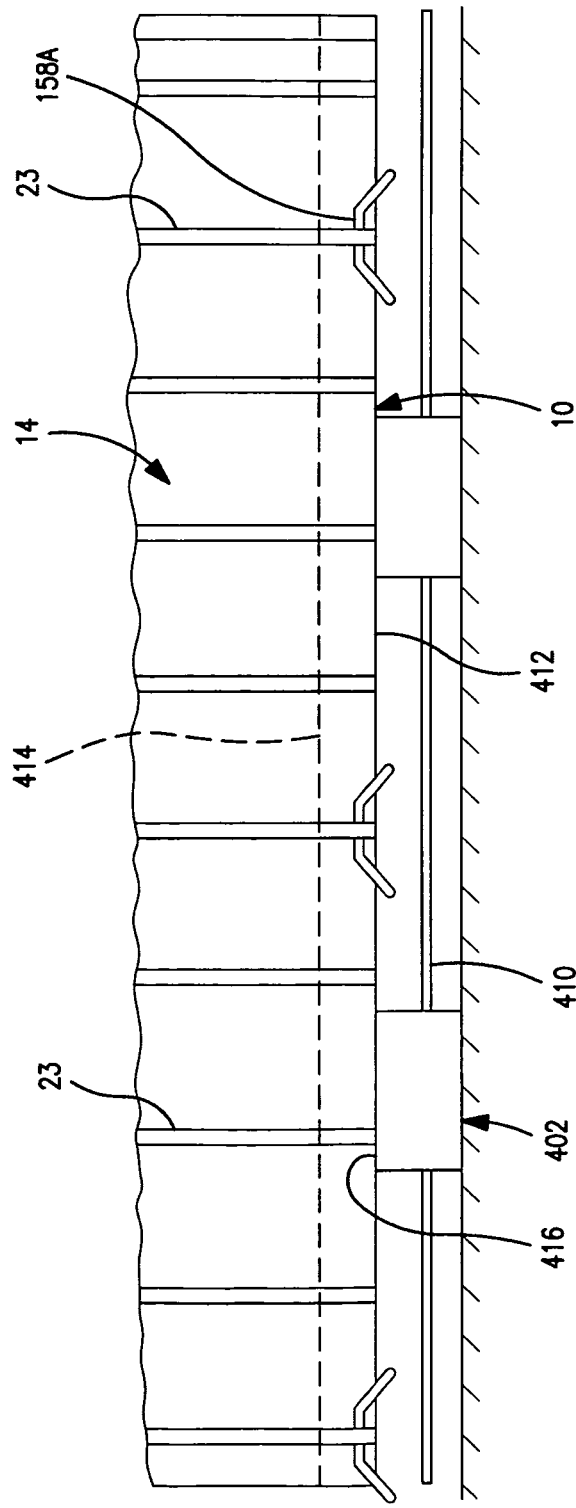
FIG. 33 is a side elevation view of a lower portion of the foundation wall of FIG. 32, with the top of the floor/footer shown in dashed outline.

As illustrated in FIGS. 31-33, the bottoms 412 of building panels 14, including the bottoms of studs 23, and thus the bottom of wall 10, interface directly with, and are in part directly supported by, underlying mini footers 402. The bottoms of the building panels extend, and thus the bottom of the wall extends, in a generally straight-line, constant elevation between sequential ones of mini footers 402 whereby the support of wall 10 by mini footers 402 is intermittent.

Referring to FIGS. 31-33, the elevation of the top 414 of base 400, is defined by the top of slab 38 and the top of the main footer components 55. The elevation of the top 414 of the base is shown in dashed outline in FIG. 33 because FIG. 33 shows a precursor assembly before ready-mix concrete, which may be known by such names as "Quik Crete", has been poured in fabricating the main footer body. The top of the base is above the elevation of the tops 416 of mini footers 402 such that the bottoms 412 of panels 14 and wall 10 extend below the top 414 of base 400, and are thus embedded well below the top of base 400, for example at least 1 inch, and up to about 8 inches, below the top of base 400.

Referring to FIGS. 31, 32, and 35, apertures 159 extend through respective ones of studs 23. U-shaped, or otherwise angular, anchors 158 extend through apertures 159, for example through such apertures in every "nth" stud. FIGS. 31 and 32 show an anchor 158 extending downwardly at an angle of e.g. about 30 degrees to about 60 degrees, for example about 40 degrees, from horizontal, from a respective aperture 159. The downward angle positions the distal portions of the anchor generally toward the mid-point of the elevation of the footer portion of base 400. Anchors 158 thus make connection with base 400 at the thickest portions of footer component 55 of base 400. As desired, continuous-length runs of anchors, such as at 158B in FIG. 29, or intermittent straight-runs of anchors as at 158A in FIG. 28, can be used in place of the angular anchors 158.

Either temporary or permanent forms can be used in fabricating base 400. FIG. 33 illustrates use of a permanent footer form 418 with an integral water drain. A suitable such permanent footer form is available as FORM-A-DRAIN®, available from Certainteed Corporation, Valley Forge, Pa. The FORM-A-DRAIN® line of products is a perforated product which is designed to receive water which has travelled down the outside of a foundation wall and to channel such water to a discharge venue, thus controlling flow of water at the base of the wall.

A below grade sealing membrane 420 is positioned in the corner where the lower portion of the outer surface of wall 10 meets the top of base 400, thus to provide a water barrier on the outside of the wall along the length of the base of the wall where the FRP wall meets the concrete footer portion of base 400. An exemplary membrane 418 is a rubberized asphalt product having a puncture resistant core layer. A suitable such membrane is available from Amerhart Lumber and Building Distributor, Green Bay, Wis., as BITUTHENE 3000®, made by WR Grace.

FIG. 34 illustrates use of an H-connector 140 at a joint 406, joining first 14A and second 14B panels in a straight-run portion of a wall 10, and wherein reinforcing rods 410 are continuous across the joint between panels 14A and 14B. A mini footer 402 is positioned under, directly interfaces with, and supports, each of panels 14A, 14B, and supports connector 140.

FIG. 35 illustrates use of a corner connector 160 at a joint 406, joining first 14A and second 14B panels in a right-angle corner construction of the wall 10. In FIG. 35, a mini footer 402 is positioned under, and directly interfaces with, both of panels 14A, 14B and supports connector 160. Mini footer 402 is oriented such that reinforcing rods 410B are aligned with the length of panel 14B. A second pair of reinforcing rods 410A are aligned with the length of panel 14A and intersect with, and are connected to, the first pair of rods 410B. Where a poured-in-place mini footer is used, reinforcing rods 410A, 410B can be bent at right angles and set in the still-flowable concrete, or can be positioned in the form before the concrete is added to the form, such that respective reinforcing rods traverse both angles of the corner defined by panels 14A, 14B.

FIG. 36 illustrates use of a 3-way FRP connector 422 joining an FRP shear wall 424 to a section of the outer wall at a joint 406 between panels 14A and 14B. As with the other joints discussed herein, a mini footer 402 directly interfaces with, and supports, each panel which forms part of the joint.

A mini footer component, as well as a main footer component, including reinforcing rods 410, is provided under the shear wall as illustrated.

Shear wall 424 is an FRP wall having opposing first 34 and second 36 outermost FRP layers, shown in line format and a foam core 32 between layers 34 and 36. The first and second outermost layers are continuous, top-to-bottom, and extend from the proximal end of the shear wall at connector 422 to the distal end of the shear wall (not shown). As appropriate for the stresses to be supported by shear wall 424, one or more additional reinforcing layers (not shown) can be located between the outermost layers, extending generally parallel to the outermost layers. Further, the outermost layers, and any such intermediate layer, can be designed and engineered in terms of layer thickness and fiber reinforcement to sustain the magnitude of the shear load which is expected to be imposed on the shear wall during the anticipated use life of the shear wall.

The shear wall can include studs 23 (not shown) as desired protruding from either or both of layers 34 or 36.

The building system foundation illustrated in FIGS. 31-36 is fabricated generally as follows. First, the area where the building is to be erected is excavated and otherwise conventionally prepared to receive footer material and to provide for sufficient depth of the footer to support the load of the proposed overlying building structure. In such excavation, all footer trenches are defined, and excavated and leveled to the elevation specified for the bottoms of the respective footer trenches, and the bottoms of the footer trenches are compacted as necessary in order to establish a suitable load-bearing surface at the bottoms of the footer trenches.

In addition to the footer trenches about the outer perimeter of the building, footers can be provided inside the outer perimeter of the building to support especially loads imposed on the foundation by disparate, e.g. distinctly different, overlying portions of the building structure. For example, stone fireplaces, water-bearing structures, and the like relatively more massive structures, may be supported by footers which are inside the outer perimeter of the building. Footers are also provided to support shear walls 408 which support, at e.g. perpendicular angles, the walls which define the outer perimeter of the building.

In addition to the footer trenches, the excavation also establishes the elevation of the area beside the footer where a floor or other slab 38 is to be established. Thus, the area to be covered by the slab 38 is excavated to its desired elevation, and compacted as necessary to define a stable base which can support slab 38 and the magnitude of the load which is expected to be placed on the slab. In addition to establishing the base which supports the slab, the elevation of the excavation, combined with the specified depth of the slab, defines the elevation of the top 426 of the slab, which is the same as the elevation 414 which defines the top of the base. Restated, before any concrete is poured at either the footer or the slab, the natural base is excavated and leveled to the elevation of the bottom of the slab, as well as to the elevation of the bottom of the footer.

As seen in FIGS. 31-32, the elevation which is established to receive the bottom of the floor slab is generally higher than the elevation which is established to receive the bottom of the footer.

Once the footer trenches have been established, a guide is established representing the top 416 of each mini footer, for example by stringing an elevation string or cord, or by sighting a laser level, along the length of the footer location, such that adjacent mini footers which are to cooperate in supporting a given wall can be set at a common elevation. The tops 416 of mini footers 402 are below the elevation established for the top 414 of base 400. Blocks can then be placed in the footer trenches, spaced from each other by the specified distances, and with the top of each block set at its specified elevation. As each block is placed in a footer trench, a puddle of e.g. hand-mixed fluid concrete is first placed in the footer trench at the location where the block is to be placed. The block is then placed in/on the puddle of liquid concrete, the elevation of the top of the block is adjusted as necessary, and the block is leveled with respect to both the length and width of the block, all within and/or on the supporting puddle of liquid concrete. As part of the block placement process, the block is typically oriented such that apertures 404 extend along the length of the respective footer. Where footers intersect, the block is oriented such that the apertures extend along the length of a selected one of the footers.

With the blocks set and leveled, and typically after the concrete puddles have hardened sufficiently, conventional e.g. ⅜ inch (9.5 mm) or ½ inch (12.7 mm) steel reinforcing rods 410 are inserted through apertures 404 so as to extend along the length of the respective footer. Where two footers intersect at e.g. right angles, the reinforcing rods, in the footer which is not aligned with the apertures in the corner block, are tied to the rods in the intersecting footer trench, which rods are aligned with the block.

Where the mini footers are to be poured in place, the trenches are prepared as above. The same guide can be established representing the top 416 of each mini footer. E.g. wood forms are then set up for each of the mini footers at the respective mini footer locations. The top of the form for each mini footer is set at generally the elevation desired for the respective mini footer. Liquid concrete puddles can be used to assist in getting the tops of the forms to the desired elevations.

The end walls of the forms include apertures adapted to receive steel reinforcing rods 410. The apertures are oriented such that steel reinforcing rods can be inserted through the apertures, and thus through the mini footer forms, and extending along the lengths of the respective footer trenches. With the mini footer forms in place, steel reinforcing rods are passed into and through the mini footer forms such that the steel rods collectively extend the full lengths of the footer trenches to the extent specified. Also if and as specified, overlapping ends of respective ones of the steel rods are tied together in the usual manner for steel reinforced concrete construction.

With the steel reinforcing rod in place in, through, and between the so-placed mini footer forms, liquid concrete is poured into the mini footer forms, including around the steel reinforcing rods, and allowed to set up and harden. While the liquid concrete is setting up and hardening, final minor adjustments can be hand-worked to provide the desired finished elevation to the top of the concrete in each mini footer.

The mini-footer concrete is allowed to harden sufficiently to receive at least initial wall section loading. The forms around the mini footers can be removed as desired. For example, wood forms can simply be broken away from the sides and ends of the mini footers. Where pre-fabricated concrete blocks are used as the mini footers, the liquid concrete puddles under the concrete blocks are allowed to set up and harden before a load is applied.

The dimensions and strength capabilities of pre-fabricated concrete blocks are generally determined by others in the sense that pre-fabricated concrete blocks are a mass-produced commodity item purchased on the open market. Thus, dimensions and properties are determined by the block supplier. Thus, use of pre-fabricated concrete blocks is attended by certain performance limitations, especially load-bearing limitations. Load bearing limitations may be important because, as described herein after, the full load of the building structure may be imposed on the mini footers, collectively, before the main component 55 of the footer is fabricated.

The poured-in-place mini footer, on the other hand, has no such limitations. Specifically, the dimensions of the poured-in-place mini footer can be specified according to the load-bearing requirements at a specific location on a specific job site. In addition, the concrete composition can be specified for the specific location on the specific job site. Further, the steel reinforcing rod is incorporated into the load-bearing capacity of the poured-in-place mini footer by the time such load is applied. Accordingly, load-bearing capabilities are easily engineered into individual ones of the poured-in-place mini footers.

As a result, a typical poured-in-place mini footer does not have any open horizontally-extending apertures corresponding to apertures 404 in prefabricated concrete blocks. And typically the length of a mini footer, along the length of the footer trench, is greater than 8 inches. Rather, the length of a poured-in-place mini footer may extend up to 12 inches, up to 18 inches, up to 24 inches, or more. However, the length of a mini footer is generally limited to that length which is reasonably required to support the short term load imposed by initial erection of the building; and rarely more than half the distance, center-to-center, between adjacent mini footers.

A guide is established representing specific locations for the wall sections. For example, such guide may be established by stringing an elevation string or cord, or by sighting a laser level. Once the guide is established, wall sections and/or wall panels can be placed on the mini footers in accord with the specific locations indicated by the guide.

Figure 43:
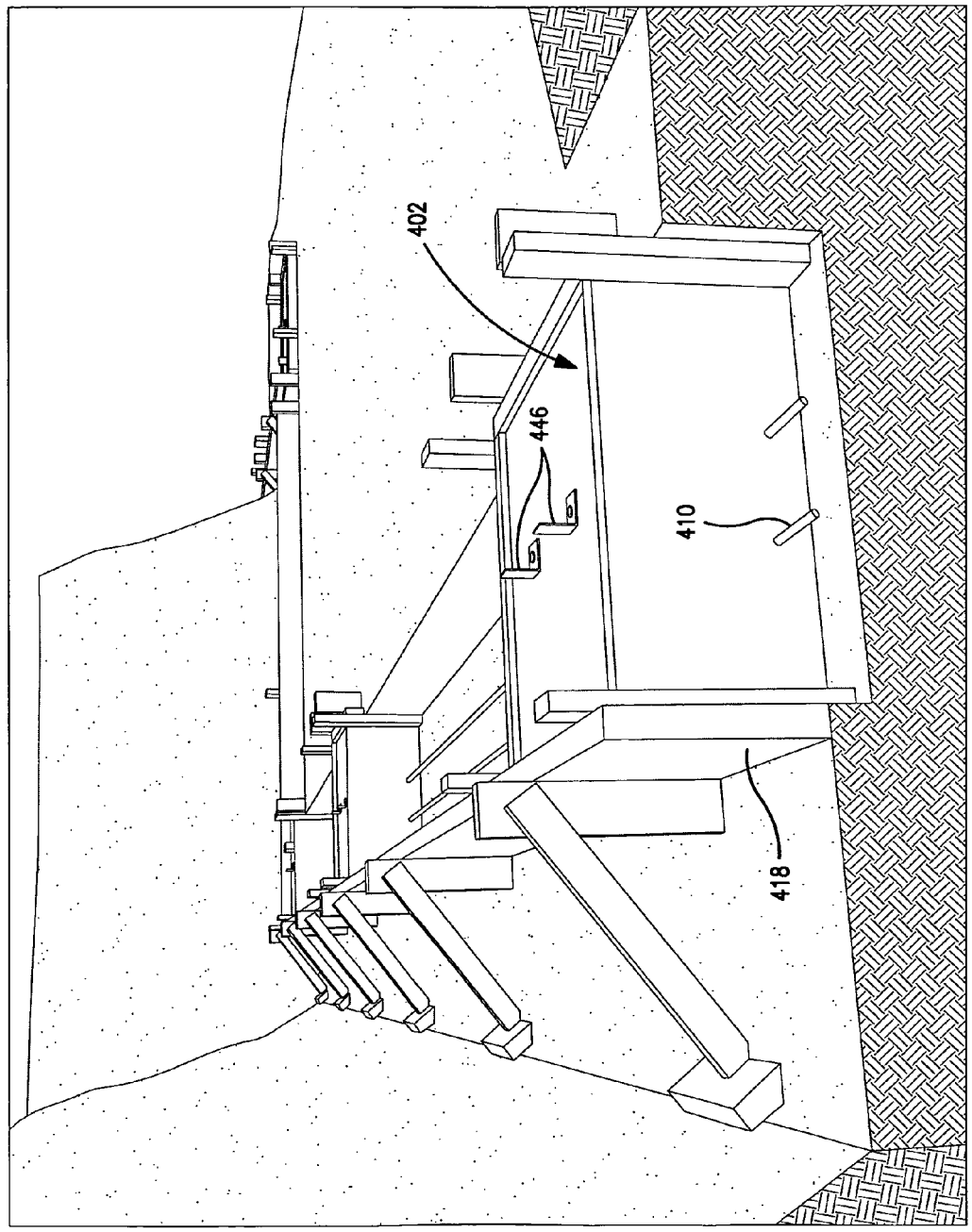
FIG. 43 is a pictorial view showing multiple mini footers in place, along with reinforcing steel in the mini footers, at locations which will be occupied by the monolithic footer/floor slab combination later in the construction project.

In some embodiments, and optionally, the guide can be supplemented by, or replaced with, physical abutment structure 446 on, mounted to, or adjacent, the mini footer. Such physical structure is illustrated in FIG. 43 as right angle brackets. Such brackets may, for example and without limitation, be made using steel or FRP materials. Another illustration of physical abutment structure 446 is wood lumber, which may be mounted directly to the mini footers, or to the mini footer forms 448.

As exemplified by wood boards mounted to mini footer forms 448, abutment structure 446 need not be mounted directly to the mini footers 402, though the brackets illustrate that the abutment structure can be mounted directly to the mini footers. Thus, mounting abutment structure 446 to the mini footers is optional; while the fixation of the abutment structure relative to the mini footers is required where abutment structure is used.

Where used, such physical abutment structure is fixed, generally immovable, in position relative to the mini footer, and stays in such fixed position until the building panels, wall, are/is fixedly mounted to the mini footer.

With such optional physical abutment structure fixedly in place relative to the mini footer as in FIG. 43, individual building panels, or wall sections comprising multiple building panels, are placed on the mini footers, using the abutment structure to assist in aligning the building panels, wall sections on the respective mini footers, such that the building panels extend from mini footer to mini footer along the length of the thus-erected walls, for the full length of such wall(s) which are to be constructed using such building panels. In placing a building panel or wall section, the building panel and/or wall section is aligned along the length of the respective wall such that each end of the building panel is underlain by one of the mini footers. Accordingly, each joint between adjacent such building panels is supported, as to each building panel involved in forming the joint, by one of the mini footers.

Figure 44:
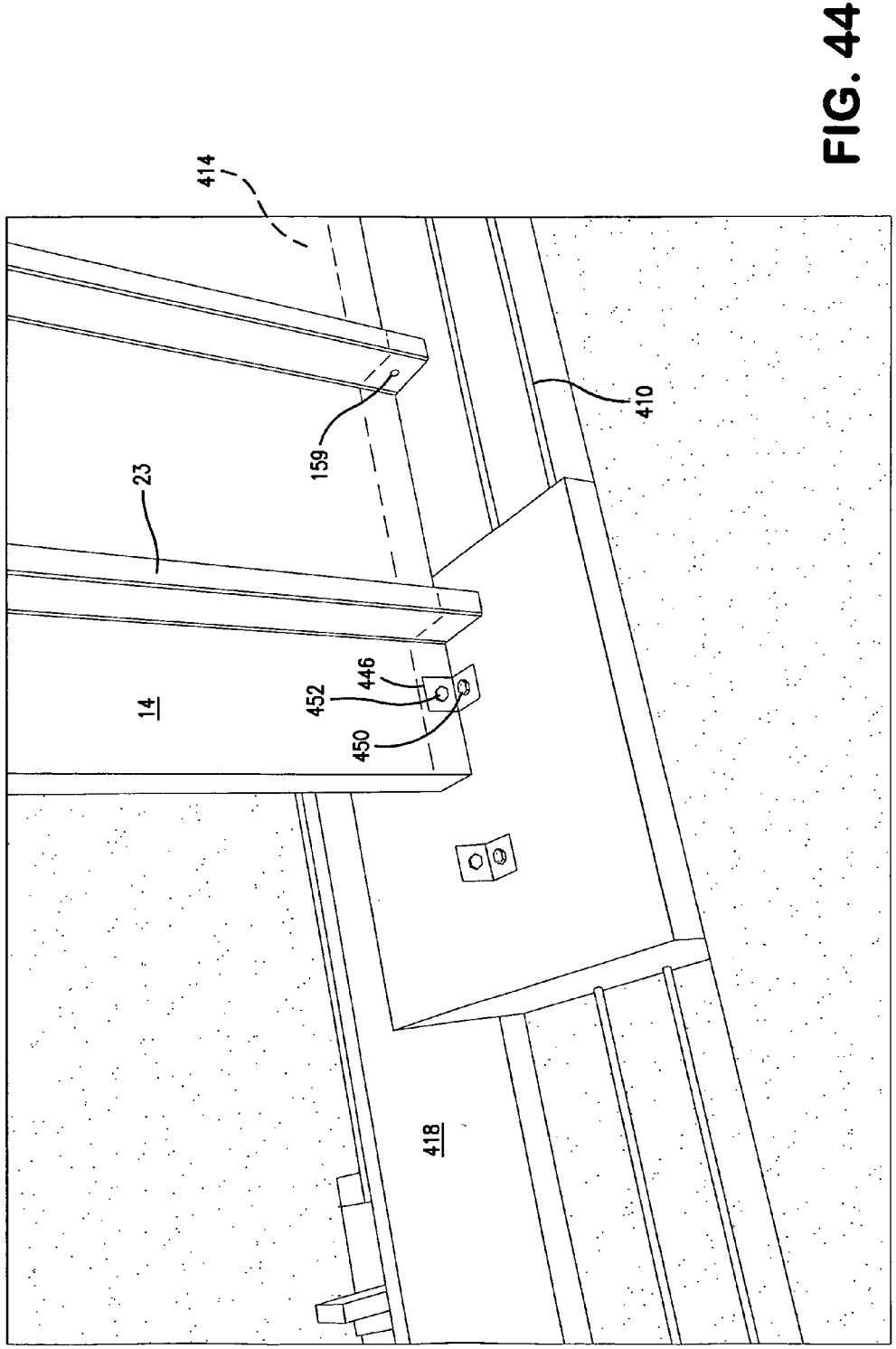
FIG. 44 shows a pictorial view of part of the footer location shown in FIG. 43, with a building panel placed on one of the mini footers.

As desired, once a building panel is in place on the respective mini footers, illustrated in FIG. 44, the building panel can be temporarily secured to the respective mini footers by driving conventional concrete anchors 450 extending through e.g. brackets 446 into the concrete of the respective mini footers; and by driving conventional screws 452 through brackets 446 and into the building panel.

The description so far has addressed abutment structure 446 on one side of the building panel. Such abutment structure can be used to align the panel at either the inner surface or the outer surface of the building panel. With the panel in place as illustrated in FIG. 44, additional abutment structure (not shown) can be placed and securely mounted against the opposing side of the respective building panel as a supplementary abutment structure, supplementing the holding power of the primary abutment structure 446.

The purpose of abutment structure 446, and the supplementary abutment structure where used, is to hold the building panels against horizontal movement during the subsequent placement of ready-mix concrete against the inside, and optionally the outside, surface(s) of the building panels/wall sections.

Respective wall panels and wall sections are joined to each other such as at joints 406 using respective ones of the various joining connectors e.g. 140, 160, 422. As illustrated in FIG. 34, studs 23 are so located along the lengths of panels 14 relative to the ends of the panels that stud spacing across a straight-line joint is the same as the stud spacing internally within a given panel.

The thus erected and joined wall sections define the outer perimeter wall 432 of the respective portion, e.g. the entirety, of the building as well as internal walls, including shear walls which extend up from the mini footers. In addition, footers and walls extending up from the footers can be provided, according to the specific design of the structure being built, outside what will become the outer perimeter of the building.

If concrete anchors 158A are not already in place in respective ones of the studs, apertures 159 are formed in the studs, as necessary, typically below the defined elevation 414 of the top of the base, thus below the top of the not-yet-finished footer, and concrete anchors e.g. 158A are inserted through apertures 159, thus assembling the anchors to the respective studs 23, at the desired ones of the studs, correspondingly assembling the anchors to wall 10. Anchors 158A are typically, but not necessarily, oriented downwardly from apertures 159. Anchors are typically located away from mini footers 402 in order to avoid the potential for interference between downwardly-extending anchors and the tops of the mini footers. Such interference is suggested by the overlay of anchor 158A in front of block 402 in FIG. 31.

In some embodiments (not shown), anchors 158A are configured and directed toward respective ones of reinforcing rods 410 and are tied to reinforcing rods 410 using conventional ties, whereby the studs, and the corresponding wall sections, are thus tied to reinforcing rods 410 by anchors 158A.

With the walls thus erected and supported by mini footers 402, if abutment structure 446 is not to be used, the walls can be braced in the usual manner, from outside the outer perimeter of the wall, in order to hold the walls stationary while ready-mix concrete is being poured and worked, and until the concrete hardens sufficiently to hold its configuration without external support.

Referring to FIGS. 31 and 32, and 43-44, footer forms 418, to receive the main components of the footer, are placed and braced, outwardly of the ends 430 of mini footers 402 which extend outwardly from the outer perimeter wall. The tops of footer forms 418 are illustrated in FIGS. 31-32 as being at the same elevation as the elevation established for the top 414 of base 400.

The footer forms may be any desired forms which can be suitably anchored so as to contain spread of, and retain, the outer edges of the footer as ready-mix concrete is caused to flow into, and fill, the space defined for the mini footer components. Thus, footer 418 forms may be as simple as conventional temporary wood forms which may be stripped away after the concrete of the main footer components has hardened. The footer forms may be more sophisticated, and permanent, forms, e.g. including water drainage capability therein, such as the FORM-A-DRAIN® forms discussed earlier.

Depending on the load-bearing specifications for the footer, and the lateral positioning of the wall on the tops of mini footers 402, the footer forms can be as close to the wall as e.g. the ends 430 of the blocks in FIG. 31, or can be spaced farther outwardly from the wall. FIG. 31 shows the footer form in direct contact with end 430 of the corresponding block.

The next step in creating the monolithic concrete base includes pouring a fluid, e.g. ready-mix, concrete floor about the foundation. Prior to pouring such concrete, all utilities which will be encased in the concrete floor must be first constructed. Such utilities include pressure water lines, grey water drains, any footing drain lines which may be directed to a sump inside the building, and may include heating and/or electrical utilities.

Such utilities are typically constructed/installed after the main shell of the building has been fully constructed/erected and enclosed. Since the monolithic concrete base cannot be fabricated until such utilities are in place, the mini footers must support the full weight of such enclosed building structure without benefit of any support of the not-yet-installed main footer components. Accordingly, the mini footers 402 are engineered to sustain such load temporarily during the period in which the building will be constructed.

Once the floor utilities are in place, as a final step in preparation for pouring fluid ready-mix concrete in fabricating the monolithic concrete base, the elevation of the excavation which is to be overlaid by slab 38 is confirmed at various spaced locations about the area defined for slab 38, and is checked for suitable density/tamping; and any disturbance of the natural base which may have occurred subsequent to the excavation and other preparations for the slab, is repaired in late-stage preparation for the pouring of fluid ready-mix concrete.

With the mini footers, the wall sections/walls, the reinforcing rod matrix, the anchors, the forms, the shear walls, and the floor utilities and any required floor supports in place, with the walls suitably braced against lateral movement, with the bottoms of the wall sections/walls on the mini footers below the elevation 414 of the top of the prospective slab/footer/base, and above the bottoms of the footer trenches, and with the elevation of the natural base to be overlain by slab 38 established, confirmed, tamped, and otherwise prepared, the so-assembled precursor is ready to receive fluid ready-mix concrete. Substantial openings exist between adjacent ones of the mini footers, and between the bottoms of the wall sections and the bottoms of the footer trenches.

Fluid ready-mix concrete is then poured into the so-prepared space to be occupied by slab 38 and footers 55. Where the slab is disposed inwardly into the interior of the building being constructed, the ready-mix concrete is typically delivered inside the area enclosed by outer wall perimeter 432, and is flowed/worked outwardly under the wall panels, wall sections, in the footer trenches to the outermost regions of the footer trenches, including into and through any apertures 404 in the mini footers, about the ends of mini footers 402, and to outwardly-disposed footer forms 418. Ready-mix concrete may be delivered directly to the footer trenches on the outside of the perimeter wall, and to any slab outside the perimeter wall, as desired.

The fluid ready-mix concrete is filled to the tops of forms 418, which is consistent with the elevation of the top 426 of slab 38 and thus the elevation of the top 414 of base 400.

Given that the bottoms of the wall sections are resting on the tops 416 of mini footers 402, given that the tops of the footer forms 418 are at higher elevations than the tops 416 of the mini footers, and given that the top 414 of base 400 is at a higher elevation than the tops of the mini footers, the bottoms of the wall sections, and thus the bottom of the walls, are below the top 414 of the base. Accordingly, the bottom of the wall is embedded in the poured concrete base, and is typically about 1 inch (2.5 cm) to about 3 inches (7.6 cm) below top 414 of the poured concrete base. Once the concrete sets/hardens, the wall and the concrete become part of a single monolithic structure, wherein the base into which the wall is held, includes at least one slab which is unitary with the footer which underlies the wall. In addition, anchors 158 are embedded in the hardened concrete and may, further, have been tied to reinforcing rods 410. Thus, once the concrete sets/hardens, the footer, the slab, and the wall are all part of a single structural unit. The footer includes mini footers 402, the steel reinforcing material, and the main components of the footer which extend over, between, and around the mini footers and the steel reinforcing material.

After the concrete has been poured, the concrete is worked to provide the desired finish to the top surface of base 400. In some embodiments, the surface 426 of that portion of the footer which is disposed outwardly of the building from outer layer 36 of the wall, is finished with a downward slope away from the outer surface of the wall. A sealing membrane 420 may be applied to the outside surface of wall 10, at the base of the wall and draping over the top surface of footer 55, as generally illustrated in FIGS. 31 and 32. A suitable adhesive can be used as desired to mount membrane 420 to the outer surface 56 of wall 10. In embodiments, where the outer footer form is adapted to receive water from the outer surface of the wall, to channel such water and discharge such water away from the wall, the lower end of membrane 420 is typically terminated proximate the footer form. Where other means are used to receive, channel and discharge water from the outer surface of the wall, sealing membrane 420 is terminated proximate such water capture elements.

As illustrated in FIGS. 31 and 32, after the base has been poured, a monolithic body of concrete encompasses both the main components of the footer(s) and the slab 38. To the extent discrete footer elements are spaced from, not contiguous with, the outer perimeter footer, but are located inwardly in the building of the outer perimeter footer, namely inside the building, such discrete footer elements are still part of the monolithic body of concrete which defines both the footer elements and the slab, of base 400.

Even where a structure may not be roofed-over, the same principles can be used to fabricate any combination of monolithic footer, slab and walls.

While the embodiments illustrated in FIGS. 31-36 illustrate a below-grade foundation, the principles illustrated there can be used as well in grade-level foundations. Thus, for a slab-on-grade structure, the base 400, including footer 55 and slab 38 are developed at generally the natural grade of the ground surrounding the construction area or modestly above such grade. In such instance, it may be desirable to fabricate a garage apron or parking area immediately beside the building structure. Such garage apron can be fabricated at the same time, and as part of the same structure, as the footer by preparing the elevation of the natural base outside the building structure in the same manner as has been described for preparing the natural base for a slab inside the building.

Thus, the same principles can be used to fabricate the footer, the slab inside the building, and the slab outside the building, all as a single unit, and all fabricated at the same time.

Where a slab is being fabricated outside the building, any desired forms can be used to define the outer perimeter of such slab.

Reinforcing rods 410 can be relocated to other suitable locations so long as such rods still provide the necessary strength enhancements to the concrete in footer 55. Further, the material of rods 410 can be modified as desired, whereby rods 410 can be coated with any of a variety of polymeric materials, or can be fabricated exclusively from FRP materials.

The embodiments of FIGS. 31-36 illustrate the principle of supporting a foundation wall on spaced mini footers which later become part of the completed footer/floor base when fluid concrete, such as but not limited to ready-mix concrete, is flowed under the wall in fabrication of a monolithic structure which embodies both a slab and a footer. The respective embodiments have been illustrated using the FRP walls and wall structures disclosed herein. However, the principles of first supporting a wall on spaced support blocks, above the bottom of the space allocated to the footer, and then flowing concrete under such wall in fabrication of the footer and thus using such flowed concrete, once hardened, to support the wall along the full length of the footer, can be practiced with any wall structure which can be supported on spaced mini footers until such time as the fluid concrete can be flowed under the wall and hardened, such that the thus-poured concrete supports the bottom of the wall along that portion of the full length of the wall which is not supported by the earlier-placed mini footers. The resulting footer has first and second sets of footer elements, namely the mini footers 402 supporting respective ones of the wall elements, and the main footer components 55 supporting the wall elements between the mini footers. The first set of footer elements has been fabricated before the placing of the wall elements. The second set of footer elements, namely the main footer components, has been fabricated after the placing of the wall elements. Since the wall is already supported by the mini footers before the main footer components are fabricated, initially—the relative loading supported by the main footer components is less than the relative loading supported by the mini footers. However, as the wall is further loaded after the concrete in the main footer components has cured, the main footer components pick up incremental portions of the load which are more representative of the fractions of the wall which are underlain by the main footer components.

Still referring to FIGS. 31-36, the concrete base 400 is illustrated as a monolithic, single-unit mass of concrete. As desired, an inner footer form (not shown) can be set inwardly of the inner surface of the wall, such as inwardly of inner surface 25, or inwardly of end panels 44 of the studs, such that footer 55 can be poured separately from slab 38. Namely, with the inner footer forms in place, fluid concrete can be flowed into the footer forms, including under the bottom of the so-set wall which is resting on the mini footers. The fluid concrete is worked and allowed to harden. Subsequently, the slab 38 is poured. The inner footer forms may or may not be removed before the slab is poured.

In the alternative, forms can be set up defining the outer perimeter of the slab; and concrete poured into the slab area and allowed to harden, thus establishing the dimensions of the slab before footer concrete is poured. After the slab concrete is set up, the footer is poured as a separate step, but again causing the concrete to flow under the bottom of the previously-set foundation wall.

While the description so far has illustrated the flowing of the fluid concrete under the wall from the inside of the wall, e.g. from inner surface 57 toward outer surface 56, in some instances, the concrete is placed in the footer space which is disposed outwardly of the wall and is then caused to flow under the wall and toward the inner surface of the wall. Thus, the concrete can be flowed under the foundation wall from either the inner side of the wall or from the outer side of the wall. The selection of which side of the wall is used as the initiating location depends on the ease of accessing the inner or outer surface of the wall versus the amount of space available between the respective inner or outer surface of the wall and the respective footer form on that side of the wall.

Figure 40:
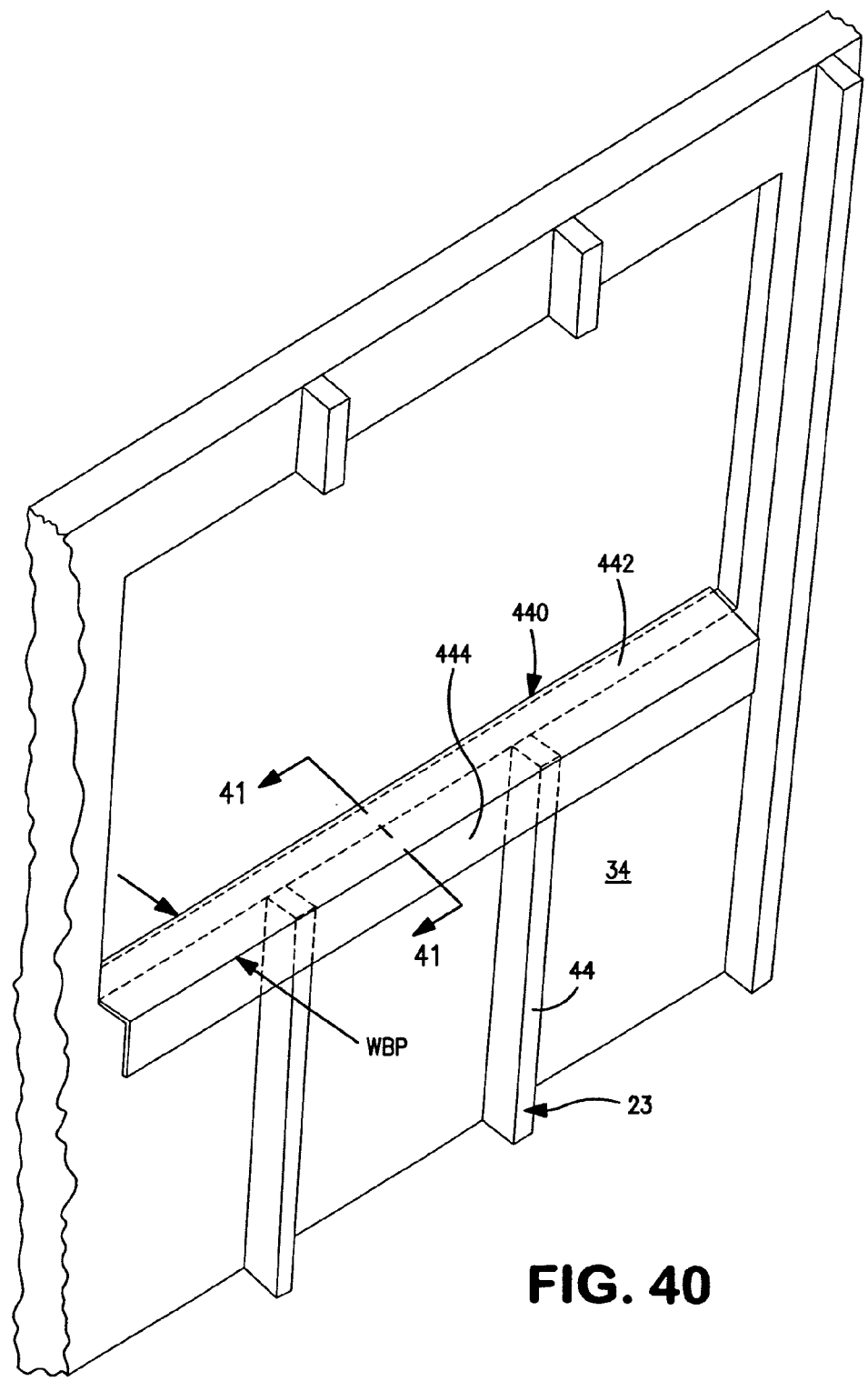
FIGS. 40 and 41 illustrate an FRP brace cap which extends the length of the lower sill of a window rough opening, thus adapting the wall to receive the side load of backfill which can extend up to near the lower sill of the window.
Figure 41:
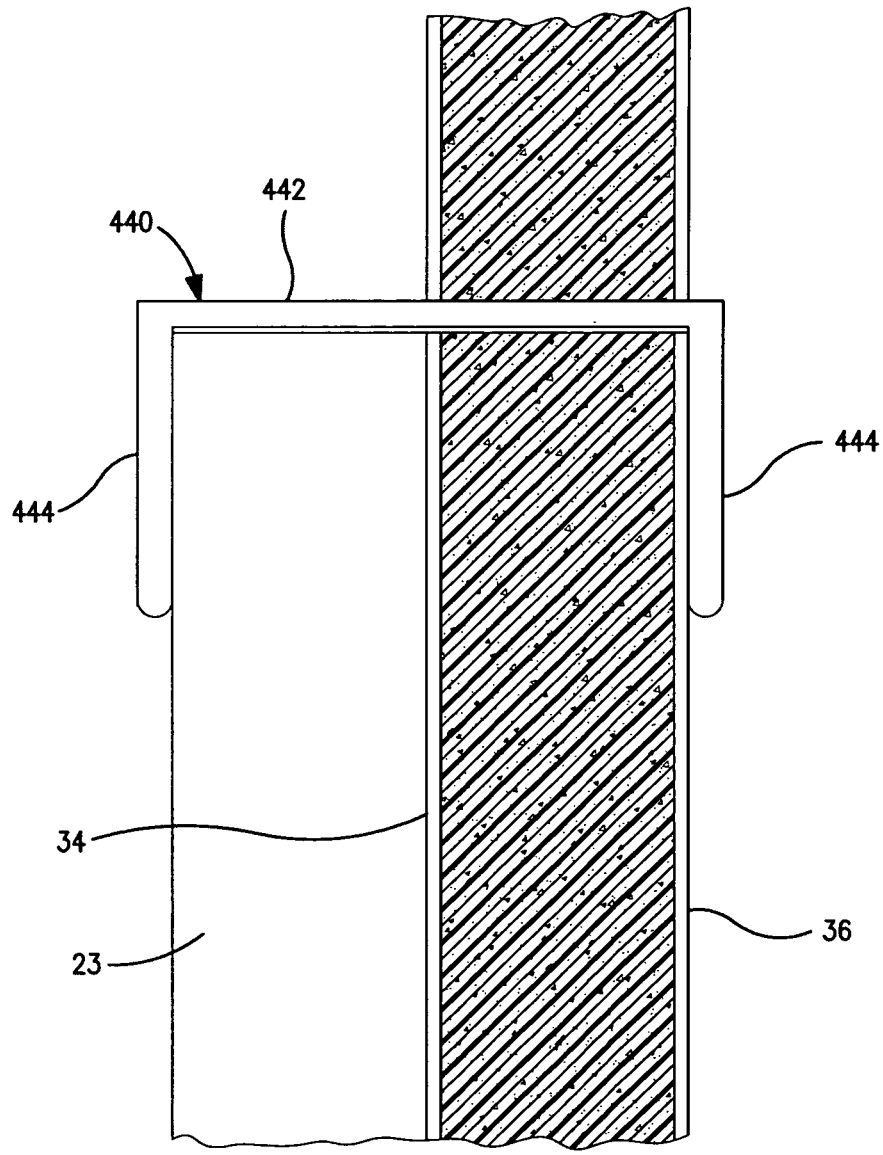
Figure 42:
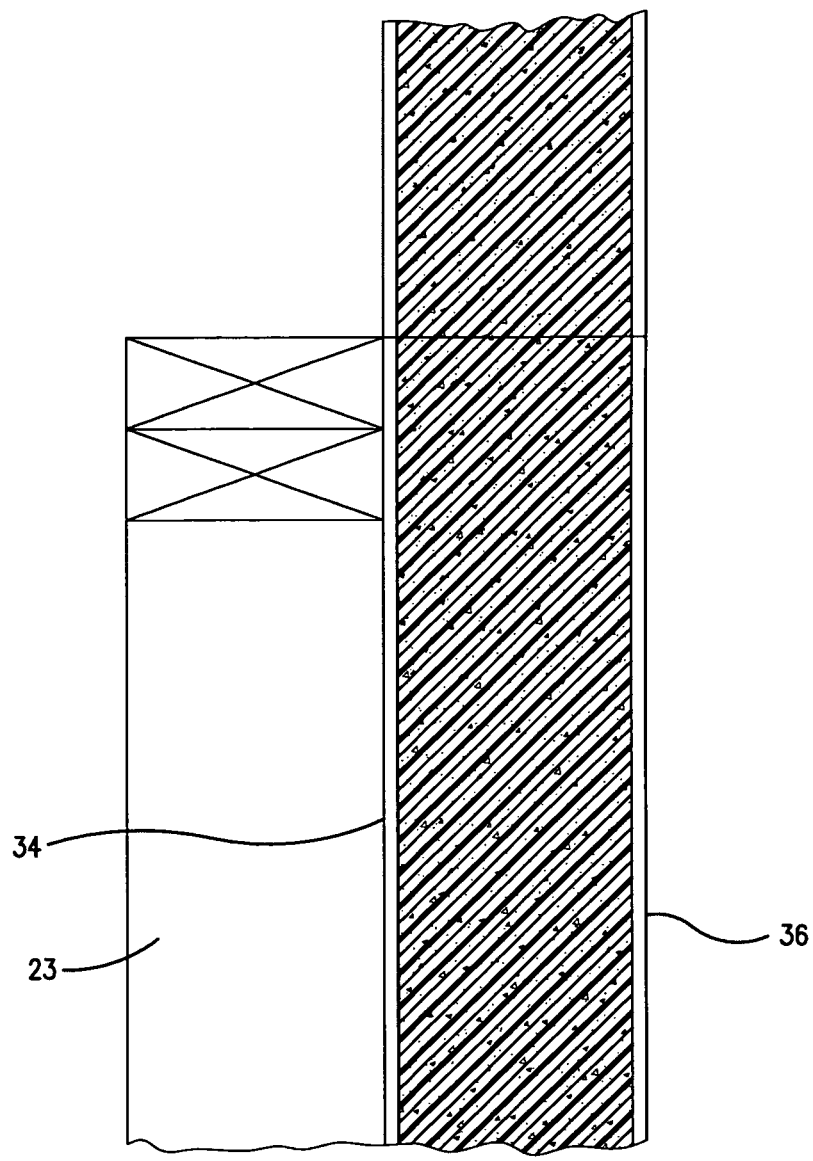
FIG. 42 shows one or more dimension lumber studs laid flat under the window opening to stiffen the lower sill.

FIGS. 40-41 illustrate use of building panels of the invention where soil or other backfill material is backfilled against a wall 10 to proximate a window 27. In such embodiments, the soil applies a lateral load to the outer surface of wall 10, tending to cause the wall to deflect inwardly. In such embodiments, a sill cap 440 can be placed in the window rough opening, at the lower sill as illustrated in FIGS. 40-41. As placed in the window rough opening, sill cap 440 is a downwardly-open elongate U-shaped FRP channel extending along the length of the wall. Sill cap 440 has a base panel 442, and opposing side panels 444. Base panel 442 extends along the length of the panel, for substantially the full length of the window opening, and is oriented horizontally. Side panels 444 extend downwardly from opposing elongate edges the base panel, substantially the fill length of the window opening. Accordingly, the open side of the "U-channel" faces downwardly and extends substantially the full length of the window opening, as illustrated.

As illustrated in FIG. 40, spacing of side panels 444 from each other is such that, with the sill cap installed on the lower surface of the window opening, the side panels are in interfering contact with the outer surface 56 of wall 10 and with the outermost surfaces of end panels 44 of studs 23.

Base panel 442 and side panels 444 are specified as rigid members which can absorb lateral stresses imposed on wall 10 from backfill material pushing against the outer surface of the wall, thus to attenuate tendency of the wall to bend at window 27. The thicknesses, materials, fiber reinforcements in sill cap 440 can be the same as for studs 23, inner layer 34, and/or outer layer 36. Thus the same fiber reinforced polymer materials can be used. The same fiber schedules can be used. The same thicknesses can be used. In typical such sill caps, the base panel and/or the side panels can be about 0.13 inch (3.3 mm) thick; but the thicknesses and fiber schedules can be adjusted to account for anticipated side loads.

Building panels and walls of the invention are essentially almost water proof; and such water proof characteristic is not generally affected by hurricane-driven rain. Outer layer 36 is, itself, very water resistant. While layer 36 is quite difficult for water to penetrate, even if layer 36 is breached, the foam blocks 32 or foam board 32BD are very water resistant in that the individual cells of the foam 32 are typically closed cells. If the foam layer is also breached, inner layer 34 is also very water resistant. In addition, where a weaving layer is used, before the breaching force reaches layer 34, the breaching force must pass through weaving layer 50, which is another layer which is difficult for water to penetrate, whether layer 50 is encountered adjacent layer 36 or adjacent layer 34. In any event, any breaching force has to penetrate multiple very water resistant layers. The FRP structures which do not include foam are similarly-effective barriers to water penetration.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A fiber-reinforced polymeric load-bearing building panel, said building panel having a height defined between a top and a bottom of said building panel when said building panel is in an upright orientation, a length, and a thickness, said load-bearing building panel comprising:
    (a) an outer fiber-reinforced polymeric layer, said outer layer defining an outwardly-facing surface of said building panel when said building panel is being used as a load-bearing part of a load-bearing wall of a building;
    (b) an inner fiber-reinforced polymeric layer, said inner layer generally defining an inwardly-facing surface (25) of said building panel when said building panel is being used as such load-bearing part of such load-bearing wall of such building;
    (c) a plurality of foam blocks extending generally from said inner layer to said outer layer and from the top of said building panel to the bottom of said building panel, said foam block having an outer surface disposed toward said outer layer, an inner surface disposed toward said inner layer, and opposing side surfaces; and
    (d) at least one fibrous layer extending across, and covering, the outer surface, and across and covering, the opposing side surfaces, of said foam block, and extending, from the side surfaces, onto and part way across the inner surface of said foam block, and thereby defining a substantial distance between opposing ends of said at least one fibrous layer at the inner surface of said foam block, said fibrous layer being secured to the inner surface of said foam block at or adjacent the respective ends of said fibrous layer.

2. A fiber-reinforced polymeric building panel as in claim 1, said at least one fibrous layer comprising a first structural sub-layer, and a flow-control layer between said first structural sub-layer and the outer surface of said foam block.

3. A fiber-reinforced polymeric building panel as in claim 2 wherein said fibrous layer is secured to said foam block by fasteners which are driven through both of said structural sub-layer and said flow-control sub-layer, and are further driven into said foam block.

4. A fiber-reinforced polymeric building panel as in claim 2 wherein at least 70 percent by weight of fiber in said first structural sub-layer extends continuously along a path in a direction progressing between the top and the bottom of said building panel.

5. A fiber-reinforced polymeric building panel as in claim 2 wherein at least 60 percent by weight of fiber in said first structural sub-layer traverses a path between the top and the bottom of said building panel, along an angle of no more than 15 degrees from a vertical path through said building panel when said building panel is in an upright orientation.

6. A fiber-reinforced polymeric load-bearing building panel, said building panel having a height defined between a top and a bottom of said building panel when said building panel is in an upright orientation, a length, and a thickness, said load-bearing building panel comprising:
    (a) an outer fiber-reinforced polymeric layer, said outer layer defining an outwardly-facing surface of said building panel when said building panel is being used as a load-bearing part of a load-bearing wall of a building;
    (b) an inner fiber-reinforced polymeric layer, said inner layer generally defining an inwardly-facing surface (25) of said building panel when said building panel is being used as such load-bearing part of such load-bearing wall of such building;
    (c) one or more blocks of foam material between said inner and outer layers;
    (d) a plurality of fiber-reinforced studs interfacing with said inner layer and spaced along the length of said building panel and extending away from said outer layer, said stud comprising a stud substrate having a distal end remote from said foam blocks and a proximal end adjacent said foam blocks, and first and second sides extending between the distal end and the proximal end; and
    (e) at least one fibrous layer extending across the distal end of said stud substrate, and extending across said sides, of said stud substrate, and terminating proximate the proximal end of said stud substrate, said at least one fibrous layer being secured to said stud substrate at or adjacent the proximal end of said stud substrate.

7. A fiber-reinforced polymeric building panel as in claim 6, said at least one fibrous layer being secured to said stud substrate at or adjacent the proximal end of said stud substrate, by mechanical fasteners which extend through said at least one fibrous layer and into said stud substrate.

8. A fiber-reinforced polymeric building panel, said building panel having a height defined between a top and a bottom of said building panel when said building panel is in an upright orientation, a length, and a thickness, said building panel comprising:
    (a) an outer fiber-reinforced polymeric layer, said outer layer defining an outwardly-facing surface of said building panel when said building panel is being used as a load-bearing part of a load-bearing wall of a building;
    (b) an inner fiber-reinforced polymeric layer, said inner layer generally defining an inwardly-facing surface (25) of said building panel when said building panel is being used as such load-bearing part of such load-bearing wall of such building;
    (c) one or more blocks of foam material between said inner and outer layers, said one or more blocks of foam material spacing said inner and outer layers from each other,
    at least one of said inner and outer layers being defined at least in part by
    (i) a first sub-layer wherein at least 70 percent by weight of fiber in said first sub-layer extends along paths continuously progressing between the top and the bottom of an uprightly-oriented said building panel,
    (ii) a second sub-layer disposed between said first sub-layer and said one or more blocks of foam material, and
    (iii) a third sub-layer disposed outwardly, in said building panel, of said first sub-layer, wherein said first sub-layer comprises at least 5 times as much fiber by weight as either of said second or third sub-layers, and wherein fibers of said second and third sub-layers extend along paths progressing other than continuously between the top and the bottom of said building panel such that, prior to fluid resin being cured as part of fabricating said building panel, liquid resin flows preferentially along and through said second and third sub-layers as compared to flow of such liquid resin along and through said first sub-layer.

9. A fiber-reinforced polymeric building panel as in claim 8 wherein said first sub-layers in said inner and outer layers comprise about 45-ounces per square yard to about 55-ounces per square yard unidirectional fiber extending continuously along a path between the top and the bottom of said building panel and wherein at least one of said second and third sub-layers comprises about 1-ounce per square yard to about 10-ounces per square yard of fiber, either oriented transversely to the unidirectional fiber in said first layer or extending in random directions within the confines of the respective said sub-layer.

10. A building panel as in claim 9, said building panel further comprising a plurality of fiber-reinforced polymeric studs on an inner side of said building panel in combination with said inner layer, said studs being spaced along the length of said building panel and extending away from said outer layer, said stud comprising
  (i) a stud substrate proximate said at least one foam block and having a distal end remote from said at least one foam block and a proximal end adjacent said at least one foam block, and first and second stud substrate sides extending between the distal end and the proximal end of the respective said stud, said first and second sub-layers of said inner layer extending about said studs, and
  (ii) a stud wrap layer (308) extending across the distal end of said stud and extending between the distal end and the proximal end, and terminating proximate the proximal ends of said stud substrate side walls, said stud wrap layer comprising
    (A) a fourth sub-layer wherein at least 60 percent by weight of fiber in said fourth sub-layer extends along paths continuously progressing between the top and the bottom of an uprightly-oriented said building panel, and
    (B) a fifth sub-layer disposed between said fourth sub-layer and said first sub-layer of said inner layer,
  wherein said fourth sub-layer comprises at least 5 times as much fiber by weight as said fifth sub-layer, and wherein said fifth sub-layer extends along paths progressing other than continuously between the top and the bottom of said building panel such that, prior to fluid resin being cured as part of fabricating said building panel, liquid resin flows preferentially along and through said fifth sub-layer as compared to flow of such liquid resin along and through said fourth sub-layer.

11. A building panel as in claim 10, wherein at least 70% by weight of the fiber in said fourth sub-layer extends along paths continuously progressing between the top and the bottom of an uprightly-oriented said building panel.

\* \* \* \* \*

UNITED STATES PATENT AND TRADEMARK OFFICE
CERTIFICATE OF CORRECTION

PATENT NO. : 8,534,028 B2  
APPLICATION NO. : 13/317120  
DATED : September 17, 2013  
INVENTOR(S) : Daniel J. Wojtusik et al.

Page 1 of 1

It is certified that error appears in the above-identified patent and that said Letters Patent is hereby corrected as shown below:

In the Specification

In column 9, line 18, delete the space after "e.g.", thus combining this paragraph with the subsequent paragraph.

In column 15, line 43, remove the "," after "top plate".

In column 21, line 17, insert a --.-- after "panel".

In column 22, line 27, insert a --,-- after "outer layer 36".

In column 44, line 37, insert --of-- after "edges".

In column 44, line 38, remove "fill" and replace with --full--.

Signed and Sealed this  
Thirty-first Day of December, 2013

Margaret A. Focarino  
*Commissioner for Patents of the United States Patent and Trademark Office*